(12) United States Patent
Ito et al.

(10) Patent No.: US 6,249,740 B1
(45) Date of Patent: *Jun. 19, 2001

(54) COMMUNICATIONS NAVIGATION SYSTEM, AND NAVIGATION BASE APPARATUS AND VEHICLE NAVIGATION APPARATUS BOTH USED IN THE NAVIGATION SYSTEM

(75) Inventors: Yasuo Ito; Naoki Gorai; Takashi Sugawara; Satoshi Kitano, all of Sapporo (JP)

(73) Assignee: KabushikiKaisha Equos Research (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,479

(22) Filed: Jan. 21, 1999

(30) Foreign Application Priority Data

| Jan. 21, 1998 | (JP) | 10-023842 |
| Oct. 9, 1998 | (JP) | 10-287497 |
| Oct. 15, 1998 | (JP) | 10-294239 |

(51) Int. Cl.[7] .................... G01C 21/00; G01C 22/00; G01S 5/00; G06G 7/78; G06F 17/00; G06F 19/00
(52) U.S. Cl. .................... 701/200; 701/117; 701/120; 701/201; 701/202; 701/209; 701/210; 701/211; 705/5; 340/910; 340/945; 340/994; 340/988; 340/990; 340/995; 340/953
(58) Field of Search .................... 701/200, 120, 701/210, 201, 211, 209, 202, 117; 340/988, 990, 995, 953, 910, 945, 994; 705/5

(56) References Cited

U.S. PATENT DOCUMENTS

| 4,791,571 | * | 12/1988 | Takashi et al. | 364/436 |
| 5,574,648 | * | 11/1996 | Pilley | 364/439 |
| 5,911,775 | * | 6/1999 | Tanimoto | 701/210 |
| 5,925,090 | * | 7/1999 | Poonsaengsathit | 701/211 |
| 5,938,720 | * | 8/1999 | Tamai | 701/209 |
| 5,948,040 | * | 10/1999 | DeLorme et al. | 701/207 |
| 6,006,158 | * | 12/1999 | Pilley et al. | 701/120 |

FOREIGN PATENT DOCUMENTS 1019588    1/1998    (JP) .

* cited by examiner

*Primary Examiner*—William A. Cuchlinski, Jr.
*Assistant Examiner*—Ronnie Mancho
(74) *Attorney, Agent, or Firm*—Lorusso & Loud

(57) ABSTRACT

A commucations navigation system in which data is transmitted and received between a navigation base apparatus provided at a navigation base and a vehicle navigation apparatus provided in a vehicle using communication. The vehicle navigation apparatus is adapted to transmit at least data concerning the current position of the vehicle and the destination thereof to the navigation base apparatus, and the navigation base apparatus stores navigation data in its data base and is adapted to determine a recommended route based on the transmitted data of the current position of the vehicle and the destination thereof and then extract data of the recommended route from the navigation data stored in the data base and transmit the extracted data to the navigation apparatus. The navigation base apparatus is adapted to be able to extract detailed navigation data only for a surrounding areas of a specified point on the recommended route from the navigation data stored in the data base and then transmit the detailed navigation data to the navigation apparatus. The specified point includes a departure point, a destination and a course-change point which are located on the recommended route. During traveling other places on the recommended route such as intermediate sections, the navigation apparatus transmits simple navigation data such as a simple map to the vehicle, thereby enabling to reduce an amount of data to be transmitted from the navigation base apparatus to the vehicle navigation apparatus.

8 Claims, 45 Drawing Sheets

| Road data | |
|---|---|
| Road Number | 65248 |
| Node Point Data | ND1, ND2, ......... |
| Road Name | xx road |
| Road Classification | Highway |
| Road Length | 45 Km |
| | |

(B)

| Intersection Data | |
|---|---|
| Intersection Number | 02564 |
| Intersection Name | Intersection xx |
| Intersection Position | Longitude:xx<br>Latitude:xx |
| | |

| R1 | R2 | R3 | R4 | R5 | R6 | R7 | R8 | R9 |

(B)

| C1 | C2 | C3 | C4 | C5 | C6 | C7 | C8 | C9 |

(C)

| Intersection Number | Road Number of Road Entering The Intersection | Road Number of Road Exiting The Intersection |
| --- | --- | --- |
| C1 | R1 | R2 |
| C2 | R2 | R3 |
| C3 | R3 | R4 |
| C4 | R4 | R5 |
| C5 | R5 | R6 |
| C6 | R6 | R7 |
| C7 | R7 | R8 |
| C8 | R8 | R9 |

| Departure Position | (Longitude / Latitude) |
|---|---|
| Destination | (Longitude / Latitude) |

(B)

| Road Data ||
|---|---|
| Road | Corresponding Data |
| R1 | Road Number; Road Name; Road Length; Node Point Position;······ |
| R2 | Road Number; Road Name; Road Length; Node Point Position;······ |
| ⋮ | ⋮ |

(C)

| Intersection Data ||
|---|---|
| Intersection | Corresponding Data |
| C1 | Intersection Number; Intersection Name; Intersection Position;······ |
| C2 | Intersection Number; Intersection Name; Intersection Position;······ |
| ⋮ | ⋮ |

(D)

| Area Guidance Data for Course-change Point ||
|---|---|
| Course-Change Point | Corresponding Data |
| C1 | Intersection Number; Position; Road Number and Map Data For Entrance Road; Road Number and Map Data For Exit Road; Guidance Data (which includes map data and voice guidance data about the course-change point and surrounding area of the course-change point; and the like) |
| ⋮ | ⋮ |

Fig. 9
(A)
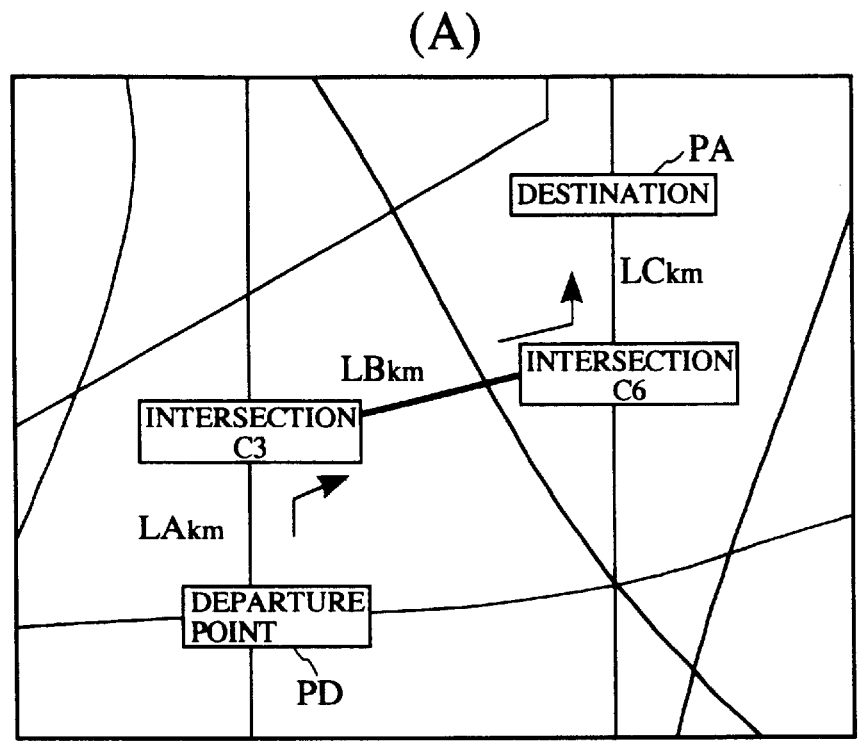
(B)
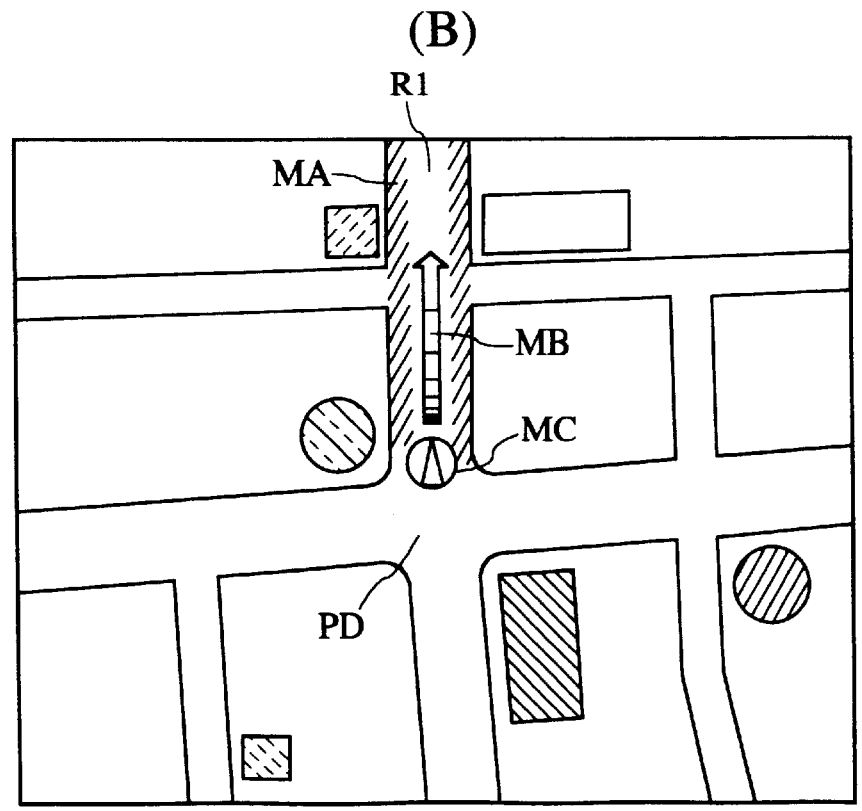

Fig. 10
(A)
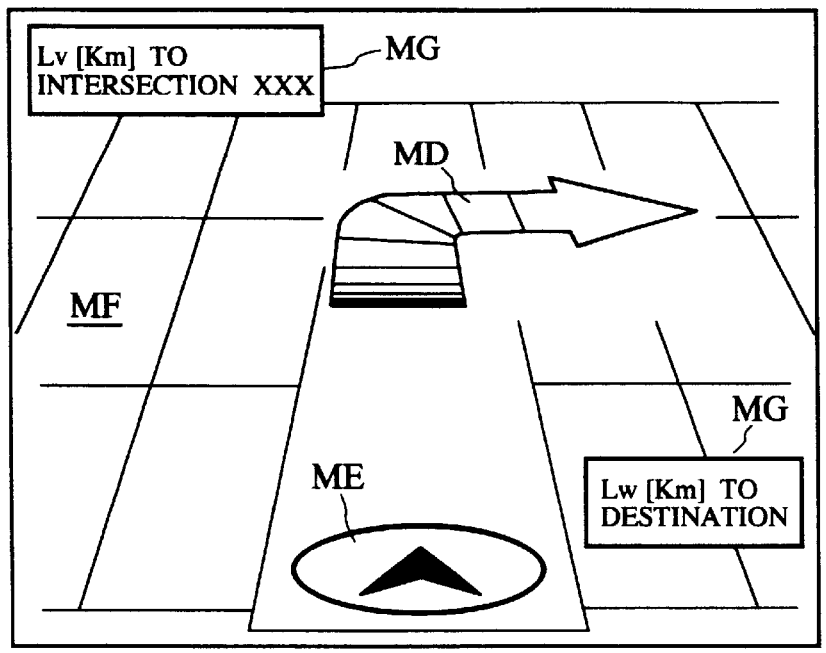
(B)
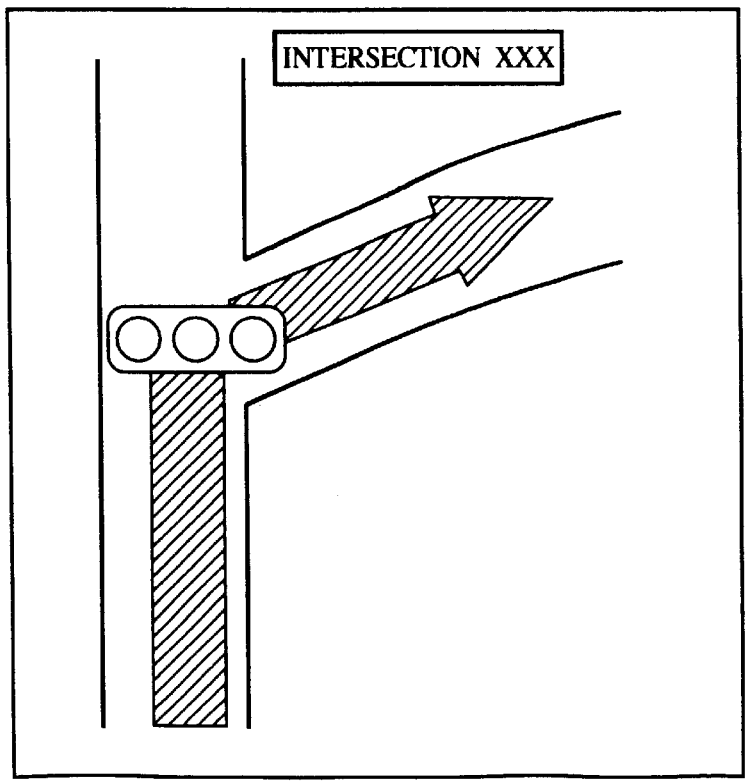

Fig. 13
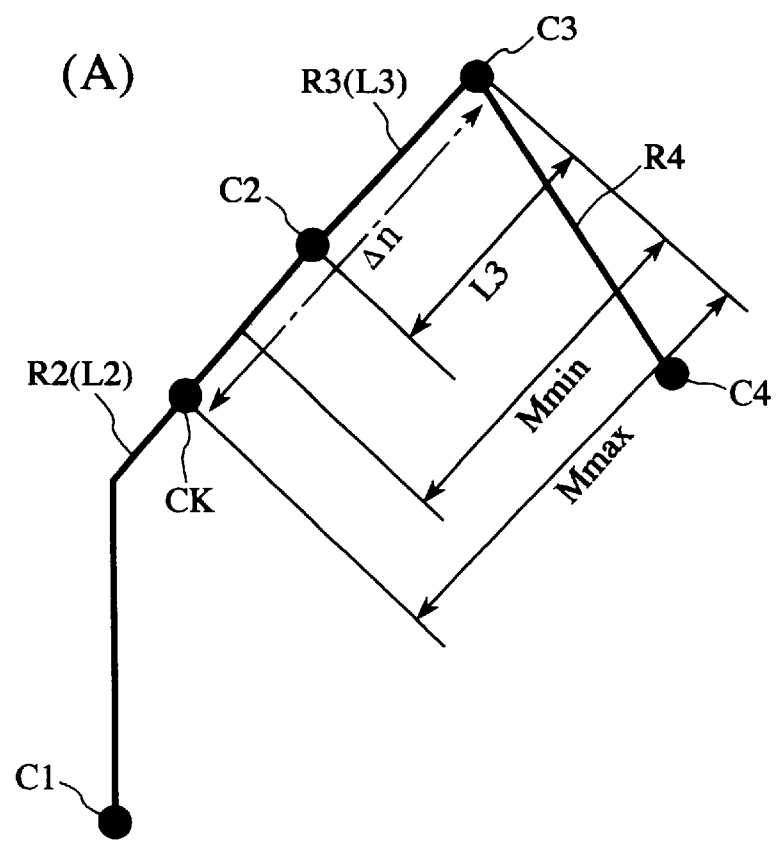
(A)
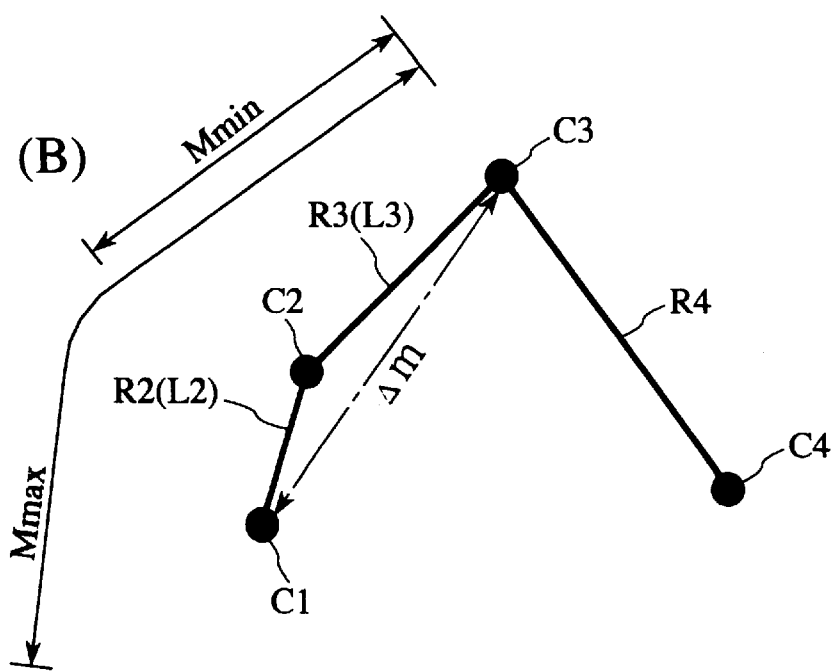
(B)

Fig. 17
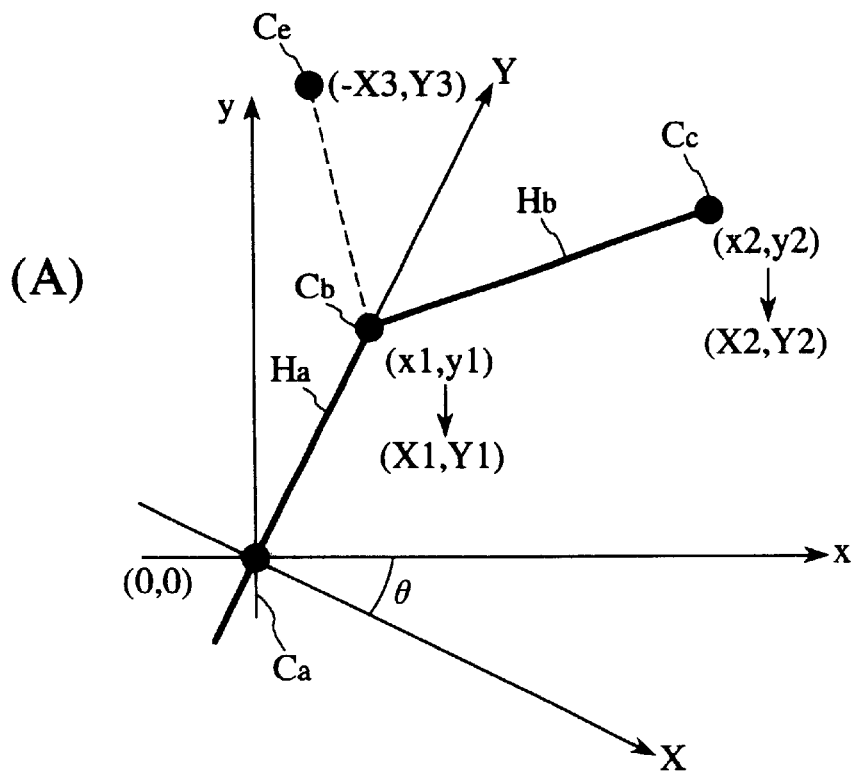
(A)
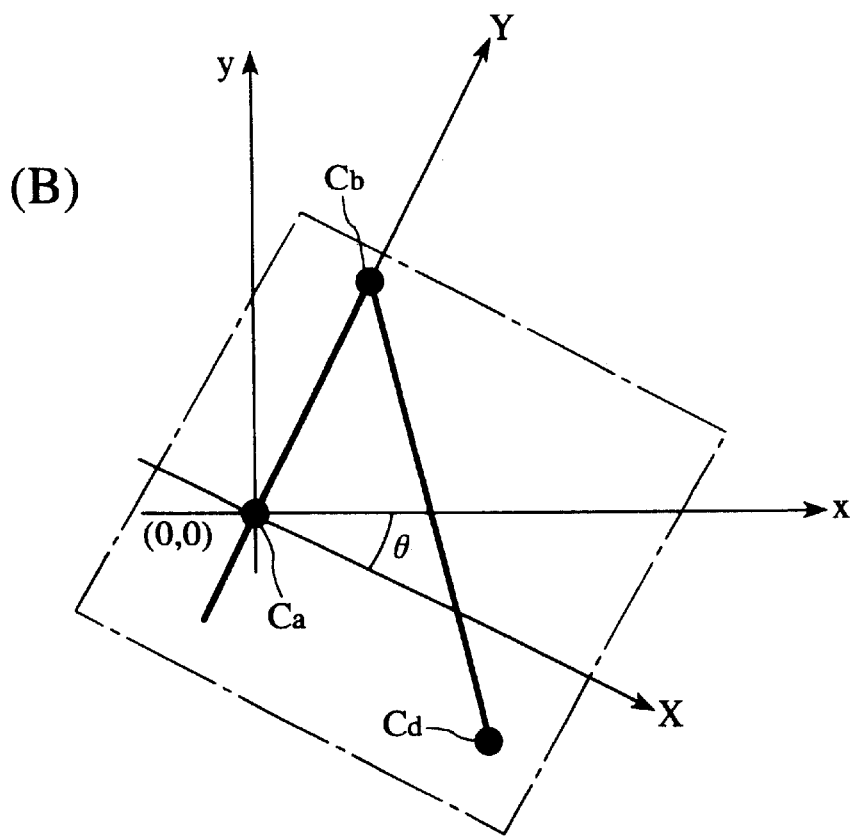
(B)

Fig. 19

| Types of Guidance Area | Types of Available Guidance |
|---|---|
| (1) Surrounding Area of Departure Point<br><br>(2) Surrounding Area of Destination<br><br>(3) Surrounding Area of Course-Change Point | (1) Recommended Route (indicated by only lines)<br><br>(2) Recommended Route (with detailed information)<br><br>(3) Detailed Information for Its Surrounding Area |
| Intermediate Sections | (1) Distance and Direction Information (information concerning the distance to the course-change point and the direction to be proceed at the course-change point)<br><br>(2) Detailed Information for The Intermediate Section |

Fig. 20

| Types of Available Guidance | Guidance Data |
|---|---|
| Recommended Route (indicated by only lines) | i) Image Data for The Searched Route and The Other Route<br>ii) Commonly Used Setting Data |
| Recommended Route (with detailed information) | i) Image Data for The Searched Route and The Other Route<br>ii) Voice Guidance Data<br>iii) Road Classification Data<br>iv) Data concerning The Width of Each Road<br>v) Commonly Used Setting Data |
| Detailed Information for Its Surrounding Area | i) Image Data for The Searched Route and The Other Route<br>ii) Voice Guidance Data<br>iii) Road Classification Data<br>iv) Data concerning The Width of Each Road<br>v) Directional Information Data<br>vi) Data for Lanes at The Intersection<br>vii) Data for The Landmarks<br>viii) Commonly Used Setting Data |
| Distance and Direction Information (information concerning the distance to the course-change point and the direction to be proceed at the course-change point) | Commonly Used Setting Data |
| Detailed Information for The Intermediate Section | i) Data for The Intersection Names<br>ii) Directional Information Data<br>iii) Data for Lanes at The Intersection<br>iv) Commonly Used Setting Data |

Fig. 26

| Selection of Type of Guidance Area | | Selection of Type of Available Guidance | |
|---|---|---|---|
| Surrounding Area of Departure Point | 1 | Recommended Route (indicated by only lines) | 1 |
| Surrounding Area of Destination | 0 | Recommended Route (with detailed information) | 0 |
| Surrounding Area of Course-Change Point | 1 | Detailed Information for Its Surrounding Area | 0 |
| Intermediate Sections | 1 | Distance and Direction Information | 1 |
| All | 0 | Detailed Information for The Intermediate Section | 0 |

| Selection of Type of Guidance Area | | Selection of Type of Available Guidance | |
|---|---|---|---|
| Surrounding Area of Departure Point | 1 | Recommended Route (indicated by only lines) | 1 |
| Surrounding Area of Destination | 1 | Recommended Route (with detailed information) | 0 |
| Surrounding Area of Course-Change Point | 1 | Detailed Information for Its Surrounding Area | 0 |
| Intermediate Sections | 0 | Distance and Direction Information | 0 |
| All | 0 | Detailed Information for The Intermediate Section | 0 |

(B)
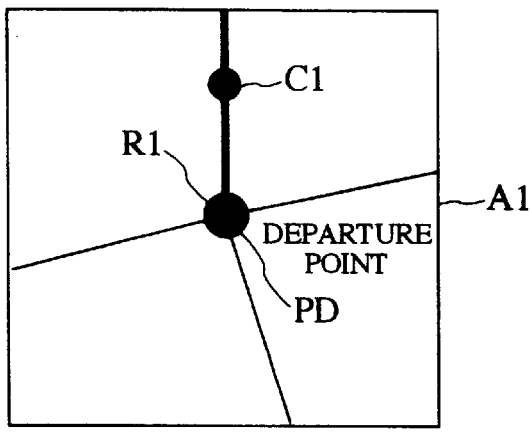

(C)
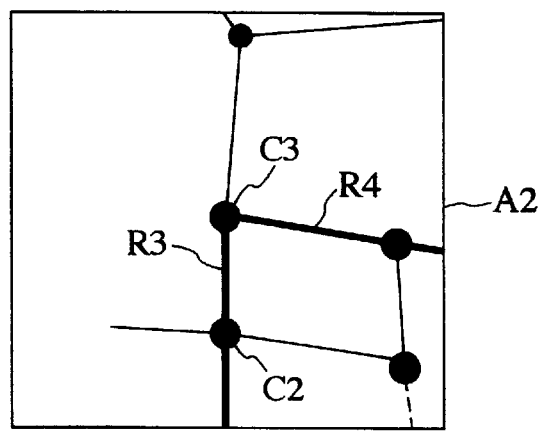

(D)
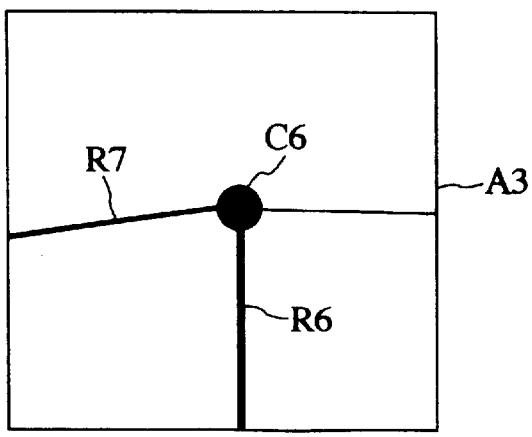

(E)
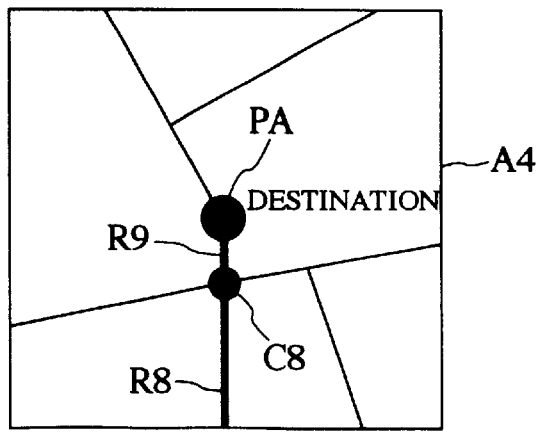

| Selection of Type of Guidance Area | | Selection of Type of Available Guidance | |
|---|---|---|---|
| Surrounding Area of Departure Point | 0 | Recommended Route (indicated by only lines) | 0 |
| Surrounding Area of Destination | 0 | Recommended Route (with detailed information) | 0 |
| Surrounding Area of Course-Change Point | 0 | Detailed Information for Its Surrounding Area | 0 |
| Intermediate Sections | 1 | Distance and Direction Information | 1 |
| All | 0 | Detailed Information for The Intermediate Section | 0 |

(B)

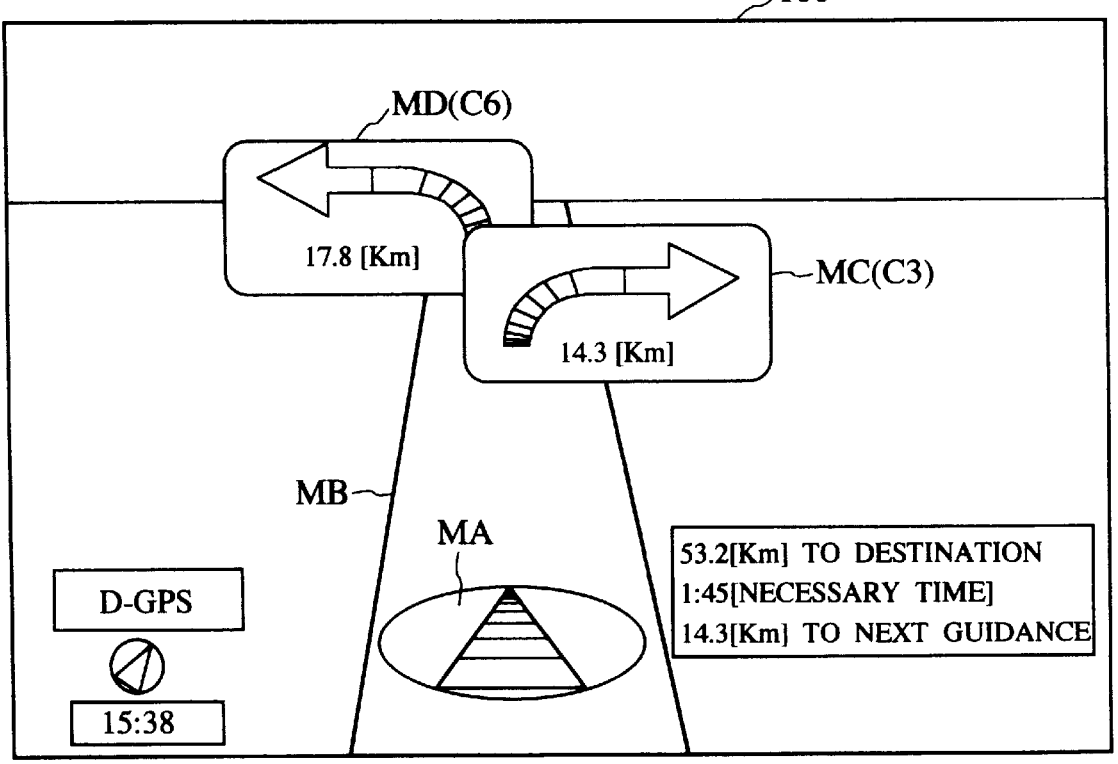

| Selection of Type of Guidance Area | | Selection of Type of Available Guidance | |
|---|---|---|---|
| Surrounding Area of Departure Point | 0 | Recommended Route (indicated by only lines) | 0 |
| Surrounding Area of Destination | 0 | Recommended Route (with detailed information) | 0 |
| Surrounding Area of Course-Change Point | 0 | Detailed Information for Its Surrounding Area | 0 |
| Intermediate Sections | 1 | Distance and Direction Information | 0 |
| All | 0 | Detailed Information for The Intermediate Section | 1 |

(B)

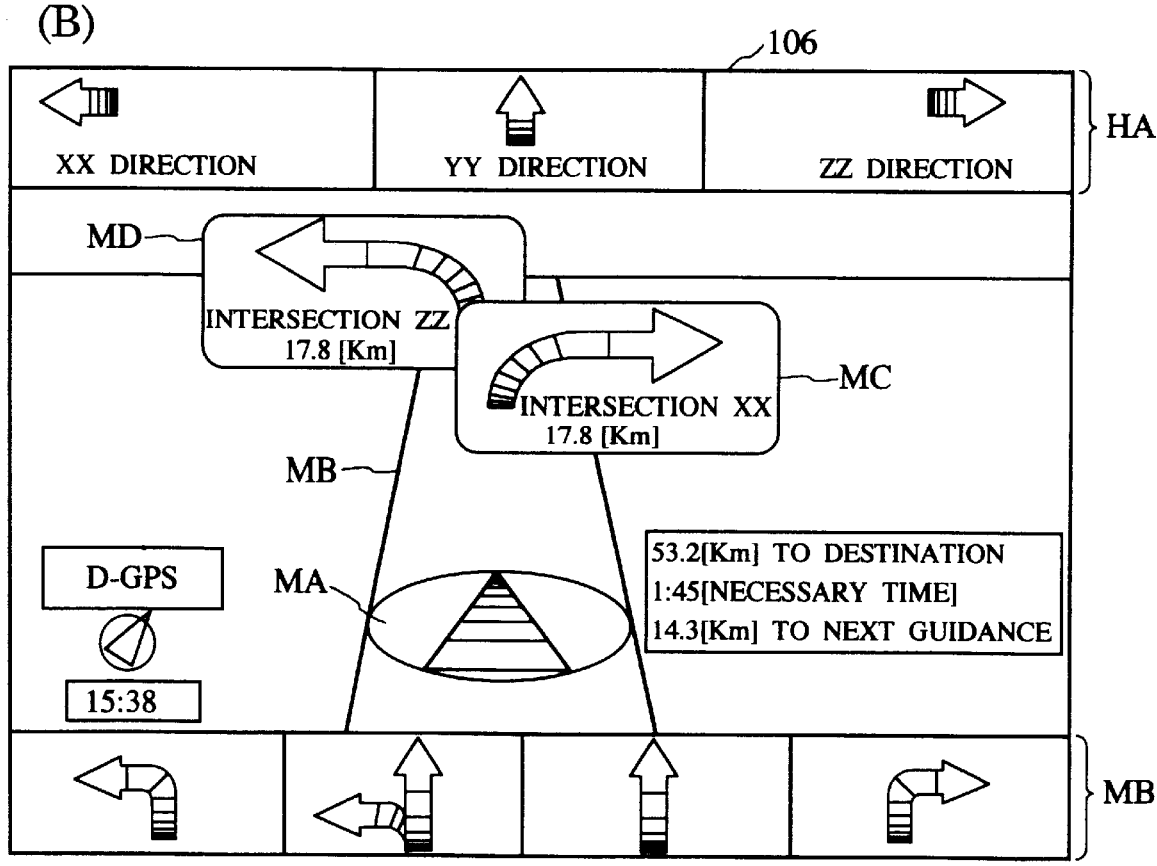

| Selection of Type of Guidance Area | | Selection of Type of Available Guidance | |
|---|---|---|---|
| Surrounding Area of Departure Point | 0 | Recommended Route (indicated by only lines) | 0 |
| Surrounding Area of Destination | 0 | Recommended Route (with detailed information) | 1 |
| Surrounding Area of Course-Change Point | 1 | Detailed Information for Its Surrounding Area | 0 |
| Intermediate Sections | 0 | Distance and Direction Information | 0 |
| All | 0 | Detailed Information for The Intermediate Section | 0 |

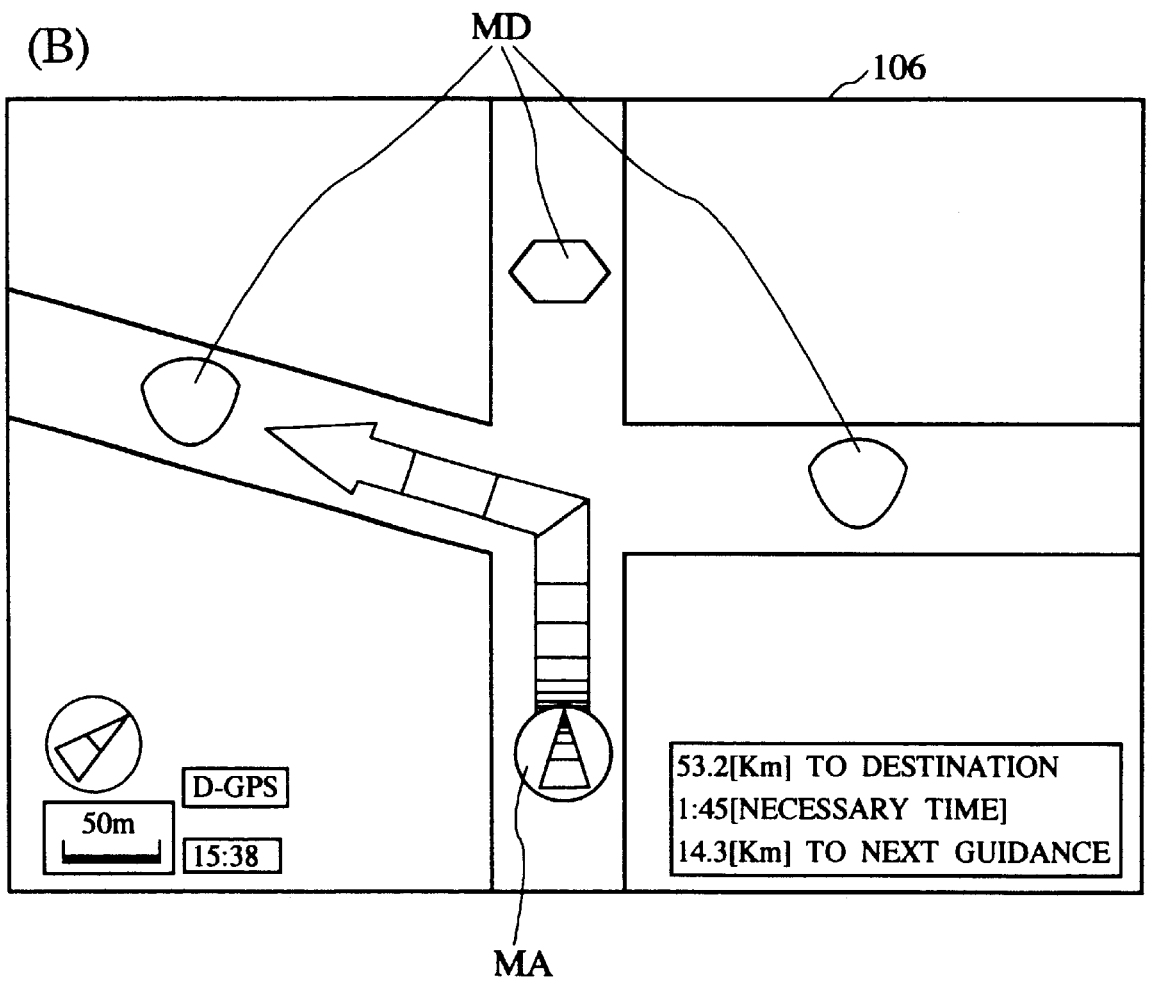

| Selection of Type of guidance Area | | Selection of Type of available guidance | |
|---|---|---|---|
| Surrounding Area of Departure Point | 0 | Recommended Route (indicated by only lines) | 0 |
| Surrounding Area of Destination | 0 | Recommended Route (with detailed information) | 0 |
| Surrounding Area of Course-Change Point | 1 | Detailed Information for Its Surrounding Area | 1 |
| Intermediate Sections | 0 | Distance and Direction Information | 0 |
| All | 0 | Detailed Information for The Intermediate Section | 0 |

(B)

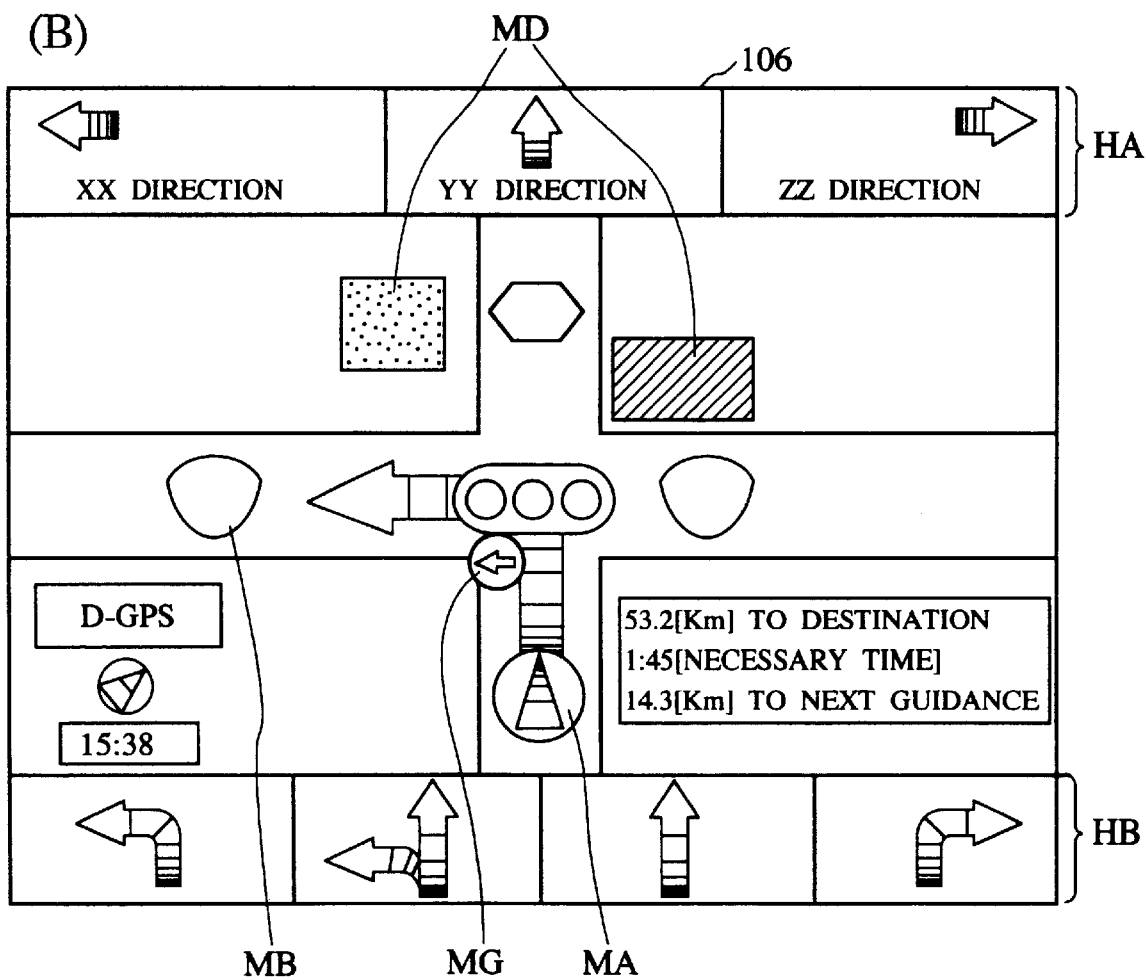

Fig. 40
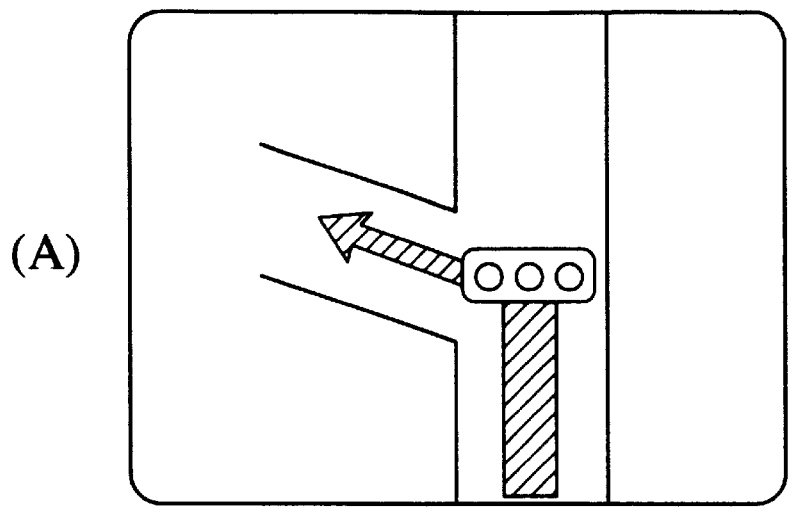
(A)
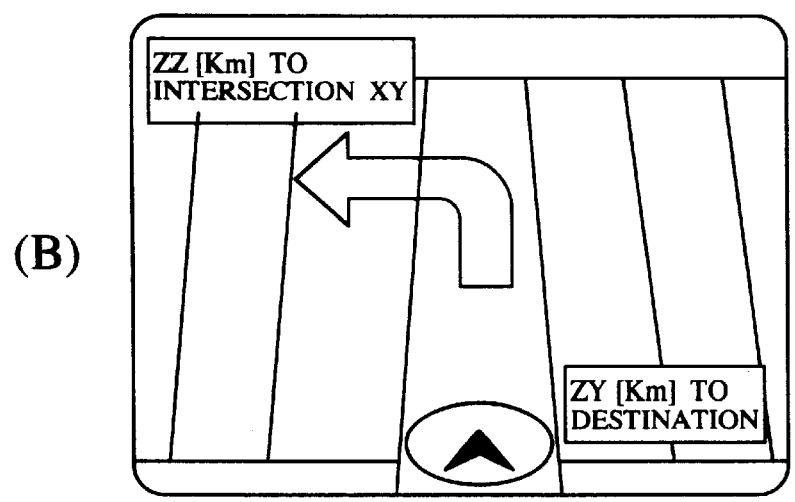
(B)
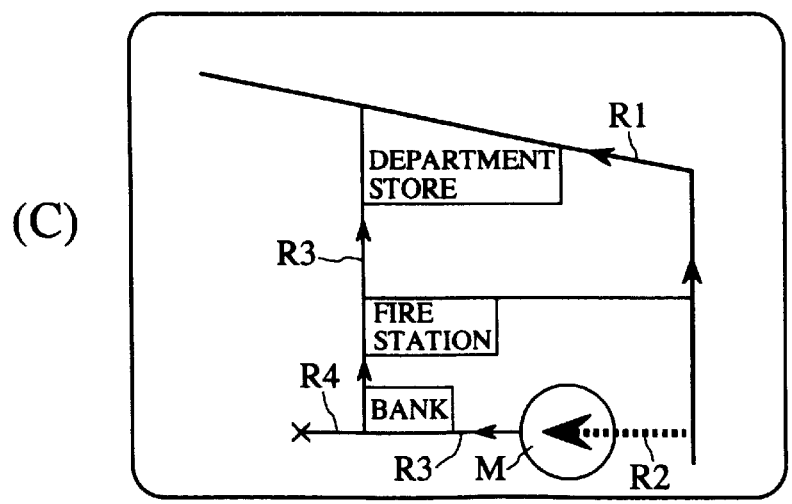
(C)

COMMUNICATIONS NAVIGATION SYSTEM, AND NAVIGATION BASE APPARATUS AND VEHICLE NAVIGATION APPARATUS BOTH USED IN THE NAVIGATION SYSTEM

BACKGROUND OF THE INVENTION

1. Field of the Invention

The present invention relates to a communications navigation system in which navigation data necessary for route guidance is supplied from a navigation base to a moving body such as a vehicle, and also relates to a navigation base apparatus provided at the navigation base and a navigation apparatus to be mounted on the vehicle (hereinafter, referred to as "vehicle navigation apparatus" or "navigation apparatus") for use in the communications navigation system.

2. Description of the Prior Art

In the navigation systems commonly used today, a vehicle such as an automobile is provided with a navigation apparatus, for instance. In such navigation systems, route guidance is carried out by utilizing map data stored in a CD-ROM or the like provided in connection with the navigation apparatus. However, such systems require the user thereof to constantly buy new CD-ROMs in order to obtain new information on changing conditions such as the construction of new roads and the abolition of old roads. Further, when the type of recording medium is changed (e.g., to DVD-ROM) or when a different format is used with the same type of recording medium, the navigation apparatus must be replaced with other one that is suited for such new type of recording medium or format.

In view of such problems, Japanese Laid-Open Patent Application No. HEI 10-19588 discloses a communications navigation system in which map images and optimum route data necessary to guide a vehicle to a destination are transmitted from a navigation base (center) to a vehicle such as an automobile. Namely, in this system, communication is carried out between a data transmission system in the navigation base and a vehicle navigation apparatus mounted on the vehicle. In this regard, the data transmission system includes a data base which stores data necessary for guiding a vehicle to a destination, and based on a request from the vehicle navigation apparatus, the data transmission system reads out necessary data from the data base to produce map images. Further, the data transmission system carries out a route search to produce optimum route data. After these operations are completed, the data transmission system transmits data such as the produce map image data and optimum route data to the vehicle navigation apparatus. Then, the vehicle navigation apparatus displays guidance information based on the map image data and optimum route data transmitted from the data transmission system.

In the above-described communications navigation system, all of route data and map image data from the departure point to the destination produced at the navigation base are transmitted to the vehicle navigation apparatus of the vehicle as they are. In the vehicle, map images corresponding to the present position of the vehicle are successively displayed on the display of the vehicle navigation apparatus allover the route including the departure point and the destination.

However, the above-described communications navigation system involves the following problems.

First, as described above, in the above-described communications navigation system, all of the route data and map images from the departure point to the destination are transmitted to the vehicle. Therefore, the amount of the data to be transmitted becomes huge if the distance between the departure point and the destination is long, so that it takes a long time to transmit the data. Further, it is necessary for the navigation apparatus to temporally store the huge amount of the transmitted data. However, actually, the driver of the vehicle does not always view the display of the navigation apparatus while driving. In most cases, the driver needs to have assistance of the navigation apparatus at the main points of the route such as intersections to be turned to right or left and the like. Thus, with regard to intersections through which the driver is to proceed straight, it is not necessary for the driver to make reference to the vehicle navigation apparatus. This means that it is possible to carry out navigation if there are route data (guidance information) and map images only for the main points of the route at which guidance is needed, such as the intersections and forks where the driver is to turn right or left. Further, if the navigation base is adapted to transmit only such data necessary for guidance to the vehicle, it becomes possible to shorten a time necessary for the data transmission and considerably reduce the amount of data to be stored in the vehicle navigation apparatus, and this in turn makes it possible to simplify the structure of the vehicle navigation apparatus.

Further, there is a case that the driver knows the recommended route very well. In such a case, it is sufficient for the driver if a simple map image of the route is obtained, and such a simple route guidance may be more preferable to the driver.

Moreover, in the above-described communications navigation system, if the vehicle strays from the recommended route to the destination, it will not be possible to continue route guidance. In such a case, the driver of the vehicle has to transmit the current position and destination data to the navigation base again. Then, the navigation base carries out route search to the destination again based on the current position and destination data and establishes another recommended route, and then transmits its data to the vehicle so that guidance is carried out again after such recommended route is received by the vehicle navigation apparatus. Consequently, because route guidance to the destination is suspended for a short period of time, driver distress can occur.

On the other hand, even in the case where the vehicle navigation apparatus is provided with the map data stored in the CD-ROM or the like, it becomes no longer possible to continue route guidance once the vehicle strays from the established recommended route. In such a case, similar to the above situation, it is necessary to carry out a route search again using the CD-ROM to locate another recommended route to the destination. However, this also requires suspension of route guidance during the time another route is being searched, so that driver distress may occur.

SUMMARY OF THE INVENTION

The present invention has been made in view of the problems described above. Accordingly, an object of the present invention is to provide a communications navigation system which can reduce an amount of data to be transmitted from a navigation base to a moving body such as a vehicle.

Another object of the present invention is to provide a communications navigation system which is able to carry out a satisfactory route guidance even if the amount of data to be transmitted to the moving body is reduced.

Other object of the present invention is to provide a communications navigation system which can simplify the structure of a vehicle navigation apparatus.

The other object of the present invention is to provide a communications navigation system which can reduce an amount of data to be transmitted from the navigation base to the moving body by transmitting only navigation data requested from the movable body.

Further other object of the present invention is to provide a communications navigation apparatus in which route guidance is not interrupted or suspended even in the case where the a vehicle would deviate from or strays from the recommended route to the destination.

In view of these objects as described above, the present invention is directed to a communications navigation system in which data is transmitted and received between a navigation base apparatus provided at a navigation base and a navigation apparatus provided in a moving body such as a vehicle using communication, in which the navigation apparatus is adapted to transmit at least data concerning the current position of the vehicle and the destination thereof to the navigation base apparatus, and the navigation base apparatus stores navigation data in its data base and is adapted to determine a recommended route based on the transmitted data of the current position of the vehicle and the destination thereof and then extract data of the recommended route from the navigation data stored in the data base and transmit the extracted data to the navigation apparatus, wherein the navigation base apparatus is adapted to be able to extract detailed navigation data only for a surrounding areas of a specified point on the recommended route from the navigation data stored in the data base and then transmit the detailed navigation data to the navigation apparatus.

For the specified point, one of a departure point, a destination and a course-change point which are located on the recommended route is selected.

According to the communications navigation system of the present invention as described above, the amount of data to be transmitted from the navigation base apparatus to the navigation apparatus is reduced. Further, because this makes it possible to reduce the memory capacity of the navigation apparatus, it becomes possible to simplify the navigation apparatus. Furthermore, even with such a reduced amount of data, the navigation system described above makes it possible to carry out a precise route guidance.

In this invention, it is preferred that the specified point is established automatically at the navigation base apparatus. Alternatively, it is possible that the specified point is selectable desirously at the navigation apparatus.

Further, it is preferred that the surrounding area of the specified point is established automatically at the navigation base apparatus. Alternatively, it is possible that the surrounding area of the specified point is adapted to be determined desirously at the navigation apparatus.

Furthermore, it is also preferred that the detailed navigation data for the course-change point of the specified point includes data for return route for returning the vehicle to the recommended route when the vehicle strays from the recommended route.

According to this, it is possible to continue route guidance even in the case where the vehicle strays from the recommended route, so that it is possible to prevent driver distress even in the case where the vehicle strays from the recommend route.

In the present invention, it is preferred that the navigation data includes at least one of map data, road data, intersection data, area guidance data and voice guidance data.

In the communications navigation system as described above, it is preferred that the navigation base apparatus is adapted to transmit the detailed navigation data to the navigation apparatus when the vehicle is around the specified point on the recommended route and transmit simple navigation data when the vehicle is in an intermediate section between the specified points.

Another aspect of the present invention is directed to a navigation base apparatus used in a communications navigation system in which data is transmitted and received between the navigation base apparatus provided at a navigation base and a navigation apparatus provided in a moving body such as a vehicle using communication, in which the navigation apparatus is adapted to transmit at least data concerning the current position of the vehicle and the destination to the navigation base apparatus, and the navigation base apparatus stores navigation data and is adapted to determine a recommended route based on the transmitted data of the current position of the vehicle and the destination thereof and then extract data for the recommended route from the stored navigation data and transmit the extracted data to the navigation apparatus, wherein the navigation base apparatus is adapted to be able to extract detailed navigation data only for a surrounding area of a specified point on the recommended route from the navigation data stored in the data base and then transmit the detailed navigation data to the navigation apparatus.

The other aspect of the present invention is directed to a navigation apparatus used in a communications navigation system in which data is transmitted and received between a navigation base apparatus provided at a navigation base and the navigation apparatus provided in a moving body such as a vehicle using communication, in which the navigation apparatus is adapted to transmit at least data concerning the current position of the vehicle and the destination to the navigation base apparatus, and the navigation base apparatus stores navigation data and is adapted to determine a recommended route based on the transmitted data of the current position of the vehicle and the destination thereof and then extract data for the recommended route from the stored navigation data and transmit the extracted data to the navigation apparatus, wherein the navigation apparatus is adapted to receive from the navigation base apparatus detailed navigation data only for a surrounding area of a specified point on the recommended route which is extracted from the navigation data stored in the navigation base apparatus based on the received data concerning the current position of the vehicle and the destination thereof.

In this aspect, it is preferred that that the navigation apparatus further comprises memory means for storing the received navigation data from the navigation base apparatus.

The other aspect of the present invention is directed to a communications navigation system in which data is transmitted and received between a navigation base apparatus provided at a navigation base and a navigation apparatus provided in a vehicle using communication, in which the navigation apparatus is adapted to transmit at least data concerning the current position of the vehicle and the destination to the navigation base apparatus, and the navigation base apparatus stores navigation data and is adapted to determine a recommended route based on the transmitted data of the current position of the vehicle and the destination thereof and then extract data of the recommended route from the stored navigation data and transmit the extracted data to the navigation apparatus, wherein the navigation apparatus is adapted to be able to select data to be received from the navigation base apparatus, and the navigation base apparatus is adapted to extract the selected data from the navigation data and then transmit the extracted data to the navigation apparatus.

Further aspect of the present invention is directed to a method for guiding a vehicle using a communications navigation system in which data is transmitted and received between a navigation base apparatus provided at a navigation base and a navigation apparatus provided in the vehicle using communication, in which the navigation apparatus is adapted to transmit at least data concerning the current position of the vehicle and the destination to the navigation base apparatus, and the navigation base apparatus stores navigation data and is adapted to determine a recommended route based on the transmitted data of the current position of the vehicle and the destination thereof and then extract data of the recommended route from the stored navigation data and transmit the extracted data to the navigation apparatus, wherein the method comprising the steps of:
transmitting detailed navigation data from the navigation base apparatus to the navigation apparatus when the vehicle is in or around a specified point on the recommended route; and
transmitting simple navigation data from the navigation base apparatus to the navigation apparatus when the vehicle is in an intermediate section between the specified points.

In this method, it is preferred that the specified point include one of a departure point, a destination and a course-change point which are located on the recommended route.

Further aspect of the present invention is directed to a communications navigation system in which data is transmitted and received between a navigation base apparatus provided at a navigation base and a navigation apparatus provided in a moving body such as a vehicle using communication, in which the navigation apparatus is adapted to transmit at least data concerning the current position of the vehicle and the destination thereof to the navigation base apparatus, and the navigation base apparatus has navigation data storing means which stores navigation data and is adapted to determine a recommended route based on the received data of the current position of the vehicle and the destination thereof and extract data of the recommended route from the navigation data stored in the navigation data storing means, and then transmit the extracted data to the navigation apparatus. This navigation base apparatus further comprises means for transmitting to the navigation apparatus data for return route for returning the vehicle to the recommended route when the vehicle has strayed from the recommended route.

Preferably, the recommended route includes a plurality of intersections and/or forks, in which the return route data transmitting means is adapted to transmit data of a return route for returning the vehicle to one of the intersections and/or forks on the recommended route.

In this case, it is preferred that the return route is a route for returning the vehicle to the intersection or the fork at which the vehicle should have made a course change.

Further, it is also preferred that the return route may be determined taking the distance to the recommended route into account. Alternatively, the return route may be determined taking the distance to the destination into account.

Other objects, structures and advantages of the present invention will be apparent when the following detailed description of the preferred embodiments will be considered taken in conjunction with the accompanying drawings.

BRIEF DESCRIPTION OF THE DRAWINGS

FIG. 2(A) and FIG. 2(B) are tables which show examples of contents of road data and intersection data, respectively, which are stored in a data base of a navigation base apparatus.

FIGS. 5(A), 5(B) and 5(C) are tables which respectively show examples of contents of the searched route data.

FIGS. 7(A), 7(B), 7(C) and 7(D) are tables which respectively show an example of contents of navigation data to be transmitted to the navigation vehicle apparatus.

FIGS. 9(A) and 9(B) are illustrations which respectively show an example of a route outline map and an example of a map of a surrounding area of a departure point.

FIGS. 10(A) and 10(B) are illustrations which respectively show an example of a displayed image for an intermediate section on the searched route and an example of an enlarged displayed image for an intersection.

FIG. 13(A) and FIG. 13(B) are diagrams for explaining a method for establishing a surrounding area which is capable of map matching, respectively.

FIGS. 17(A) and 17(B) are diagrams which respectively show a method for producing the simple map.

FIG. 19 is a table which shows selectable guidance items at the vehicle navigation apparatus.

FIG. 20 is a table which shows the relationship between the selectable items shown in FIG. 19 and the corresponding guidance data stored in the navigation base apparatus.

FIG. 26 is a table which shows one example of selectable guidance items.

FIG. 28(A) is a table which shows one example of thee selected guidance items, and FIGS. 28(B)–28(D) respectively show examples of the corresponding displayed map images.

FIG. 29(A) is a table which shows another example of the selected guidance items, and FIG. 29(B) shows an example of the corresponding displayed map image.

FIG. 30(A) is a table which shows other example of the selected guidance items, and FIG. 30(B) shows an example of the corresponding displayed map image.

FIG. 31(A) is a table which shows the other example of the selected guidance items, and FIG. 31(B) shows an example of the corresponding displayed map image.

FIG. 32(A) is a table which shows yet other example of the selected guidance items, and FIG. 32(B) shows an example of the corresponding displayed map image.

FIGS. 40(A), 40(B) and 40(C) are respectively illustrations of examples of displayed images in the vehicle navigation apparatus according to the third embodiment.

DETAILED DESCRIPTION OF THE PREFERRED EMBODIMENTS

First Embodiment

Hereinbelow, a detailed description of the first embodiment of the present invention will be given with reference to the accompanying drawings. In this connection, it should be noted that the following description will be made for the case in which the present invention is applied to a communications navigation system in which a vehicle such as an automobile is used as "the moving body". Further, the following description will focus mainly on the operation of route guidance for guiding a vehicle to a destination.

(1) Overall Structure

Hereinafter, with reference to FIG. 1, a description of the overall structure of a first embodiment of a navigation system according to the present invention will be given.

Figure 1:
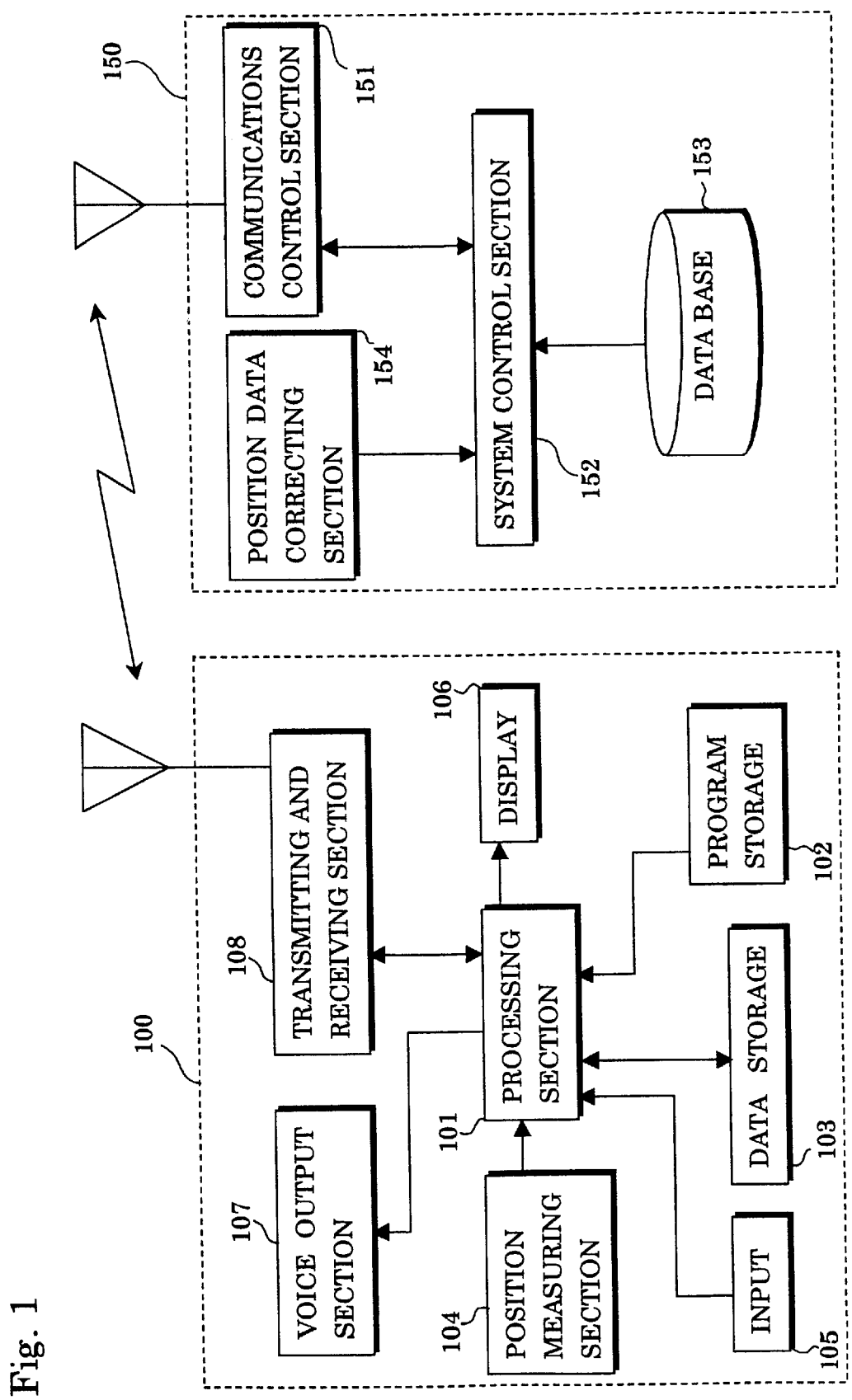
FIG. 1 is a block diagram which shows first embodiment of a communications navigation system according to the present invention.

FIG. 1 is a block diagram of an overall structure of a communications navigation system of the first embodiment of the present invention. The navigation system of this embodiment is generally comprised of a navigation base apparatus 150 arranged at a base and a vehicle navigation apparatus 100 mounted in a vehicle as a movable body.

First, a general outline of the communications navigation system of the first embodiment will be given. Namely, in this system, the navigation base apparatus 150 at a base carries out a route search using data stored in a data base in response to the information concerning the present position of he vehicle and the destination thereof, and then extracts data of points where course changes such left or right turns occur in such route (course-change points). Next, detailed data for the surrounding area around such course-change points is transmitted to the vehicle navigation apparatus 100 mounted in the vehicle.

Then, at the vehicle, guidance is carried out based on the navigation data (including guidance data and route data) transmitted from the navigation base apparatus 150 through displayed map images and/or voice guidance massages. In this type of route guidance, detailed information is given for areas at and around course-change points (and departure point and destination, if necessary), but all other areas and points along the route being simplified.

In this way, because a route search is carried out in the navigation base apparatus 150 and not carried out in the vehicle navigation apparatus 100, there is no need for the vehicle navigation apparatus 100 to store map data or other data. This makes it possible to simplify the structure of the vehicle navigation apparatus 100. Further, because the navigation base apparatus 150 transmits only essential data necessary for route guidance, it becomes possible to reduce the amount of data to be transmitted from the navigation base apparatus 150 to the vehicle navigation apparatus 100. However, because detailed guidance data about a course-change point and a surrounding area thereof is transmitted from the navigation base apparatus 150 to the vehicle navigation apparatus 100, it is possible to carry out necessary route guidance.

Next, a description will be given for the navigation base apparatus 150.

As shown in FIG. 1, the navigation base apparatus 150 is generally comprised of a communications control section 151, a system control section 152, a data base 153 which stores various navigation data and a position correcting section 154.

The communications control section 151 is equipped with devices such as a modem and a terminal adapter which function as communication devices in order to receive information from and transmit information to the vehicle navigation apparatus. 100. For this purpose, it is possible to utilize various communication means such as car phones, portable telephones, PHS (Personal Handy-phone System) or the like.

The system control section 152 is constructed from a processing unit including a CPU and memories and the like.

The memories store the various programs which are to be carried out in the navigation base apparatus 150, such as a program for searching routes from the departure point to the destination and a program for extracting the navigation data such as route/guidance data to be transmitted to the vehicle navigation apparatus 100. Further, the memory of the system control section 152 also has a work area to be used upon executing such programs.

The data base 153 is constructed from a large capacity storage medium such as a hard disk or the like, and stores various navigation data such as data for displaying routes, data for searching routes, data for route guidance and data necessary for carrying out route search and route guidance and the like. In more details, the data stored in the data base 153 is as follows, for example.

(i) Map Data:

This data is used for displaying map on the display 106 of the vehicle navigation apparatus 100.

(ii) Road Data:

This data includes various information such as road number, number and position of the nodes established on each road using Longitude and Latitude thereof, road name, road classification, road length and images of the roads (see FIG. 2(A)). In this connection, the image of each road may be formed from vector data using a plurality of coordinate data or bitmapped image data.

(iii) Intersection Data:

This data includes information such as intersection number, intersection name, position of the intersection using Longitude and Latitude thereof, voice data for guiding to the specific direction at the intersection, and landmarks which can be utilized as guidance marks such as buildings or the like (see FIG. 2(B)). In this connection, the classification intersections also includes forks.

(iv) Search Data:

This data is used for specifying the position (which is defined by Longitude and Latitude thereof) of the destination on the basis of information such as a telephone number, address, name of the destination and the like.

The position correcting section 154 is provided for correcting a position data which has been measured by a GPS at the vehicle (or by a hybrid navigation system which uses GPS and an self-contained navigation system) and then is transmitted to the navigation base apparatus 150. Then, the position data correcting section 154 of the navigation base apparatus 150 corrects the current position data of the vehicle using differential GPS (D-GPS). Such correction can be carried out in the vehicle navigation apparatus 100, but it is preferred that such a correcting section be provided in the navigation base apparatus 150 since this makes it possible to simplify the components of the vehicle navigation apparatus 100.

Next, a description will be given for the vehicle navigation apparatus 100.

As shown in FIG. 1, the vehicle navigation apparatus 100 is generally comprised of a processing section 101, a program storage section 102, a data storage section 103, a position measuring section 104, an input 105, a display 106, a voice output section 107, and a transmitting and receiving section 108.

The processing section 101 is provided with a CPU as its main component.

The program storage section 102 serves as a memory for storing programs which will be executing by the processing section 101, such as a program for displaying routes on the display 106 based on route/guidance data transmitted from the navigation base apparatus 150 and a program for outputting a route guidance voice via the voice output section 107.

The data storage section 103 functions as a working area used during the program execution, and stores data such as follows:

(i) Route/guidance data (route data and guidance data) which is transmitted from the navigation base apparatus 150.

(ii) ID data of an individual vehicle (iii) Vehicle position data (defined by Longitude and Latitude) which is measured by the position measuring section 104.

The vehicle position data includes a current position data measured by the position measuring section 104 at predetermined time intervals as well as a plurality of past position data. The vehicle position data can include, for example, position data for measurement points within a predetermined distance or position data for a predetermined number of measurement points. In this arrangement, when a new measurement is carried out by the position measuring section 104, the position data of such new measurement is stored, while the stored oldest position data is erased. Further, by connecting points identified by this plurality of position data, it becomes possible to obtain the travel path of the vehicle. As will be described below, the travel path of the vehicle is utilized in "map matching" to identify the road along which the vehicle is traveling.

The position measuring 104 utilizes GPS and/or the like to measure the position of the vehicle. Namely, the position measuring 104 is equipped with a GPS receiver to measure the absolute position of the vehicle on the basis of signals received from a plurality of GPS satellites. Further, the position measuring 104 is further equipped with sensors such as a speed sensor and an azimuth sensor to measure the relative position of the vehicle. These speed sensor and azimuth sensor are used to carry out self-contained navigation. In this connection, the relative position measured by such sensors can be used to obtain the position of the vehicle when the GPS receiver is unable to receive signals from the GPS satellites (e.g., when the vehicle is running inside a tunnel or the like), or the relative position can also be used to correct position measurement errors in the absolute position measured by the GPS receiver.

The input 105 includes devices such as various switches, a touch panel provided on the display 106, a remote control input device, and a data input device using voice recognition. With the touch panel, in order to input corresponding data and commands, an user can use a finger or the like to touch an icon or the like displayed on the screen of the display 106. With the data input device which uses voice recognition, the user can use his/her voice to input corresponding data and commands.

The display 106 Includes a liquid crystal display or CRT (Cathode-Ray Tube) display unit which is equipped with the touch panel as described above.

The transmitting and receiving section 108 serves as communications device for transmitting data to and receiving data from the navigation base apparatus 150, and includes devices such as a modem and the like. In this connection, the transmitting and receiving section 108 may utilize systems such as car phones, portable phones PHS or the like.

(2) Operations of the Navigation Base Apparatus

Figure 3:
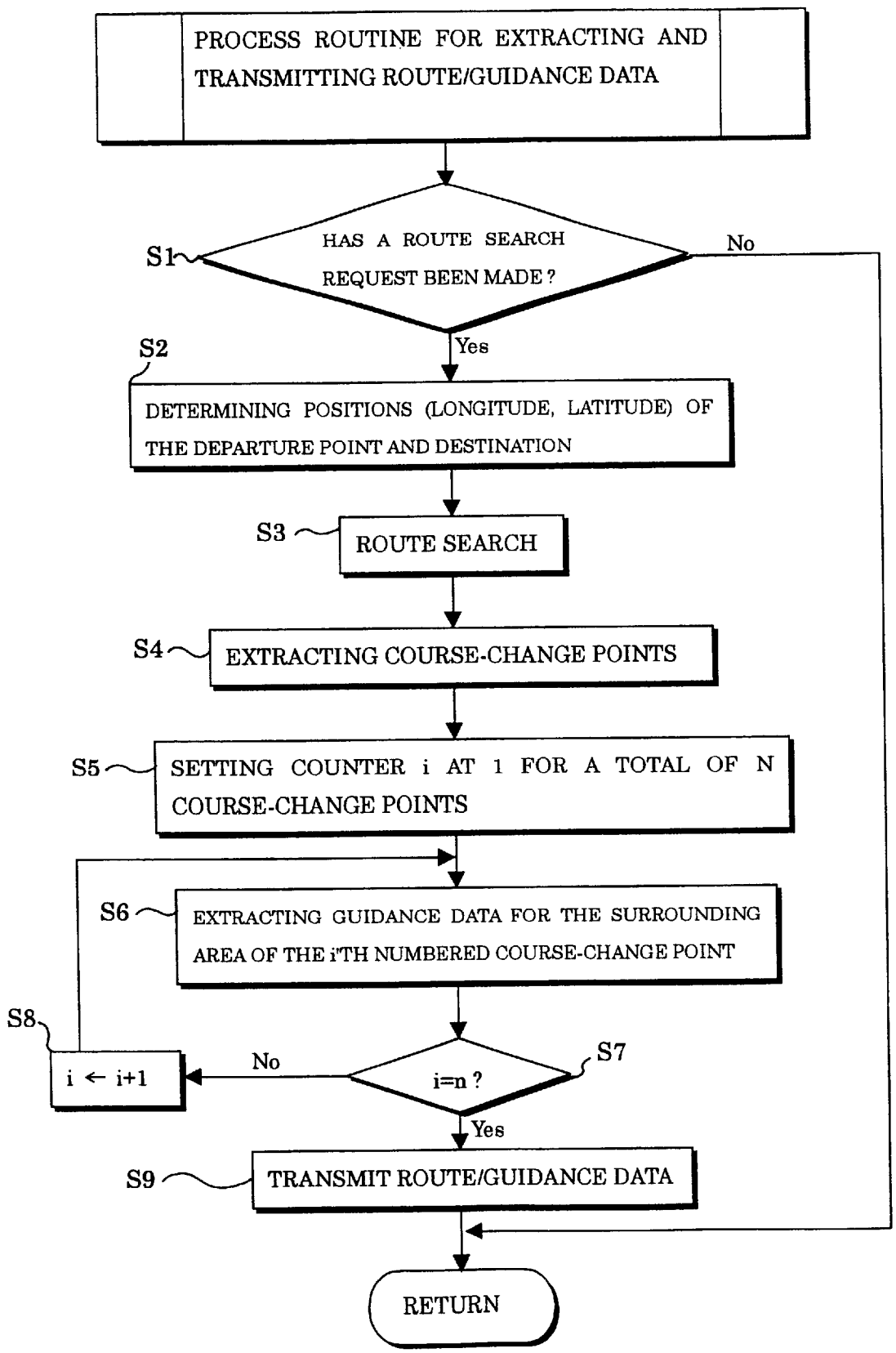
FIG. 3 is a flow chart which shows operation of the navigation base apparatus.

Hereinafter, with reference to FIG. 3, a description will be made with regard to the operations of the navigation base apparatus 150. FIG. 3 is a flow chart showing the process performed in the navigation base apparatus 150 for extracting the route/guidance data and then transmitting it.

(2-1) Determining Departure Point and Destination

First, a description will be given for the operation of determining the departure point and destination required for a route search.

In this case, the vehicle navigation apparatus 100 transmits information such as the vehicle ID, the current position of the vehicle (defined by Longitude and Latitude thereof) and destination data (e.g., telephone number of the facilities and address of the facilities at the destination) to the navigation base apparatus 150, in addition to a request for a route search. Such information is received by the communications control section 151 of the navigation base apparatus 150, and then sent to the system control section 152. Then, a judgement as to whether or not a route search request has been received is carried out in the system control section 152 (Step S1), and in this case the "YES" judgement is made.

Next, the departure point and the destination are determined in the system control section 152 (Step S2). In establishing the departure point for a route search, the current position data of the vehicle transmitted from the vehicle navigation apparatus 100 undergoes correction by the position data correcting section 154, if necessary. Then, based on such corrected position data, the current position of the vehicle or an intersection close to the current position is established as the departure point.

On the other hand, in establishing the destination, the position data of the facility corresponding to the telephone number or the address transmitted from the vehicle navigation apparatus 100 is extracted from the data base 153. Then, such extracted facility position or an intersection close to such facility position is established as the destination for a route search. In the case where a plurality of facilities are extracted as the destination, such fact is transmitted to the vehicle as described below to request that any one of the searched destinations should be selected.

(2-2) Recommended Route Search

Next, the system control section 152 executes a route search program, so that a search is carried out to locate a recommended route between the established departure point and the established destination using the position data of the departure point and destination (Step S3).

In this connection, as for the method for the recommended route search, various methods are known. Examples of such methods include a method obtaining a recommended route having the shortest distance between the departure point and the destination; a method obtaining a recommended route having the shortest travel time; a method taking intermediate passage points through which the vehicle will travel into account; a method taking traffic jam data and road construction data obtained by VICS (Vehicle Information & Communication System) or the like into account; and the like.

Figure 4:
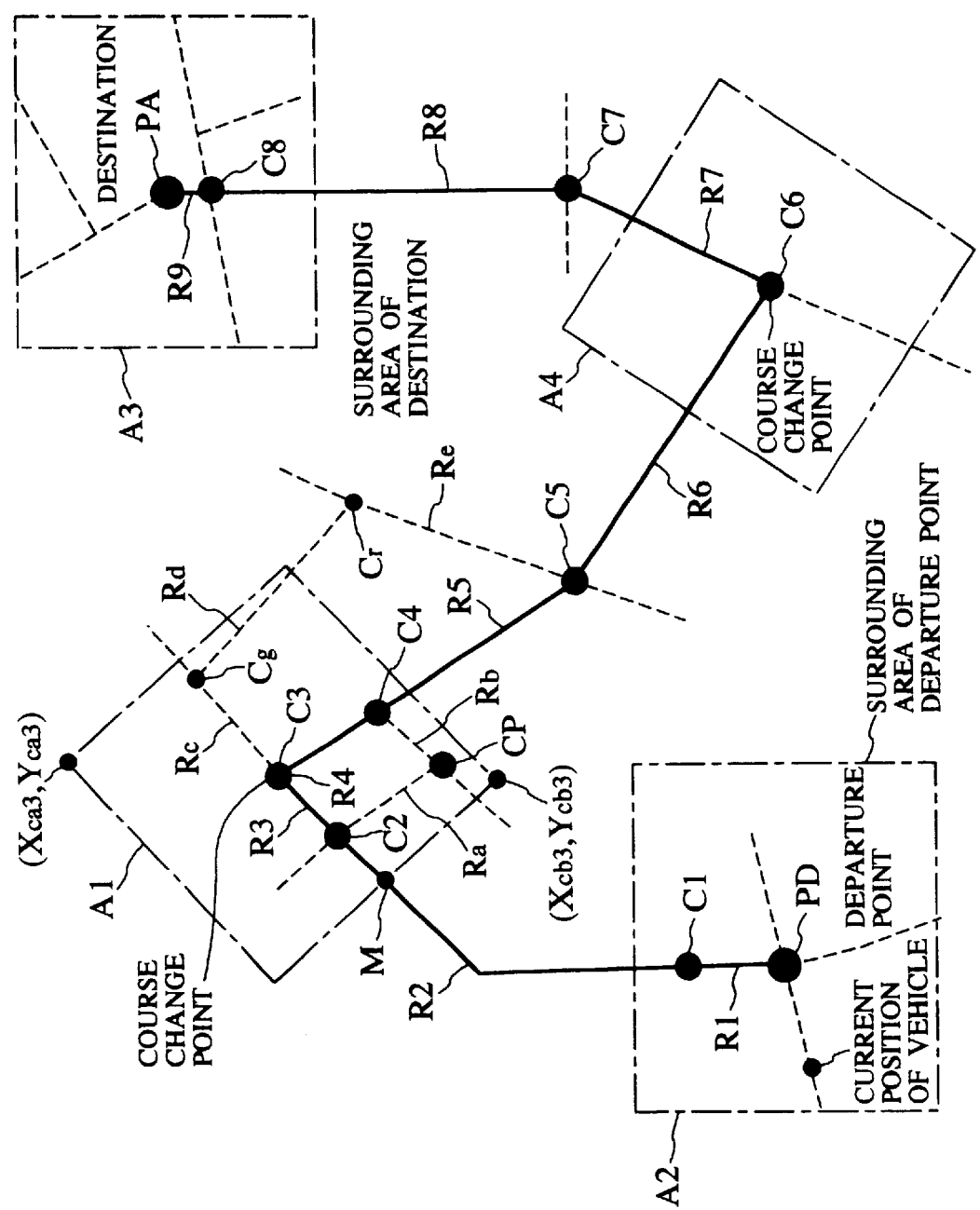
FIG. 4 is a diagram which shows an example of a searched recommended route.

The searched route (that is, recommended route) is represented by the numbers of the intersections and roads which exist along the searched route between the departure point and the destination. In this connection, FIG. 4 shows an example of a route searched by the system control section 152. In this figure, the solid line indicates the searched route, wherein R1 to R9 represent the road numbers and C1 to C8 represent the intersection numbers. For example, R2 represents the road number of the road between the intersections C1 and C2. The other roads are designated in a similar manner.

Now, as shown in FIG. 2(A), the road data corresponding to each road number includes information such as road distance and node point data for tracing roads. Further, as shown in FIG. 2(B), the intersection data corresponding to each intersection number includes information such as position data and intersection name. Each data shown in FIGS. 2(A) and 2(B) are stored in the data base 153 together with the data of the road number and the intersection number.

In this connection, FIG. 5(A) shows each of the road numbers for the searched route, FIG. 5(B) shows each of the intersection numbers for the searched route. Further, FIG. 5(C) shows the relationship of the roads which enter and exit each intersection. These results are temporarily reserved in the system control section 152.

(2-3) Course-Change Points Search (Intersection Judgement Process)

Next, an intersection judgement process is carried out in the system control section 152 to determine as to whether or not the searched intersections on the searched route are course-change points. In this connection, the course-change points include intersections and forks at which vehicle should change a course, or at which vehicle should turn right or left. Further, the total number of such course-change points on the searched route is counted in the system control section 152 (Step S4).

The course-change point Judgement is carried out for all intersections existing on the searched route by determining whether or not the path of the vehicle into and out of each intersection is a straight or gently curving path. Namely, when the angle between the road entering the intersection (entrance road) and the road exiting the intersection (exit road) is below a predetermined value, an intersection is judged to be a course-change point.

Figure 6:
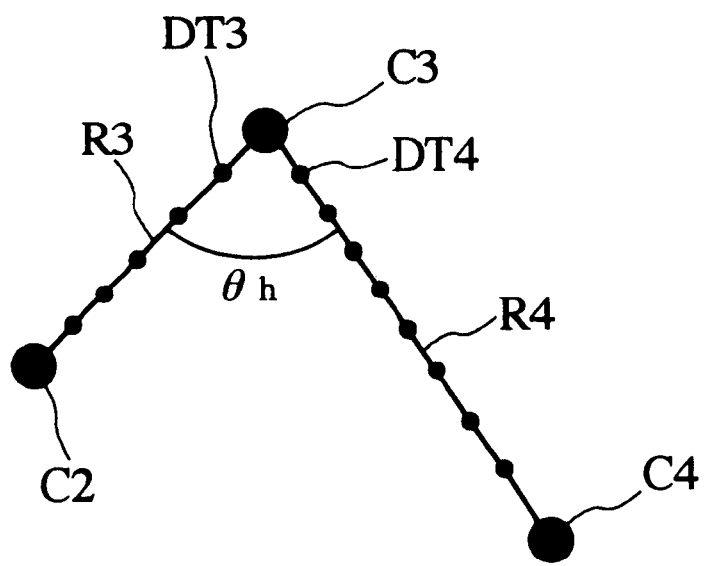
FIG. 6 is a diagram which shows a method for determining a course-change point.

FIG. 6 shows an example of the process in which a judgement is made as to whether or not the intersection C3 shown in FIG. 4 is a course-change point. In FIG. 4, R3 designates the road entering the intersection C3 (that is, the entrance road to the intersection C3), and R4 designates the road exiting the intersection C3 (that is, the exit road from the intersection C3). In this connection, in the system control section 152, each data for the entrance road R3 and the exit road R4 are obtained from data shown in FIG. 5(C).

As described above, each data shown in FIGS. 2(A) and 2(B) is stored in the data base 153. In this connection, the data of the geographic coordinates (defined by Longitude and Latitude) of the intersection C3 and the data of the geographic coordinates of the node points DT3 and DT4 adjacent to the intersection C3 which are respectively one of the node points of the entrance road R3 and exit road R4 are extracted from the data base 153 by the system control section 152. Next, using these extracted geographic coordinates data, the angle $\theta h$ between the entrance road R3 and the exit road R4 is calculated. Then, if the angle $\theta h$ is smaller than a pre-determined reference angle $\theta T$, a course change for the vehicle is judged to occur at the intersection C3, namely, the intersection C3 is judged to be a course-change point. This judgement of determining whether or not an intersection is a course-change point is carried out for all intersections on the searched route.

(2-4) Establishing Surrounding Area and Extracting Area Guidance Data

Next, in the system control section 152, a counter "i" is set for the total number "n" of the course-change points obtained as described above (Step S5). Then, for each course-change point, a prescribed range which includes the course-change point is established as the surrounding area.

For example, in FIG. 4, the surrounding area A1 is established around the intersection C3 which is the course-change point. Then, map data, road data and intersection data concerning the surrounding area A1 is extracted from the data base 153 (Step S6). A similar process is carried out for the intersection C6.

Now, in the case where the vehicle proceeds straight along a road, the absence of a map does not create any particular problems. However, because a course change such as turning right or left must be carried out at a course-change point, it is necessary to carry out guidance by displaying a map and a landscape and/or by voice instruction. In such case, detailed route guidance data about the prescribed range around/including the course-change point is extracted from the data base 153. Hereinafter, such extracted data concerning the surrounding area is referred to the area guidance data.

This process is carried out for all the course-change points (Steps S7 and S8), and the area guidance data concerning the surrounding area is stored in the working area of the system control section 152 together with data representing the surrounding area.

Next, with reference to FIG. 4, a description will be given for a method of establishing a surrounding area around a course-change point.

The surrounding area is established, for example, around the course-change point so as to have an appropriate shape such as a circle or rectangle which includes and extends forward the portion of the entrance road near the course-change point. In this regard, the surrounding area does not have to be centered around the course-change point, but the surrounding area must include the course-change point. In the case where a circular surrounding area is established, the simplest technique is to establish a circle having a diameter "d" [km] around the course-change point. However, a rectangular surrounding area is preferred in view of the fact that vehicle navigation apparatuses generally have a rectangular display.

In the case where such a rectangular surrounding area is established, it is necessary to establish the dimensions "n [km]×m [km]" of the rectangle and the directions of the respective sides thereof. For example, the surrounding area A1 (shown by the dashed line in FIG. 4) for the course-change point C3 is a square-shaped area having dimensions "n [km]×n [km]". The value of "n" which determines the size of the surrounding area A1 may be pre-established in a program of the system control section 152, or the value of "n" may be freely established at the vehicle navigation apparatus 100 and then transmitted to the navigation base apparatus 150. Either way, map matching (as described below) must be taken into account when establishing the value of "n". Further, in the case of a rectangular surrounding area, the value of "m" must be determined. The value of "m" may be determined, for example, by multiplying the value "n" by a prescribed coefficient.

Next, based on the value of "n", a square region having dimensions "n×n" is established around the course-change point at the intersection C3. Then, the square region is rotated around the intersection C3 so that the surrounding area is established at an appropriate position. For example, the square region around the intersection C3 shown in FIG. 4 is arranged so that one side of the surrounding area intersects the entrance road at an intersection point M in a direction that enables a line connecting the intersection point M and the intersection C3 to be orthogonal to such side. In other words, the square region is arranged so that the entrance road for the intersection C3 is orthogonal to one side of the surrounding area which intersects the entrance road. Further, this manner of establishing regions of the surrounding area takes into account the fact that maps in the vehicle navigation apparatus 100 (described below) are displayed on a rectangular screen in a heading up manner.

Further, in the system control section 152, diagonal positions (Xca3, Yca3), (Xcb3, Ycb3) of the square region "n×n" around the intersection C3 are determined by an appropriate method, and then such diagonal positions are used to establish a surrounding area A1. In this regard, the actual values of the diagonal positions (Xca3, Yca3), (Xcb3, Ycb3) are represented by geographic coordinates defined by Longitudinal and Latitude. Next, the system control section 152 extracts area guidance data such as map data and road data for the surrounding area A1 from the data base 153, and then this extracted data is stored together with the geographic coordinates data of the diagonal positions (Xca3, Yca3), (Xcb3, Ycb3) of the surrounding area A1 in the working area thereof. Further, a similar process is carried out for the surrounding area A4 of the intersection C6.

In this regard, it is possible to previously establish surrounding areas for each intersection using a combination of its entrance road data and exit road data and then store area guidance data for the respective established surrounding areas in the data base 152 in the forms of a table. In this case, when any intersection is designated, corresponding area guidance data is read out from the surrounding area table. This way is advantageous in that there is no need to carry out a calculation process to establish surrounding areas.

Further, as shown in FIG. 4, in the first embodiment of the communications navigation system, as is the same with the above case, area guidance data is also extracted for the surrounding area A2 around the departure point PD and the surrounding area A3 around the destination PA. However, the area guidance data for these areas A2 and A3 are not always necessary. For example, in the case where the departure point and destination are well known places, area guidance data for only the areas around the course-change points on the route between the departure point and the destination will be sufficient for a user (driver). However, in the case where the driver is not clear about which direction to proceed at the departure point PD, it is convenient for the driver if there is area guidance data for the departure point. Further, in the case of the destination A, it is convenient for the driver to have area guidance information on the presence or absence of parking and various facilities in the area around the destination. In this connection, vector data, bit map data or any combination thereof can be used for such area guidance data.

Further, in addition to the guidance data described above, the system control section 152 produces an outline map for the route. This outline map for the route shows the entire searched route, in which the search route is represented using a predetermined mark on a scaled down map which can cover the entire searched route. This outline map of the route is used by the driver to determine whether or not the searched route is appropriate.

(2-5) Transmitting Outline Map of Searched Route and Route/Guidance Data

Next, the route/guidance data (included in navigation data) which includes the data of the outline map of the searched route, the road data, the intersection data and the area guidance data obtained as described above is transmitted to the vehicle navigation apparatus 100 through the communications control section 151 (Step S9). At this time, according to the vehicle ID that is received from the vehicle together with the route search request in Step S1, the route/guidance data is transmitted to the vehicle navigation apparatus 100 of the corresponding vehicle. In this transmission of data, the data of the outline map of the route is transmitted first.

FIG. 7 shows the main contents of the route/guidance data to be transmitted to the vehicle navigation apparatus 100. In this figure, FIG. 7(A) shows the position data of the departure point and destination represented by geographic coordinates defined by Longitude and Latitude. FIG. 7(B) shows the road data concerning the searched route, which includes data of the road numbers and various data corresponding to each road number (see FIG. 2(A)). FIG. 7(C) shows the intersection data concerning the intersections on the searched route, which includes data of the intersection numbers, various data corresponding to each intersection (see FIG. 2(B)) and the entrance road and exit road data of the respective intersections as shown in FIG. 5(C).

Further FIG. 7(D) shows the area guidance data for the course-change points on the searched route and the surrounding area data for each course-change point. The area guidance data includes various information such as data of the intersection number corresponding to each course-change point; data of the diagonal positions for the surrounding area of the course-change point; guidance data for the surrounding area; and data of the road numbers of its entrance road and exit road. The guidance data includes map data about the course-change point (intersection) and surrounding area of the course-change point: voice guidance data; data of landmarks which can be used as guidance marks; data for landscape images; and the like. Further, the guidance data may include data for indicating the travel route or travel direction to the first course-change point from the guidance departure position. In this case, such travel route and/or travel direction may be indicated on a map displayed on the display 106 of the vehicle navigation apparatus 100 using such guidance data, thereby making it possible to carry out an even more precise guidance. In this connection, each data described above is transmitted either separately or in an appropriate combination with other data to the vehicle navigation apparatus 100.

As described above, a route search is carried out and then data necessary for guiding the vehicle along the searched route is obtained in accordance with the flow chart shown in FIG. 3, and then thus obtained data is transmitted to the vehicle navigation apparatus 100 via portable phones or the like. The transmitted outline map data and guidance data are received by the transmitting and receiving section 108 of the vehicle navigation apparatus 100, and then stored in the working area of the data storage section 103.

(3) Operations of the Vehicle Navigation Apparatus

Next, a description will be given for the operations of the vehicle navigation apparatus 100 of the first embodiment.

Figure 8A:
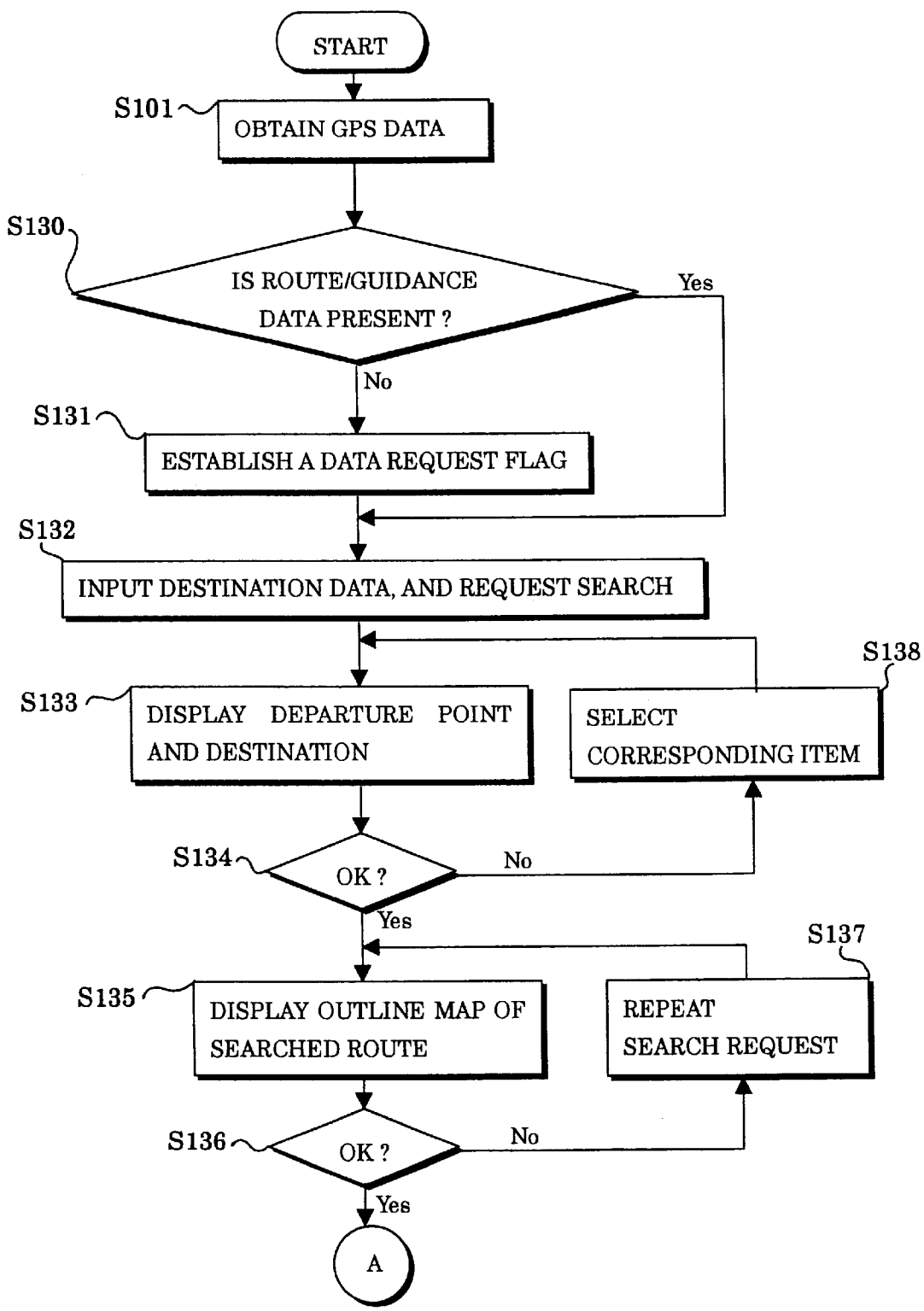
FIGS. 8(A) and 8(B) are a flow chart which shows operation of the vehicle navigation apparatus.
Figure 8B:
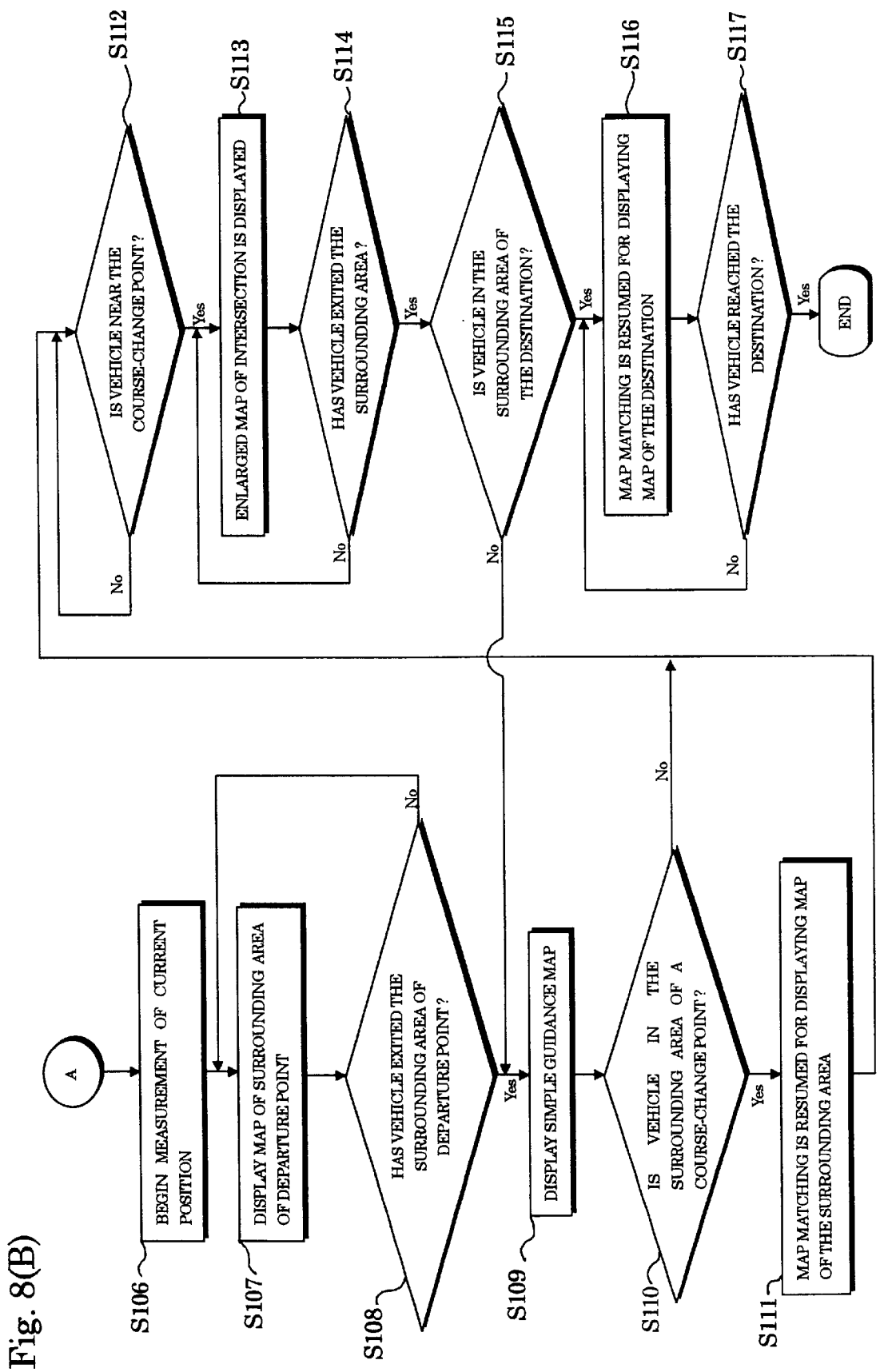

FIGS. 8(A) and 8(B) show a flow chart of the operations of the vehicle navigation apparatus 100. In this connection, Steps S130 and S131 in FIG. 8(A) will be described later with reference to the modification of the first embodiment.

(3-1) Determining Departure Point and Destination

As shown in FIG. 8, in the vehicle navigation apparatus 100, GPS data is first obtained by the position measuring 104 and then it is used to measure the current position (Longitude, Latitude) of the vehicle (Step S101). Further, the user of the vehicle navigation apparatus 100 operates the input section 105 to input information about the destination, such as the facility name, telephone number and address thereof, and a route search request (Step S132). Then, the current position of the vehicle that is the departure point data and the telephone number or address of the destination that is the destination data is transmitted to the navigation base apparatus 150 together with the vehicle ID data.

Next, at the navigation base apparatus 150, the position data correcting section 154 corrects current position data of the vehicle using D-GPS, and then based on the corrected current position data, the departure position of the vehicle or an intersection close to such departure position is established as the departure point. Further, based on the transmitted facility name or telephone number and address, the destination facility or an intersection close to such destination facility is established as the destination. Then, each data about the established departure point and destination is transmitted from the navigation base apparatus 150 to the vehicle navigation apparatus 100, where such data is displayed on the display 106 (Step S133).

In this case, if an user inputs only the first several digits of the telephone area code as the information about the destination and there are a plurality of facilities having the same inputted digits, the navigation base apparatus 150 searches all facilities having the same inputted digits, and then transmits the searched facilities data to the vehicle navigation apparatus 100. The searched facilities are displayed at the vehicle, and the user views such facilities to decide whether or not the destination is included in the searched facilities, and then selects the appropriate destination from the plurality of searched facilities (i.e., a "NO" decision is made at Step S134, and then the routine proceeds to Step S138). These results are then transmitted from the transmitting and receiving section 108 to the navigation base apparatus 150. In this way, the departure point and destination for the route search are established.

(3-2) Route Search (Recommended Route Search)

Next, in the navigation base apparatus 150, a recommended route is searched based on the departure point and destination established as described above, and an outline map for the recommended route is produced. The searched route, that is a recommended route is displayed on the display 106 in the form of the outline map (Step S135). FIG. 9 (A) shows one example of the displayed outline map.

In this connection, it is to be noted that the example of the outline map shown in FIG. 9 (A) corresponds to the searched route shown in FIG. 4, in which the intersections C3 and C6 as the course-change points are existed on the searched route. Further, in FIG. 9(A), the distance from the departure point PD to the intersection C3 is designated by LA [km], the distance from the intersection C3 to the intersection C6 is designated by LB [km], and the distance from the intersection C6 to the destination PA is designated by LC [km].

By referring to this type of outline map of the recommended route shown in FIG. 9(A), the user can decide whether or not such recommended route is a desired route. If there is any problem in the recommended route, the user can request to search another recommended route (i.e., a "NO" decision is made at Step S136, and then the routine proceeds to Step S137). In this case, it is possible to add further conditions to the request such as a route of shorter time, a route of shorter distance and a route passing through desired intermediate passage. Then, when the new search result is acceptable (i.e., a "YES" decision at Step S136), an approval command is transmitted to the navigation base apparatus 150. When this is done, route/guidance data (see FIG. 7) corresponding to the approved searched route is transmitted to the vehicle navigation apparatus 100 and stored in the data storage section 103.

(3-3) Surrounding Area of Departure Point

As the vehicle begins its travel, the position of the vehicle is measured by the position measuring 104 at predetermined time intervals or at predetermined distance intervals during travel, and these measurement results are stored in the data storage section 103 (Step S106).

Then, the processing section 101 retrieves the route/guidance data in the data storage section 103. If route/guidance data for the current position exists in the data storage section 103, the processing section 101 outputs such data. In this way, map data thereof is displayed on the display 106, and voice data thereof is outputted from the voice output section 107 (Step S107).

In this regard, an explanation is made with regard to the example shown in FIG. 4. Namely, at the time just after the departure, the route/guidance data of the surrounding area A2 around the departure point PD is stored in the data storage 103. Therefore, this data is read out immediately after departure. Then, a map of the area around the departure point PD is displayed on the display 106, and a route guidance voice is outputted via the voice output section 107. Further, the processing section 101 carries out "map matching" to route/guidance data, and displays the current position of the vehicle on the map in the display 106.

FIG. 9(B) shows an example of a displayed map. As shown in this figure, a map for the area around the departure point PD is displayed on the displayed. In this displayed map, the road R1 is highlighted by markings MA, and in this way the searched route is indicated. Further, an arrow MB showing the direction of travel and a mark MC showing the vehicle position by map matching are also indicated. This type of display is continued until the vehicle passes out of the surrounding area of the departure point (i.e., display continues so long as a "NO" decision is made at Step S108).

(3-4) Intermediate Sections of Searched (Recommended) Route

Now, when the vehicle proceeds along the searched route and then it is judged by the processing section 101 that the vehicle has passed out of the surrounding area A2 of the departure point (i.e., a "YES" decision at Step S108), map matching is suspended. Then, a simple guidance screen image like that shown in FIG. 10(A) is displayed on the display 106 (Step S109). In this example shown in FIG. 10(A), the indications such as the distances "Lv [km] to Intersection xx" and "Lw [km] to Destinations" are obtained by calculation which is made by the processing section 101 based on data for each road which is included route/guidance data transmitted from the navigation base apparatus 150 and the distance traveled since departure.

As described above, the road data and the intersection data for the route searched by the navigation base apparatus 150 include an ordered arrangement of the road numbers and intersection numbers of the route and information related to each of such numbers, as shown in FIG. 7. For example, the road data includes information such as road length, and the intersection data includes information such as position of the respective intersection. On the other hand, the current position of the vehicle is always being measured as described above. Therefore, it is possible to calculate the distance traveled from the departure point. This means that by utilizing these data, it is possible to calculate the distance from the current position to the next course-change point and the distance from the current position to the destination.

Further, the guidance screen image shown in FIG. 10(A) is a simple image which includes an arrow MD for indicating the direction of travel; a mark ME for indicating the position of the vehicle; a landscape image MF; and distance information MG. In this regard, the arrow MD indicates the course change direction of the route at the next course-change point from the perspective at the vehicle position. Namely, in the example in FIG. 4, since the vehicle must be turned to the right at the course-change point that is the intersection C3, the direction of the arrow MD in FIG. 10(A) turns to the right. In this connection, the image data necessary for above information (MD, ME, MF and MG) may be included in the route/guidance data to be transmitted from the navigation base apparatus 150 to the vehicle navigation apparatus 100, or such image data may be stored in the data storage 103 of the vehicle navigation apparatus 100 beforehand.

In this way, during intermediate sections for which the vehicle navigation apparatus 100 does not receive detailed guidance data, only a simplified guidance image is displayed. However, because the vehicle only needs to proceed along the current road, this simplified display does not create any inconvenience to the driver. This simplified display is carried out until the time that the vehicle enters the surrounding area A1 of the course-change point at the intersection C3 (i.e., such simplified display continues so long as a "NO" decision is made at Step S110).

(3-5) Surrounding Areas of Course-Change Points

Now, when the vehicle further proceeds along the searched route, and then is judged that the vehicle has entered the surrounding area A1 of the course-change point at the intersection C3 (i.e., a "YES" judgement at Step S110), map matching is resumed (Step S111). Further, map data of the surrounding area A1 is read out of the data storage 103 and a map thereof is displayed on the display 106, and corresponding voice data is outputted via the voice output section 107. Then, when the vehicle approaches the course-change point at the intersection C3 (i.e., when a "YES" judgement is made at Step S112), an enlarged view of the intersection C3 is displayed on the display 106 (Step S113). Alternatively, a simplified screen image such as that shown in FIG. 10(B) may be displayed. Thus, the driver can turn to the right at the intersection C3 in accordance with such map and voice guidance to keep the vehicle proceeding on the searched route. In this regard, the display 106 will continue to display the area around the intersection C3 until the vehicle passes out of the surrounding area A1 (i.e., such display continues so long as a "NO" judgement is made at Step S114). Then, after the vehicle passes out of the surrounding area A1 of the course-change point at the intersection C3, the display 106 resumes the type of display shown in FIG. 10(A) for intermediate sections of the route and this process is continued so long as a "NO" judgement is made at Step S115. Thus, the same process will be carried out for the surrounding area A4 of the course-change point at the intersection C6.

(3-6) Surrounding Area of Destination

When the vehicle further proceeds along the searched route and then it is judged by the processing section 101 that the vehicle has entered the surrounding area A3 of the destination PA (i.e., a "YES" judgement is made at Step S115), map matching is resumed, and map data of the surrounding area A3 is read out of the data storage 103 and a map thereof is displayed on the display 106 (Step S116). Further, corresponding voice data is outputted from the voice output section 107. Thus, by following the searched route in accordance with such displayed map and voice guidance, the driver of the vehicle is able to reach the destination PA. In this case, an enlarged view of the destination PA may be displayed when the vehicle comes within a prescribed distance to the destination PA. Then, when the vehicle reaches the destination PA, the route guidance operations are terminated (Step S117).

The operations described above for the first embodiment of the navigation system can be summarized as follows:

(i) The navigation base apparatus carries out a route search, and extracts data concerning the course-change points and surrounding areas thereof. Further, only for the surrounding areas of the departure point, course-change points and destination, detailed route/guidance data including map data and voice data is transmitted to the vehicle navigation apparatus.

(ii) At the vehicle, the vehicle navigation apparatus uses the route/guidance data transmitted from the navigation base apparatus to carry out detailed guidance by displaying detailed maps of the departure point, course-change points and destination and by outputting corresponding voice guidance.

According to the navigation system of the first embodiment described above, the amount of data to be transmitted from the navigation base apparatus to the vehicle navigation apparatus is reduced. Further, because this makes it possible to reduce the memory capacity of the vehicle navigation apparatus, it becomes possible to simplify the vehicle navigation apparatus. Furthermore, even with such a reduced amount of data, the navigation system described above makes it possible to carry out a precise route guidance.

First Modification

Next, a description will be given for a first modification of the first embodiment of the present invention described above.

This first modification of the first embodiment is directed to an improvement for the operation carried out in the navigation base apparatus 150 at Step S6 of FIG. 3, that is a method for obtaining guidance data for the surrounding area about the respective course-change point. In this regard, it is to be noted that in the example shown in FIG. 4 the n×n square-shaped surrounding area was established, but in this modification such an area is established by taking map matching into consideration.

(1) Map Matching

As described above, at each of the departure point, course-change point and destination, not only a map of its surrounding area is displayed on a screen of the display 106 but also a vehicle position is also indicated on the map. In order to indicate the vehicle position on the map, map matching is carried out in the vehicle navigation apparatus 100.

As is already known, map matching is a method for indicating a current vehicle position on a route (road) in a map which is being displayed on a display screen. Namely, in most cases, the vehicle position calculated by the position measuring section 104 of the vehicle navigation apparatus 100 involves a certain measurement error. Accordingly, if the vehicle position is displayed based on such measurement data without any correction, the position of the vehicle on the displayed map may appear outside the road along which the vehicle is traveling, and this makes it impossible to display vehicle position accurately on the path indicated in the displayed map. For this reason, in order to correct the measurement error, map matching is carried out in the vehicle navigation apparatus 100 so as to be able to indicate the current position of the vehicle accurately on the route in the displayed map.

Figure 11:
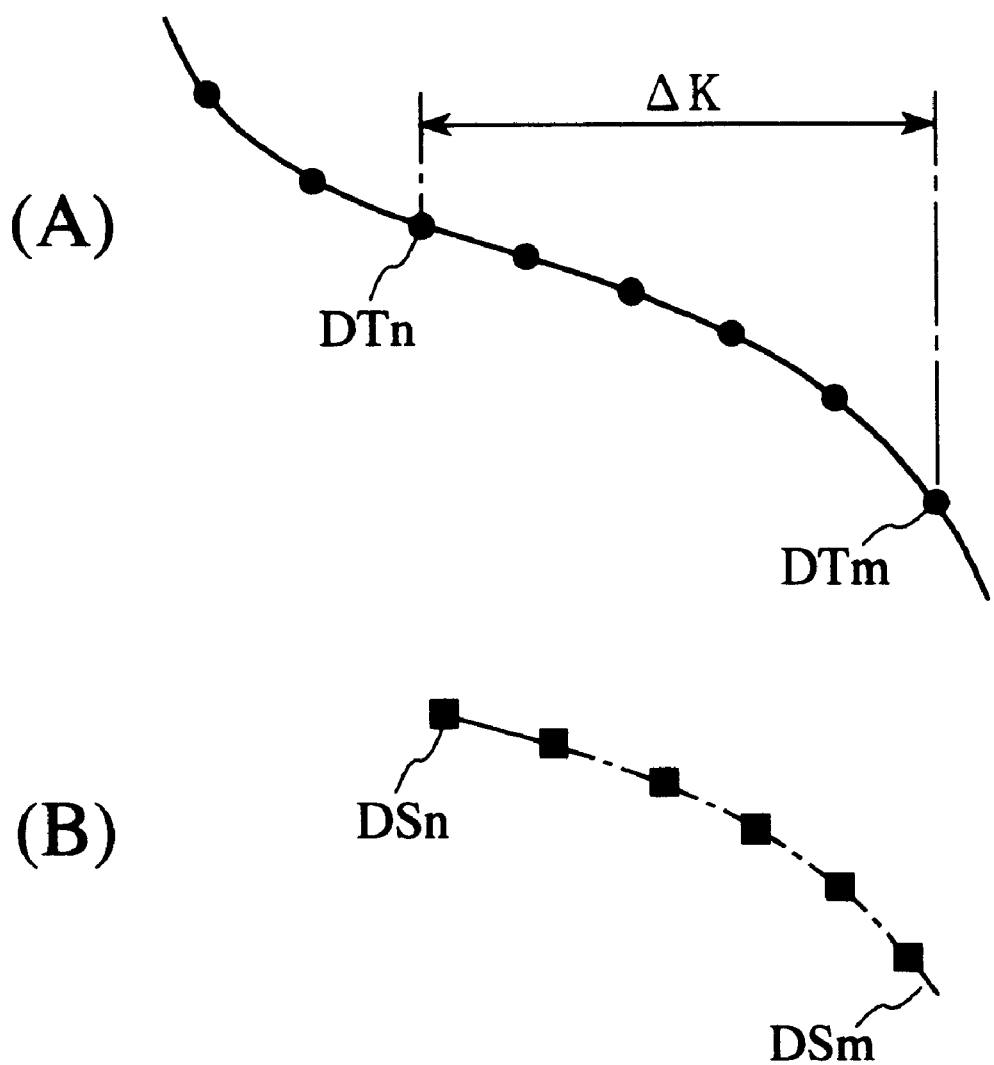
FIGS. 11(A) and 11(B) are diagrams which show one example of a method for map matching.

FIG. 11 shows a simple example of the map matching. Therefore, hereinbelow, with reference to FIG. 11, a description will be given for the simple example of map matching.

As was described above, road data of the searched route is transmitted from the navigation base apparatus 150 to the vehicle navigation apparatus 100 together with the road number data and related data thereto, and such data is then stored in the data storage section 103. Now, because this road data includes the geographical coordinates of each node point, it is possible to specify the road by plotting such node points. For example, FIG. 11(A) shows a road which is drawn by plotting node point data DT. On the other hand, in the vehicle navigation apparatus 100, the vehicle position is measured by the position measuring section 104 and data for the measured positions DS is stored in the data storage section 103. Therefore, if this position data for the measure positions DS is successively plotted, the traveling trace of the vehicle can be drawn like the example shown in FIG. 11(B).

Now, if the pattern shown in FIG. 11(A) is compared with that of FIG. 11(B), it will be found that the road pattern over the section ΔK from node DTm to node DTn in FIG. 11(A) is similar to the pattern of the travelling trace from the measurement point DSm to the measurement point DSn in FIG. 11(B). Further, if DSn is the newest measured vehicle position, it is possible to determine the present position of the vehicle on the route (i.e., the position on the road pattern shown in FIG. 11(A)) from data such as the travel distance and road length and the like. From this, the position of the vehicle on the road can be judged to be the left end DTn of the section ΔK, for example. In this way, the current position of the vehicle can be Indicated on the map being displayed on the display 106 of the vehicle navigation apparatus 100.

In the meantime, in order to carry out the above-described map matching, the length of the route included in the route/guidance data for the surrounding area transmitted from the navigation base apparatus 150 must be longer than the length of the travelling trace held in the vehicle navigation apparatus 100. Accordingly, in this first modification of the first embodiment, the vehicle navigation apparatus 100 is configured so as to establish a rectangular area which can include a route length therein that enables to carry out the map matching.

Figure 12:
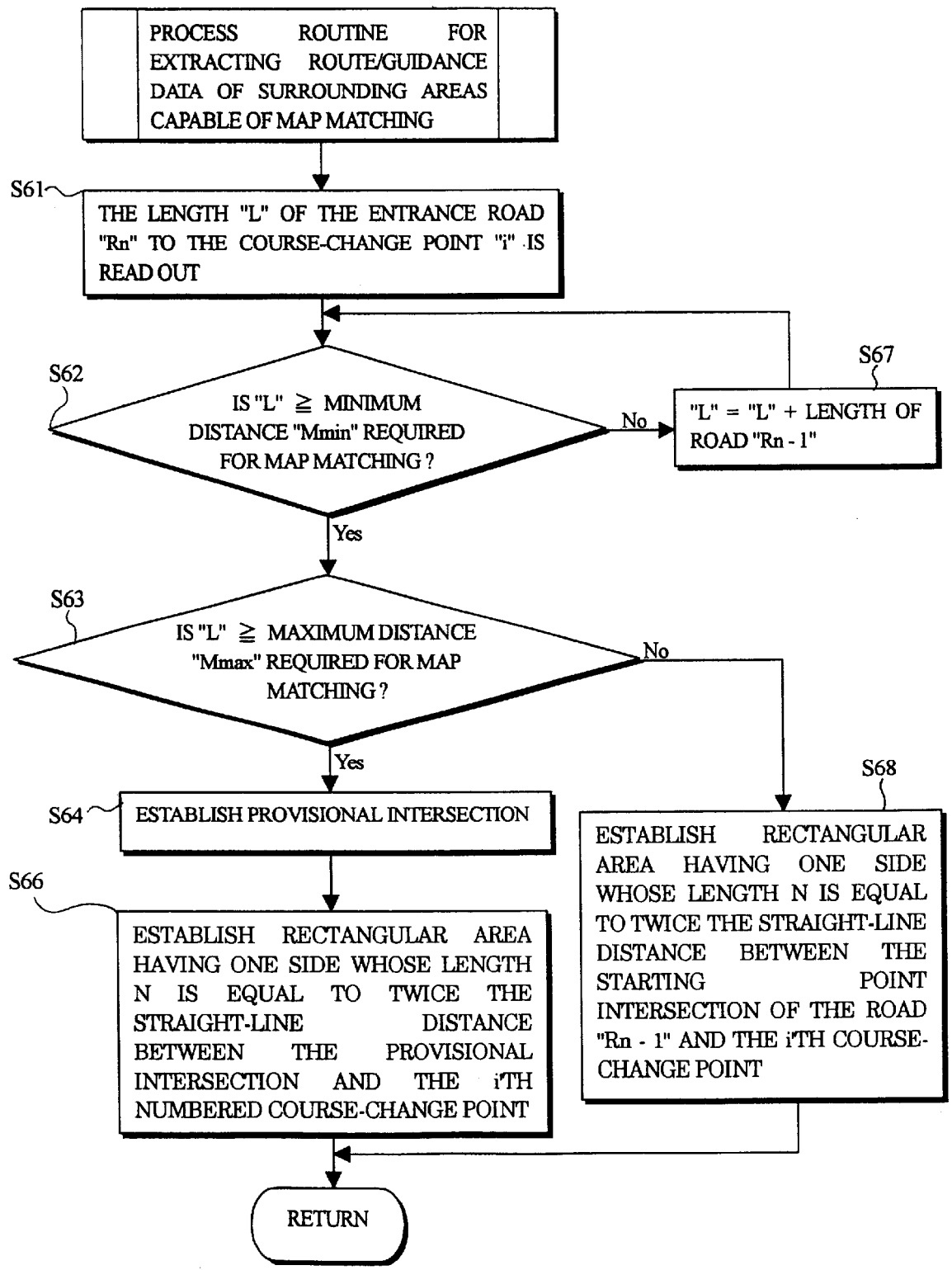
FIG. 12 is a flow chart which shows a process for establishing a surrounding area which is capable of map matching.

(2) Method of Establishing Areas According to First Modification:

The method of establishing a rectangular area according to this first modification will be described below with reference to the flow chart in FIG. 12 and the drawings in FIG. 13. In this regard, it is to be noted that this process is carried out by the system control portion 152 of the navigation base apparatus 150 and it corresponds to Step S6 in the flow chart of FIG. 3.

First, data for the length (i.e., distance) Lm of an entrance road for entering to an intersection which has been designated as a course-change point is read out from the data base 153 (Step S61). Next, the length Lm of the entrance road is compared with the minimum distance Mmin which is a minimum distance necessary for carrying out map matching (Step S62). In this case, if it is determined that the length Lm of the entrance road is less than the minimum distance Mmin (i.e., Lm<Mmin), the vehicle navigation apparatus 100 can not carry out the map matching. Therefore, in such a case, the length Ln which is a length of the adjacent road is added to the road length Lm. Such calculation process is repeatedly carried out until the total road length of the roads becomes larger than the minimum distance Mmin.

When the above condition has been satisfied, the total road length is then compared with a pre-established maximum distance Mmax (Step S63). In this case, it is to be noted that if a large surrounding area is established, map matching can be carried out easily. On the other hand, however, this increases the amount of route guidance data transmitted to the vehicle navigation apparatus 100 from the navigation base apparatus 150. Accordingly, in this modification, the size of a surrounding area to be established is restricted by the maximum distance Mmax, thereby preventing the amount of transmitted data from exceeding the amount of data necessary for the map matching.

Specifically, as a result of the comparison of the total road length and the maximum distance Mmax, if the total road length is larger than the maximum distance Mmax, the position of the maximum distance Mmax is established as a provisional intersection (CK) (Step S64). Then, a rectangular area having one side whose length n is equal to twice the straight-line distance between the provisional intersection (CK) and the course-change point (C3) is established (Step S66). On the other hand, if the total road length is smaller than the maximum distance Mmax, a rectangular area having one side whose length n is equal to twice the straight-line distance between the starting point intersection of the last added entrance road and the course-change point (C3) is established (Step S68).

The above described process will be described hereinbelow in more details with reference to FIG. 13(A) and FIG. 13(B). In the case shown in FIG. 13(A), the total length L2+L3 of the entrance roads R2, R3 is larger than the maximum distance Mmax, a provisional intersection CK is established at the position of Mmax. Then, a rectangular surrounding area A1 having one side whose length n is equal to twice the straight-line distance $\Delta n$ between the provisional intersection CK and the course-change point at the intersection C3 is established. In this case, if the entrance roads R2, R3 are joined by a straight line, n=Mmax×2.

On the other hand, in the case shown in FIG. 13(B), the total length L2+L3 of the entrance roads R2, R3 is smaller than the maximum distance Mmax. Therefore, a rectangular surrounding area A1 having one side whose length n is equal to twice the straight-line distance $\Delta m$ between the starting point intersection C1 of the entrance road R2 and the course-change point at the intersection C3 is established. In this case, if the entrance roads R2, R3 are joined by a straight line, n=(L2+L3)×2.

As described above, in the case where there is no intersection within the region defined by either the minimum distance Mmin which is necessary for carrying out map matching or the maximum distance Mmax which is set as upper limit, the navigation base apparatus 150 establishes a provisional intersection at the position of the Mmax distance in the manner described above. Then, by using the straight line distance between this provisional intersection and the course-change point, a rectangular surrounding area having one side whose length n is established. On the other hand, in the case where there is an intersection within the range defined by either the minimum distance Mmin or the maximum distance Mmax, a rectangular surrounding area having one side whose length n is established by using the straight line distance between this intersection and the course-change point. Further, based on thus established surrounding area, guidance data for the surrounding area is transmitted to the vehicle navigation apparatus 100. In carrying out the process described above, it becomes possible for the vehicle navigation apparatus 100 to carry out map matching before the course-change point (i.e., on the entrance side of the course-change point). Further, the same process may also be carried out for the exit side of the course-change point. In this regard, the value of n for the exit side is compared with the value of n for the entrance side, and either one of them having a larger n value is selected.

Second Modification

Next, a description will be given for a second modification of the first embodiment of the present invention.

In this second modification, in the case where the vehicle has departed from the searched route transmitted from the navigation base apparatus 150, return route data for returning the searched route is extracted from the data base and then sent it to the vehicle navigation apparatus 100 to enable the driver of the vehicle to return the vehicle to the searched route. For example, in the case shown in FIG. 14, because the length L3 of the road R3 is smaller than the guidance start distance GL for the course-change point C3, the voice output section 107 outputs an audio guidance such as "Turn right at the next intersection" before the intersection C2. As a result, the driver of the vehicle may turn right at the intersection C2 by mistake. However, if such a mistake would occur, it is possible for the driver to return the vehicle to the searched route depending on the surrounding road conditions by providing guidance data for the return route (which would include map data for at least the roads Ra and Rb for the case shown in FIG. 14) to the vehicle navigation apparatus 100 as part of the route/guidance data.

Figure 15:
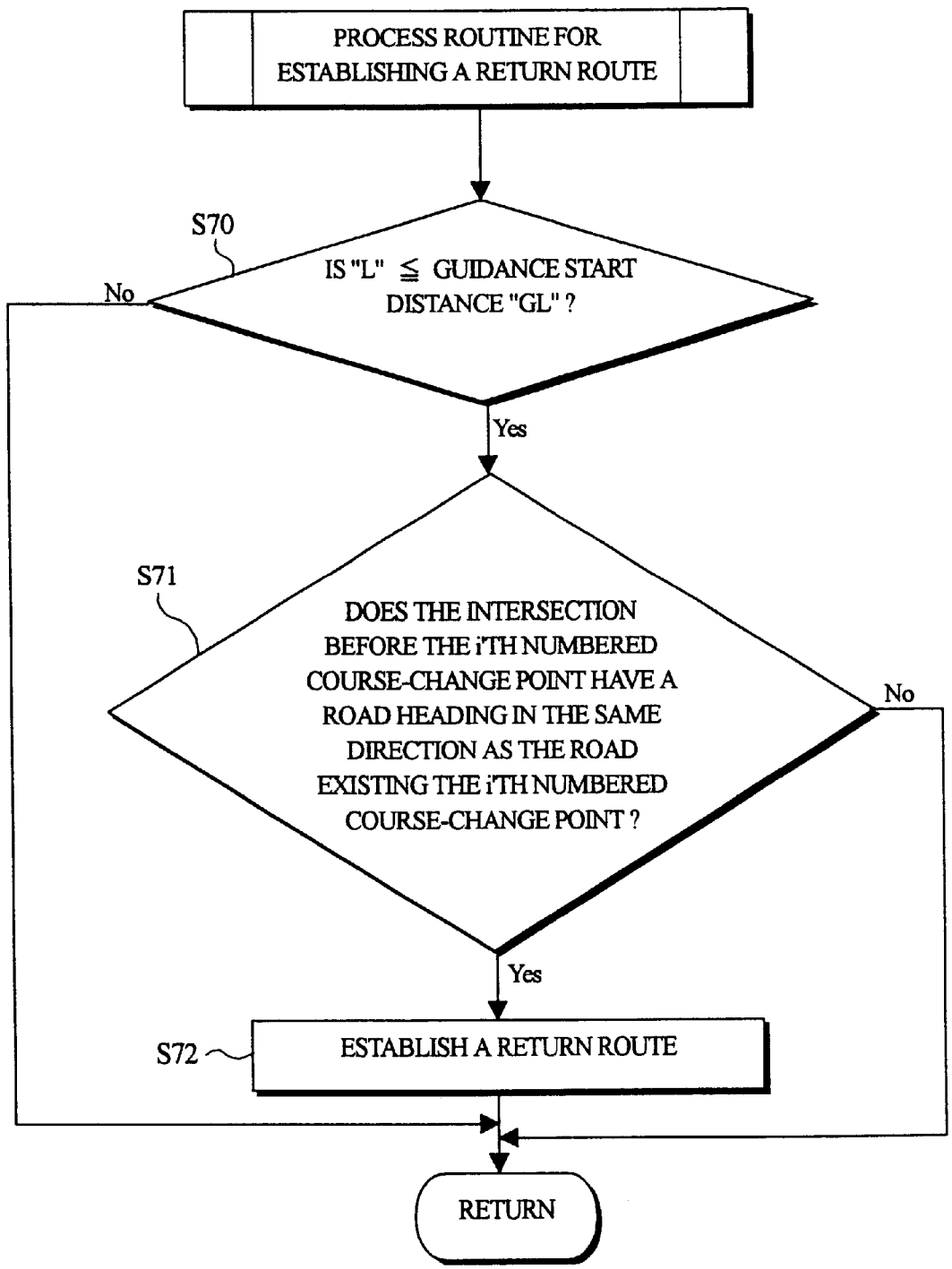
FIG. 15 is a flow chart which shows a method for establishing a return route.

In this connection, FIG. 15 shows the steps of the process carried out by the system control section 152 of the navigation base apparatus 150 for establishing a return route. This process may be carried out, for example, between Steps S61 and S62 of the flow chart shown in FIG. 12. Specifically, in the first step shown in FIG. 15, a judgement as to whether or not the length L3 of the entrance road R3 to the course-change point C3 is larger than the preestablished guidance start distance GL is made in the system control section 152 (Step S70). At this step, if the length L3 is determined to be larger than the distance GL (i.e., a "NO" judgement at Step S70), there is no risk of the driver changing course at the intersection C2 by mistake, and therefore no return route is established. However, if the length L3 is determined to be smaller than the distance GL, there is a risk that the driver will make a course change at the intersection C2 by mistake. For this reason, a judgement is made to determine as to whether or not there is any return route (Step S71). Namely, a judgement is made to determine whether or not the intersection C2 connects with any roads that run in the same direction as the exit road R4 of the course-change point at the intersection C3.

Figure 14:
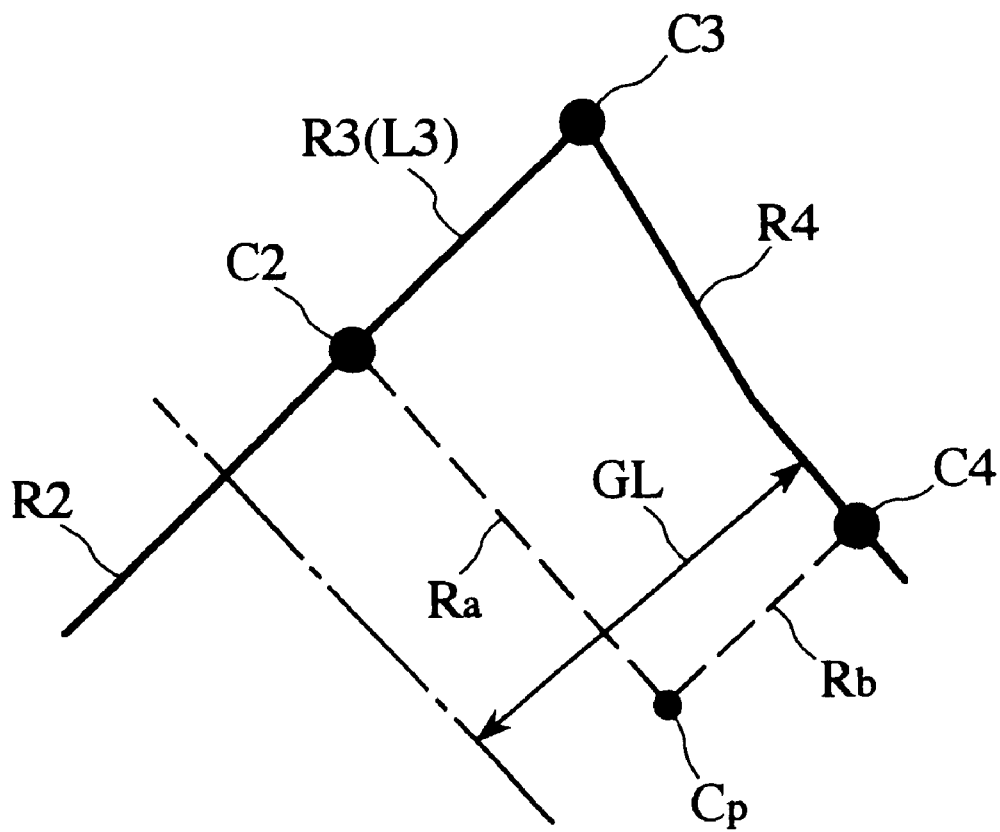
FIG. 14 is a diagram which shows a method for setting a return route.

In the example shown in FIG. 14, a road Ra branches out from the intersection C2 in the same direction as the exit road R4 from the course-change point at the intersection C3. Thus, this road Ra and a road Rb which connects the road Ra to the searched route is established as a return route (Step S72).

Further, even though the above description was made with reference to FIG. 14 for the case in which a route for returning to the recommended route was extracted for the situation where the driver mistakenly changes course at the intersection (C2) before the course-change point at the intersection (C3), it is also possible to extract a return route for the case in which the driver mistakenly heads in the wrong direction after passing through the course-change point at the intersection C3 as shown in FIG. 4. Namely, in the example shown in FIG. 4, the roads Rc, Rd and Re can be established as a return route from the intersection Cg after passing through the intersection C3. The return route data obtained in this way is transmitted to the vehicle navigation apparatus 100 as part of the route/guidance data.

Third Modification

Next, a description will be given for a third modification of the first embodiment of the present invention.

This third modification relates to a display method of displaying a simple map during intermediate sections of the route. As was described above, no detailed route guidance is carried out while the vehicle is travelling intermediate sections of the route excepting a course-change point and the surrounding area thereof, and instead thereof the vehicle navigation apparatus 100 provides a simple display like the simple guidance image shown in FIG. 10(A) during the travelling one the intermediate sections. However, when carrying out route guidance from the departure point to the destination, if the driver is provided in advance with data about the next course-change intersection and the following course-change intersection after that, it becomes possible to provide the driver with a future forecast of the intersections that will be course-change points and which way the course will change at such intersection, thereby making it possible to achieve an extremely stable driving state along the searched route. Generally, it is believed that sufficient results for such purpose are achieved if the driver is provided with information on up to two of the next course-change points. In view of the above, this third modification is designed to obtain simple maps for such intermediate sections.

Figure 16:
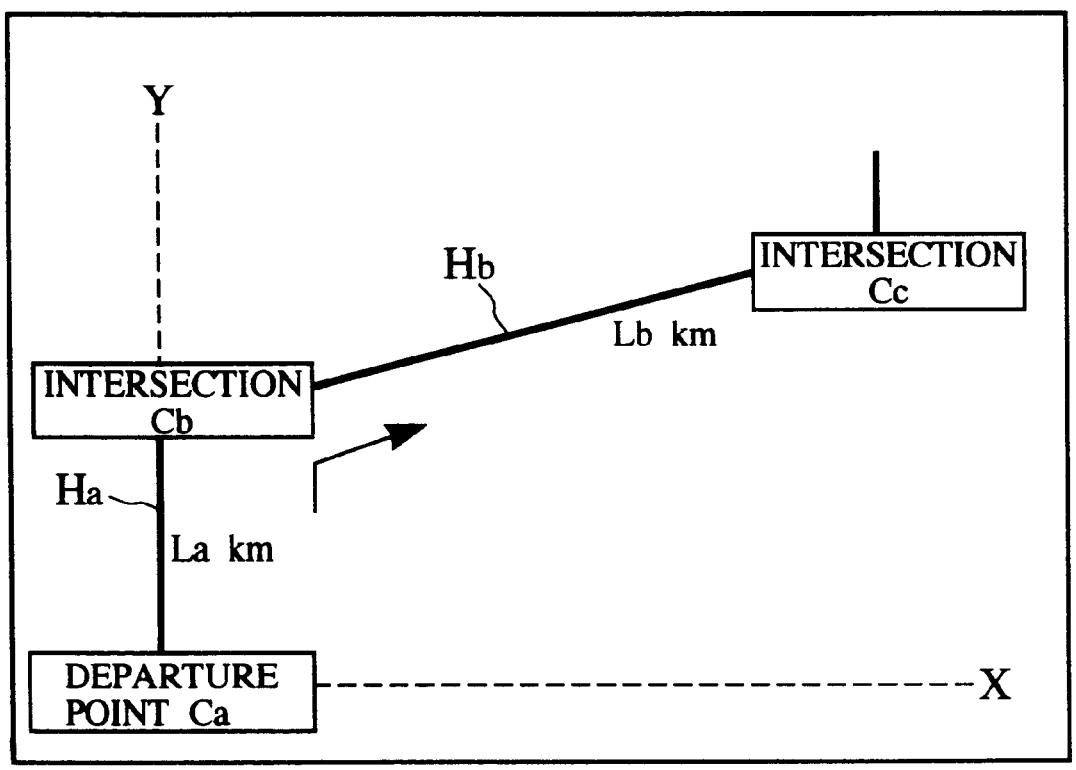
FIG. 16 is an illustration which shows one example a simple map which is displayed on the intermediate section on the route.

In this connection, FIG. 16 shows an example of a simple map according to this third modification, and FIG. 17 shows graphs used in describing the process for displaying a simple map.

In the example shown in FIG. 16, there is a course-change point at the intersection Cb located a distance of La (km) from the departure point Ca, and the next course-change point after that is at the intersection Cc located a distance of Lb (km) from the intersection Cb. This type of display is carried out for the intermediate sections described above, namely, from the point of time when the vehicle exits the surrounding area of the departure point until the point of time when the vehicle enters the surrounding area of the intersection Cb, and from the point of time when the vehicle exits the surrounding area of the intersection Cb until the point of time when the vehicle enters the surrounding area of the intersection Cc.

In the processing section 101, the coordinates (Longitude and Latitude) of the departure point (display starting point) Ca, the intersection Cb which forms the next course-change point and the intersection Cc which forms the following course-change point after the intersection Cb are read out from the route/guidance data. Then, using such coordinate values, each of these points Ca, Cb and Cc is plotted on a geographical coordinate. Next, a parallel movement coordinate conversion is carried out so as to place the departure point (starting point) Ca at the origin of a x-y coordinate system. For example, if the departure point Ca has geographical coordinates (x0, y0), the coordinates of the departure point Ca in the x-y coordinate system will be (x, y)=(x0−x0, y0−y0)=(0, 0). Such coordinate conversion is also carried out for the intersections Cb and Cc. With this result, if the intersection Cb has geographical coordinates (xx1, yy1), the coordinates of the intersection Cb in the x-y coordinate system will be (x1, y1)=(xx1−x0, yy1−y0), and if the intersection Cc has geographical coordinates (xx2, yy2), the coordinates of the intersection Cc in the x-y coordinate system will be (x2, y2)=(xx2−x0, yy2−y0). In FIG. 17(A), the route which connects all these points in the x-y coordinate system is represented by a thick line.

Next, in order to make the line segment Ha which joins the departure point Ca with the intersection Cb run straight up in the simple map shown in FIG. 16, a coordinate rotation (i.e. an Afin conversion) is carried out. Namely, a coordinate conversion is carried out by rotating the x-y coordinate system through a predetermined angle θ in order to make the line segment Ha run in the upwards direction in the map along the Y-axis of a new X-Y coordinate system.

In this regard, because the departure point Ca is positioned in the center of both coordinate systems, its coordinates are (0, 0) in both coordinate systems. Further, the coordinates (X1, Y1) of the intersection Cb are X1=x1·cos θ−y1·sin θ(=0), Y1=x1·sin θ−y1·cos θ. Similarly, the coordinates (X2, Y2) of the intersection Cc are X2=x2·cos θ−y2·sin θ, Y2=x2·sin θ−y2·cos θ. In this connection, when the coordinate rotation is carried out in the clockwise direction, θ=arctan (x1/x2).

Next, based on the converted coordinate values described above, screening is carried out to display all these points within a predetermined area of the display screen. Namely, with the size of the horizontal direction (X direction) and vertical direction (Y direction) of the display area respectively set at A and B, and with the lower left corner of the display area defined as the origin, the display position is established as described below. In this case, if the display area is established so as to be a fixed amount smaller than the displayable area of the screen, it is preferable for a character display of the intersection names and the like. First, the coordinates (0, 0) of the departure point (starting point) Ca is displayed with no change at the coordinates (0, 0) of the display area (X, Y). Then, in order to make practical use of as much of the display area as possible, the coordinates (X2, Y2) of the intersection Cc are established at (A, B) at the uppermost right edge of the screen. Next, taking a reduction in scale into consideration, the coordinates of the intersection Cb which lies between Ca and Cc are established at (0, B·Y1/Y2). If the route shown in FIG. 17(A) is displayed using the above setting, it appears as the map shown in FIG. 16.

Now, in the case of the route shown in FIG. 17(B), if the starting point is placed at the origin of the (X, Y) display area, the intersection Cd will exist outside the screen. Accordingly, the starting point is moved parallel to the Y direction from (0, 0) to (0, |Y2|). In this way, the intersection Cb is displayed at the upper left corner of the display area, and the intersection Cd is displayed at the lower right corner of the display area. When it is displayed on the display screen, the image appears as indicated by the dashed line rectangle shown in FIG. 17(B).

Now, in the examples given above with reference to FIG. 17(A) and FIG. 17(B), the second intersection was described as existing in the positive X-axis direction, but in the case where they exist in the negative direction, the starting point may be moved to the right corner of the display area. For example, in the case where the intersection Ce shown in FIG. 17(A) is the second intersection, the departure point (starting point) Ca is displayed at (A, 0) at the lower right corner of the screen. Then, in order to make practical use of as much of the display area as possible, the coordinates (−X3, Y3) of the intersection Ce are established at (0, B) at the upper left edge of the screen. Next, taking a reduction in scale into consideration, the coordinates (X1, Y1) of the intersection Cb which lies between Ca and Ce are established at (A, B·Y1/Y2).

After the display positions of the starting point and intersections have been determined as described above, various information is displayed, such as the line segments Ha and Hb which connect the intersections along the route direction, the name of each intersection, the shape of each intersection, the distance between the intersections, the branching direction of the road that leaves each intersection in the route direction and the name of such branching road, if necessary. Further, when the need arises, the display of line segments and intersection names may be color-coded in an advancing color such as red when the distance between the intersections is within a prescribed range, and a receding color such as blue when the distance is greater than the prescribed range.

The above-described process for creating simple maps with the processing section 101 may be carried out, for example, when the vehicle is judged to have exited the surrounding area of the departure point or a course-change point. Namely, the course-change point which has just been passed through forms the starting point for displaying a simple map that includes the next two course-change points.

Further, it is also possible to display the total searched route with this simple map. For example, when the total route is to be displayed, it is preferred that intersections where the entrance road and exit road to and from a course-change point have different names, and intersections judged to have a high probability of causing a wrong course change (e.g., the case where there is a nearby intersection capable of a course change in the same direction), and intersections including any combination of the two types of intersections described above are selected for the displayed intersections.

Furthermore, this total route display may be used in combination with a partial route display like that shown in FIG. 16. For example, display operations may be carried out as follows:

(i) A total route display is carried out in the area around the departure point. At this time, the next course-change point is preferably displayed.

(ii) When approaching a course-change point, a partial route display is used.

(iii) When exiting the surrounding area of a course-change point, the total route display is once again carried out. Preferably, at this time, the course-change point which has just been passed through is erased, and the next course-change point is displayed.

In this way, by alternately switching between a total route display and a partial display, it is possible to alternately confirm the remaining total route and the area near each intersection. This makes it possible for the driver to grasp both the entire of the searched route and a part of the searched route properly according to travelling of the vehicle.

Fourth Modification

Next, a description will be given for a fourth modification of the first embodiment of the present invention.

In this modification, the route/guidance data obtained as a result of a route search is preserved in the navigation base apparatus 150 and the vehicle navigation apparatus 100, and by utilizing this preserved data, it is possible to reduce the amount of data that needs to be transmitted to the vehicle navigation apparatus 100.

(1) The case in which previously searched route/guidance data is preserved in the vehicle navigation apparatus 100:

In this case, the previously searched route/guidance data is preserved in the data storage section 103. In the vehicle navigation apparatus 100, the current position of the vehicle measured by the position measuring section 104 is compared with the data preserved in the data storage section 103, and a judgement is made as to whether or not there exists route/guidance data corresponding to the current position of the vehicle (Step S130 in FIG. 8(A)). This judgement is carried out by determining whether or not the current position of the vehicle is included in any of the surrounding areas of the course-change points stored in the data storage section 103 as shown in FIG. 7(D). For example, in the case shown in FIG. 4, the current position of the vehicle is compared with the surrounding areas A1, A2 and A3, respectively.

As a result, if there exists a surrounding area corresponding to the current position of the vehicle and thereby corresponding route/guidance data is judged to exist, such route/guidance data is utilized. For example, in case shown in FIG. 4, if the driver of the vehicle wishes to proceed to another location PC (not shown in the drawing) after traveling from the departure point PD to the destination PA, the route/guidance data for the surrounding area of the location PA is still stored in the data storage section 103 from the time when a route was searched from PD to PA. Accordingly, by utilizing such previously stored data, there is no need to send the vehicle navigation apparatus 100 new route/guidance data for such area. On the other hand, in the case where it is judged that there exists no corresponding route/guidance data, a flag is set to request route/guidance data for the current position of the vehicle (Step S131).

This flag is transmitted to the navigation base apparatus 150 together with departure point data and destination data. In the navigation base apparatus 150, the system control section 152 checks as to whether or not data for this flag is contained. When there is no flag, no corresponding route/guidance data is transmitted, but when there is a flag, entire route/guidance data for the searched route is transmitted. On the other hand, in the vehicle navigation apparatus 100, the processing section 101 combines the route/guidance data transmitted from the navigation base apparatus 150 with the route/guidance data preserved in the data storage section 103 to construct a sequential set of route/guidance data like that shown in FIG. 7. In this way, it becomes possible to reduce the amount of data to be transmitted to the vehicle navigation apparatus 100 without any obstacle to the route guidance.

(2) The case in which previously searched route/guidance data is preserved in the navigation base apparatus 150 and the vehicle navigation apparatus 100:

In this case, in the vehicle navigation apparatus 100, the previously searched route/guidance data is preserved in the data storage section 103, and in the navigation base apparatus 150, the previously searched route/guidance data is preserved in the data base 153 together with the driver ID.

Further, in the navigation base apparatus 150, reference is made to the preserved data of the related driver ID prior to the transmission of route/guidance data at Step S9 in FIG. 3. If it is determined that no related data exists in the vehicle navigation apparatus 100, the navigation base apparatus 150 then transmits such route/guidance data to the vehicle navigation apparatus 100. With this method, it becomes possible to reduce the amount of data that needs to be transmitted to the vehicle navigation apparatus 100 in the same manner as was described for the method in (1) above.

Other Modifications

The first embodiment of the present invention includes many other modifications, and it is possible to make various changes based on the modifications described above. For example, the present invention includes the following:

(1) The contents of the road data, intersection data and area guidance data in the embodiment described above are not limited thereto, and the contents thereof may be appropriately changed in accordance with need. Further, the format of such data may also be changed appropriately.

(2) In the first embodiment described above, the route/guidance data extracted at the beginning of the route guidance is transmitted all at once from the navigation base apparatus 150 to the vehicle navigation apparatus 100. However, the present embodiment is not limited to this, and it is also possible to divide the route/guidance data into a plurality of parts and then transmit each of the parts to the vehicle navigation apparatus 100 according to the position of the vehicle on the route. Further, as described above in the case where the departure point and destination are extremely far apart, a considerably huge amount of route/guidance data must be transmitted to the vehicle navigation apparatus. Therefore, by transmitting such divided data, it is possible to reduce the amount of data that needs to be stored in the vehicle navigation apparatus 100.

(3) In the embodiment described above, guidance data is transmitted not only for the surrounding areas of the course-change points, but also for the surrounding areas of the departure point and destination. However, in the case where the departure point and destination are known areas (e.g., one's own house and the like), such data isn't always necessary. Accordingly, the navigation base apparatus 150 may be instructed not to transmit surrounding area guidance data for the departure point and destination to the vehicle navigation apparatus 100, namely, the navigation base apparatus 150 can be instructed to transmit surrounding area guidance data only for the intermediate course-change points. Further, the driver may select area guidance data when needed.

(4) The route/guidance data transmitted from the navigation base apparatus 150 may be supplemented with data obtained from VICS or the like. Namely, even when VICS information has been considered at the time when the route/guidance data is produced by the navigation base apparatus 150, there is a possibility that road conditions have changed at the point in time when the vehicle navigation apparatus 100 receives such route/guidance data. For this reason, it is preferable if the vehicle navigation apparatus can receive VICS information during travelling, and then use such information for route guidance.

(5) Even though the embodiments described above were adapted for use with vehicles, the present invention is not limited to such use, and it is possible to adapt the present invention to a variety of moving bodies such as a portable moving terminal.

As described above, the first embodiment of the present invention realizes the following effects:

(i) Since detailed guidance data is transmitted to the vehicle navigation apparatus (moving body) only for the surrounding areas of the course-change points in the searched route, it becomes possible to reduce the amount of data that needs to be transmitted from the navigation base apparatus 150 to the vehicle navigation apparatus 100.

(ii) since the detailed guidance data for the course-change points which form the main portion of the searched route is transmitted, it becomes possible to carry out a highly reliable route guidance even when the amount of data that needs to be transmitted from the navigation base apparatus 150 to the vehicle navigation apparatus 100 is reduced.

(iii) Since navigation data necessary for route is transmitted from the navigation base apparatus 150, there is no need for the vehicle navigation apparatus 100 to store various data such as route data, search data and guidance data and the like. This makes it possible to simplify the structure of the vehicle navigation apparatus 100.

Second Embodiment

Next, a detailed description of the second embodiment of the present invention will be given below. In this connection, a detailed description of the structure and the operation which are the same as those of the first embodiment is omitted, and only different points will be described.

The feature of the navigation system of the second embodiment resides in that the user can select necessary navigation data (information) at the vehicle. Namely, according to this embodiment, necessary navigation data to be transmitted from the navigation base apparatus is freely selected by the user at the vehicle navigation apparatus by designating one or more of guidance items. For example, the user can request to the navigation base apparatus to send detailed guidance data only for intersections at which the vehicle should turn to right or left or to send only simple road information at the vehicle navigation apparatus by selecting appropriate guidance items.

In response to the request from the user, the navigation base apparatus carries out a route search using the data base, and then, based on the searched route, extracts data corresponding to the selected items sent from the vehicle. The searched route data and the extracted guidance data (route/guidance data) are then transmitted to the vehicle.

At the vehicle navigation apparatus, maps are displayed and voice guidance is carried out based on the route/guidance data transmitted from the navigation base apparatus. Namely, guidance for the route which has been searched in response to the request from the vehicle is carried out using the guidance data for the selected items sent from the vehicle.

According to this system, since a route search is carried out at the navigation base apparatus not the vehicle navigation apparatus, it is not necessary for the vehicle navigation apparatus to equip with any data such as map data or the like, thus making it possible to simplify the structure of the vehicle navigation apparatus. Further, since only guidance data which has been requested from the vehicle navigation apparatus is transmitted, it is possible to reduce the amount of the data to be transmitted from the navigation base apparatus to the vehicle navigation apparatus.

Figure 18:
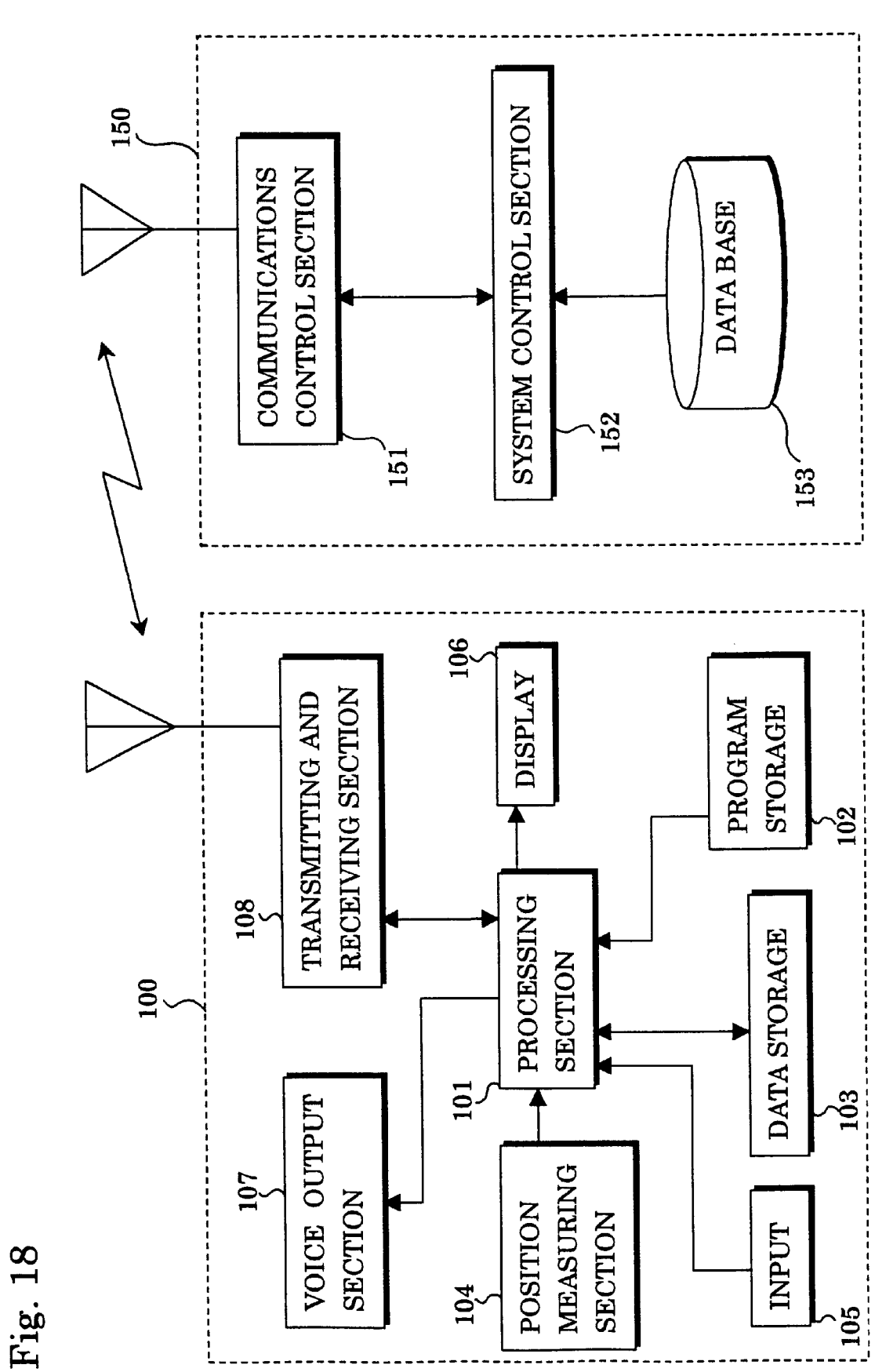
FIG. 18 is a block diagram which shows a second embodiment of a communications navigation system according to the present invention.

FIG. 18 shows the second embodiment of the communications navigation system according to the present invention. As is the same with the first embodiment, the navigation system of the second embodiment includes a navigation base apparatus 150 arranged at a base location and a vehicle navigation apparatus 100 mounted in a vehicle as a moving body. This block diagram is substantially the same as that shown in FIG. 1 for the first embodiment excepting that the position correcting section 154 shown in FIG. 1 is omitted.

In this second embodiment, the data base 153 of the navigation base apparatus 150 stores data for guidance items to be selected at the vehicle navigation apparatus and guidance data corresponding to the respective guidance items in addition to the route search/guidance data and the data related thereto which are the same as those of the first embodiment. The data for the guidance items and the corresponding guidance data are stored in the data base 153 in the form of tables. The details thereof will be described later.

The program storage section 102 of the vehicle navigation apparatus 100 serves as a memory for storing the various programs executed by the processing section 101. Examples of the programs include a program for selection of guidance items by the user; a program for displaying a searched route on the display 106 based on the route/guidance data transmitted from the navigation base apparatus 150; and a program for outputting the voice guidance via the voice output section 107; and the like.

Further, the data storage section 103 functions as a working area during the program execution and stores data such as the following:

(i) Route/guidance data transmitted from the navigation base apparatus 150.

(ii) Individual ID data of the vehicle.

(iii) Vehicle position data (Longitude, Latitude) measured by the position measuring section 104.

(iv) Data for guidance items for selecting a type of guidance, and data for selection screen.

FIG. 19 shows an example of types of guidance (guidance items) among which the user can select a desired type of guidance. As shown in this figure, this example includes the following four guidance areas to be selected by the user for obtaining guidance information.

(i) Surrounding area of departure point (ii) Surrounding area of destination (iii) Surrounding area of course-change point (e.g., intersection or fork at which the vehicle must change a course)

(iv) Intermediate sections

In this case, the user can select any one or more of these guidance areas for which the user needs to have guidance information. Of course, user can select all of these areas if necessary.

Among these guidance areas, "surrounding area of departure point", surrounding area of destination and "surrounding area of course-change point" are used to designate a data area from which corresponding guidance data is extracted. For example, when "surrounding area of departure point" is selected, the guidance data corresponding to the surrounding area around the departure point is extracted. Further, the guidance item "intermediate sections" means an intermediate section between one surrounding area and the next surrounding area. When this item is selected, the guidance data corresponding to the intermediate route is extracted.

Further, the type of available guidance is determined for each guidance area. Namely, with regard to the guidance areas "surrounding area of departure point", "surrounding area of destination" and "surrounding area of course-change point", either one or more of the following guidance types (guidance information) are available.

(i) Recommended route (indicated by only lines)

(ii) Recommended route (with detailed information)

(iii) Detailed information for its surrounding area

For example, when "surrounding area of destination" and "surrounding area of course-change point" are selected as the types of guidance area and "detailed information for its surrounding area" is selected as the type of the available guidance, detailed guidance data is extracted for the "surrounding area of destination" and "surrounding area of course-change point".

Further, with regard to the guidance type "intermediate sections", the following two types of guidance are available.

(i) Information concerning the distance to the course-change point and the direction to be proceed at the course-change point (hereinafter, referred to as "distance and direction information")

(ii) Detailed information for the intermediate section

For example, when the "distance and direction information" is selected, guidance data for the distance to the course-change point and the direction to be proceed at the course-change point in connection with the intermediate section is extracted. The guidance data described above with reference to FIG. 19 is stored in the data storage section 103 of the vehicle navigation apparatus 100 in the form of tables.

For example, each of the types of available guidance is linked with the corresponding guidance data specified in FIG. 20, respectively. The left column of this figure shows the types of available guidance which can be selected by the user as described above. Further, the right column shows the guidance data corresponding to each of the types of available guidance. When any one of the types of available guidance is selected at the vehicle navigation apparatus 100, the corresponding guidance data is extracted at the navigation base apparatus 150 and is transmitted to the vehicle navigation apparatus 150. This guidance data can be formed by using any one of a bitmap data format, a vector data format and a combined thereof.

For example, when user selects "guidance of recommended route (indicated by only lines)" from the types of available guidance, only commonly used setting data and image data for the searched route and the other route are read out of the data base 153, and transmitted to the vehicle navigation apparatus 100. The commonly used setting data includes information such as, for example, each road number of the searched route; road length of a road corresponding to each road number; and direction to be proceed at the course-change point, and the like. In this embodiment, the data for the types of available guidance and each of guidance data therefor shown in FIG. 20 are stored in the data base 153 of the navigation base apparatus 150 in the form of tables, but they may be stored in the vehicle navigation apparatus 100.

Hereinafter, operations of the second embodiment of the navigation system will be described.

(2) Initial Operations at the Vehicle Navigation Apparatus

First, a description will be given for the initial operations at the vehicle navigation apparatus 100. The initial operations include the following operations.

(i) Measuring current position of the vehicle and inputting a destination data (ii) Selecting a type of guidance.

(2-1) Measuring Current Position of the Vehicle and Inputting the Destination Data.

In the same manner as the first embodiment, current position of the vehicle is measured, and the destination data is inputted. Then, based on the information transmitted from the vehicle navigation apparatus 100, the navigation base apparatus 150 determines the departure point and the destination (see FIG. 8(A) and FIG. 8(B)).

(2-2) Selecting Operation for the Type of Guidance at the Vehicle Navigation Apparatus Next, a description will be made with regard to selecting operation for the type of guidance by the user at the vehicle navigation apparatus.

Figure 21:
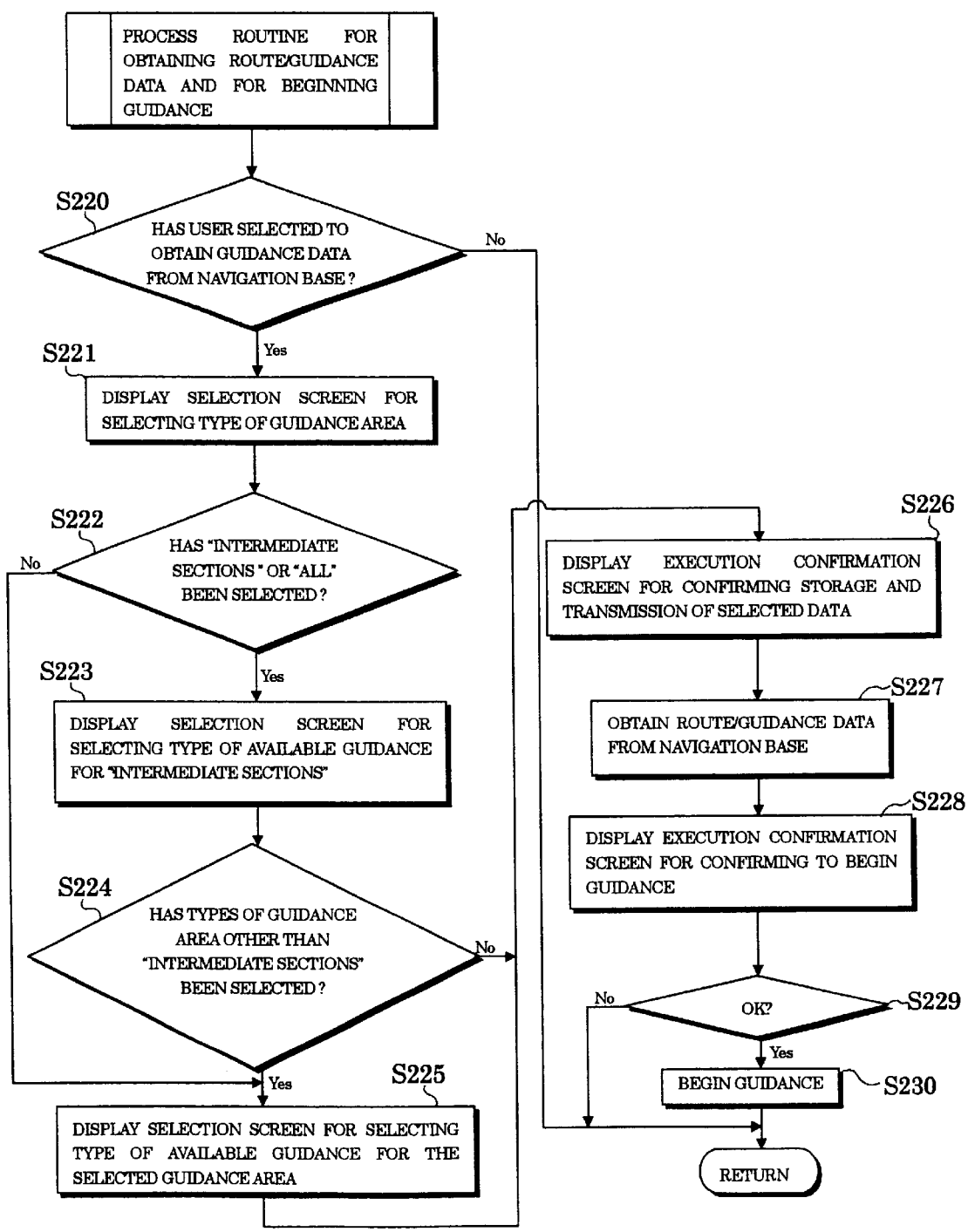
FIG. 21 is a flow chart which shows operation in the vehicle navigation apparatus.

FIG. 21 is a flow chart which shows processes at the vehicle navigation apparatus 100 from a point of time when guidance data is to be obtained to a point of time when guidance is started using the obtained route/guidance data.

First, a selection screen (not shown in the drawings) for determining as to whether or not the user needs to get guidance data from the navigation base apparatus 150 is displayed on the display 106 based on the data sent from the processing section 101. At this point, the user (e.g., a driver) can select to get the guidance data on this screen (step S220). In this connection, the display 106 is formed into a touch panel having a plurality of icons, in which the selection is carried out by touching the corresponding icon.

Figure 22:
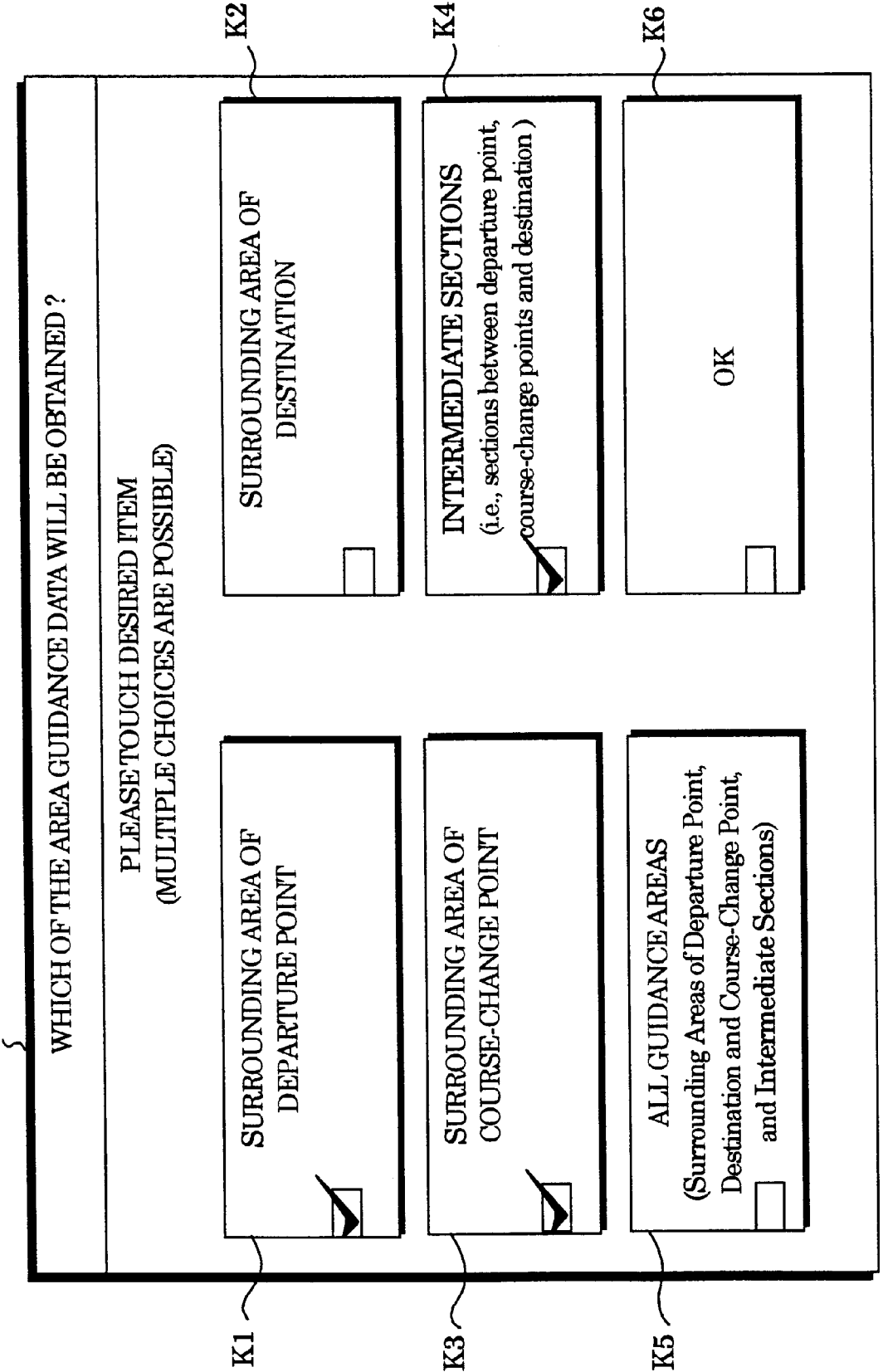
FIG. 22 is an illustration which shows one example of a selection screen for selecting icons for selectable items.

Then, the processing section 101 extracts predetermined data for producing a selection screen for selecting a guidance area from the data storage section 103, and displays the selection screen on the display 106 (Step S221). FIG. 22 shows an example of such selection screen. The user can touch an icon of a desired guidance area on the display 106 to select the guidance area. As shown FIG. 22, a checked mark is indicated in a square portion for the icon which has been selected by user, so that the user can confirm that the selection has been properly made. The example shown in this figure shows the state that the icon K1 for "surrounding area of departure point", the icon K3 for "surrounding area of course-change point" and the icon K4 for "intermediate sections" have been selected as the desired guidance areas.

In this connection, it is to be noted that the icon K1 for "surrounding area of departure point", the icon K2 for "surrounding area of destination", the icon K3 for "surrounding area of course-change point" and the icon K4 for "intermediate sections" may be selected alone or in combination of two or more. When the user hopes to select all types of the guidance area including "surrounding area of departure point", "surrounding area of destination" and "surrounding area of course-change point" and "intermediate sections", the user can select the icon K5 for "all guidance areas".

In the case where the departure point and destination are well known places, it is sufficient for the driver to have area guidance data only for the areas around the course-change points between the departure point and the destination. However, in the case where the driver is not clear about which direction to proceed at the departure point, it is convenient for the driver to have area guidance data around the departure point. Further, in the case where the driver needs to have information on the presence or absence of parking and various facilities in the area around the destination, it is convenient for the drive to have area guidance data around the destination. For these reasons, the selection screen of the display 106 of the vehicle navigation apparatus 100 of this embodiment is configured so as to be able to make various selections described above.

After selection of the desired icons, the user touches the icon K6 (OK?). This causes the processing section 101 to judge whether or not the icon K4 for "intermediate sections" or the icon K5 for "all guidance areas" is selected (Step S222). When the processing section 101 judges that the icon K4 for "intermediate sections" has selected, a selection screen for selecting a type of guidance for the "intermediate sections" (see FIG. 19) is displayed on the display 106 (Step S223 in FIG. 21).

Figure 23:
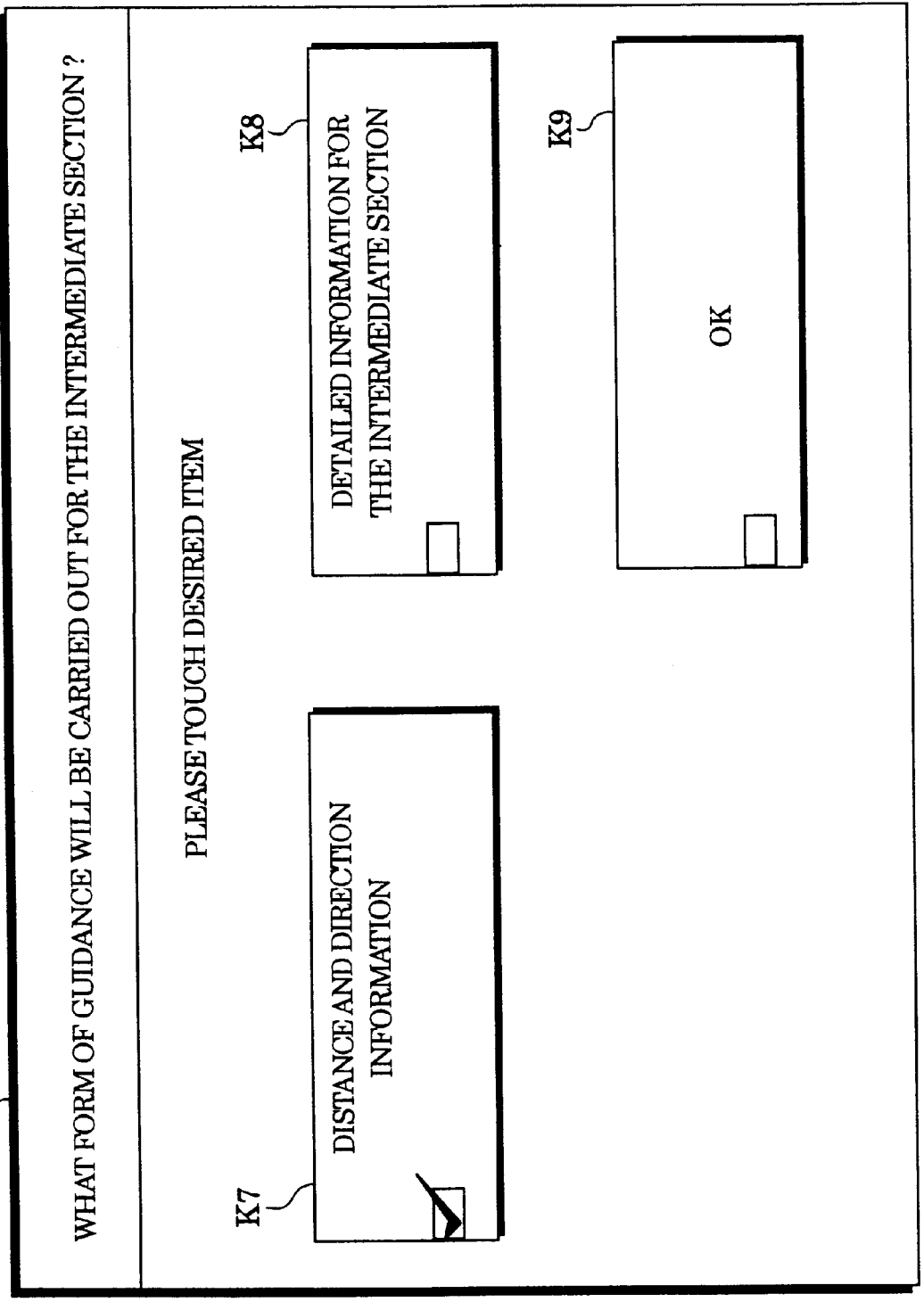
FIG. 23 is an illustration which shows one example of another selection screen for selecting icons for selectable items.

FIG. 23 shows an example of such a selection screen. The user can touch an icon of a desired guidance for the intermediate section on the display to select the type of guidance. When such selection is made, the square portion of the selected icon is checked in the same manner as described above, whereby it becomes possible for the user to confirm that the selection has been properly made. The example shown in FIG. 23 shows a situation in which the icon K7 for "distance and direction information" has been selected from among the icons K7 and K8. In this case, the user can select only any one of the icon K7 for "distance and direction information" and the icon K8 for "detailed information for the intermediate sections". Then, the user can touch the icon K9 (OK?) after the selection of the desired icon.

Then, in the processing section 101, a judgement is made as to whether or not the types of guidance area other than "intermediate sections" have been selected (Step S224). When the processing section 101 has judged that the types of guidance area other than "intermediate sections" has been selected, that is, at least one of "surrounding area of departure point", "surrounding area of destination" and "surrounding area of course-change point" has been selected, a selection screen for selecting the type of available guidance for the selected guidance area (see FIG. 19) is displayed on the display 106 (Step S225 in FIG. 21).

Figure 24:
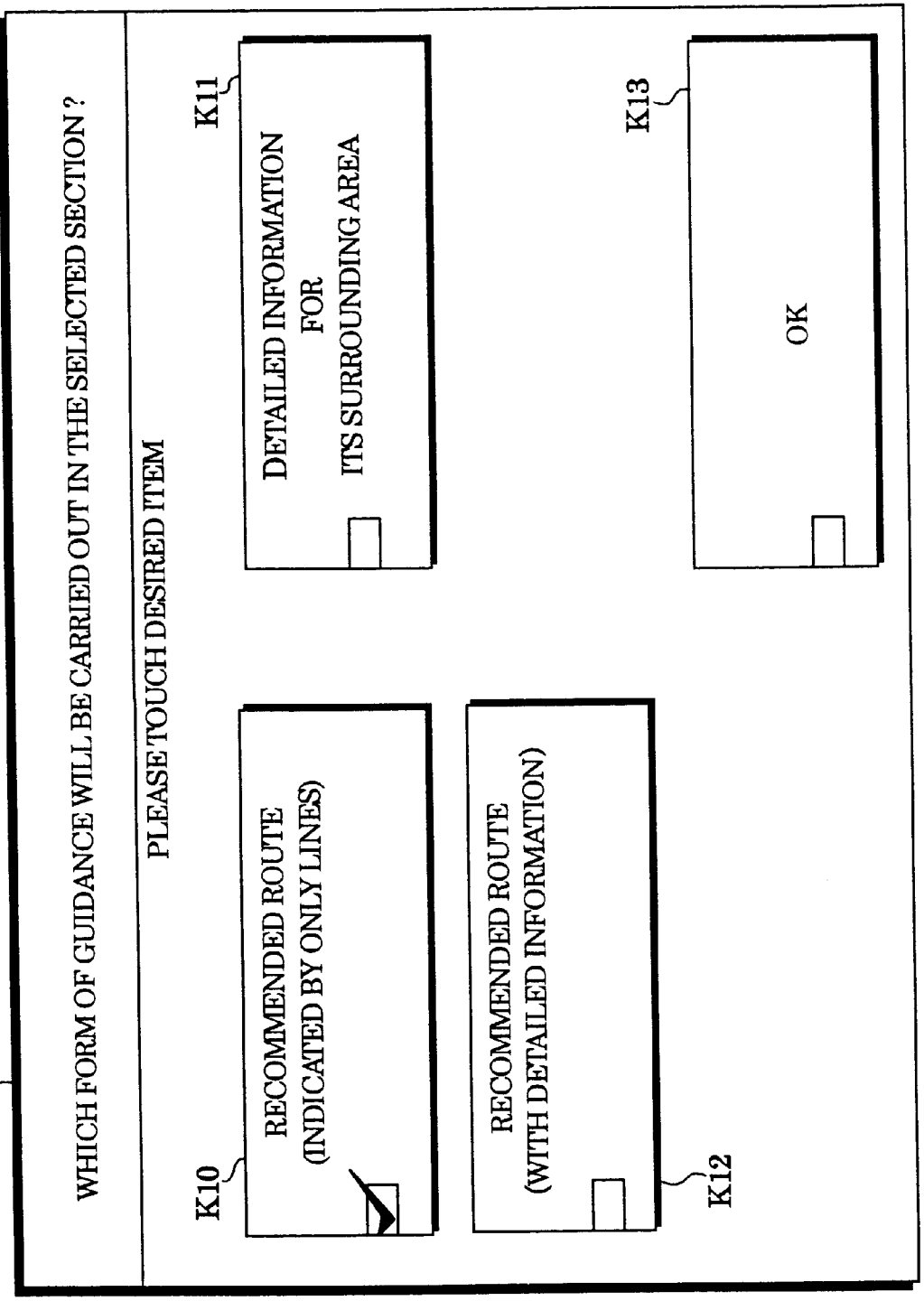
FIG. 24 is an illustration which shows one example of other selection screen for selecting icons for selectable items.

FIG. 24 shows an example of such a selection screen. The user can touch an icon of a desired type of available guidance on the display to select it. The example shown in FIG. 24 shows a situation in which the icon K10 for "guidance of recommended route (indicated by only lines)" has been selected from among the icons K10 to K12. In this case, the user can select any one of the icons K10 to K12. Then, the user selects the icon K13 (OK?) after the selection of the desired icon.

Figure 25:
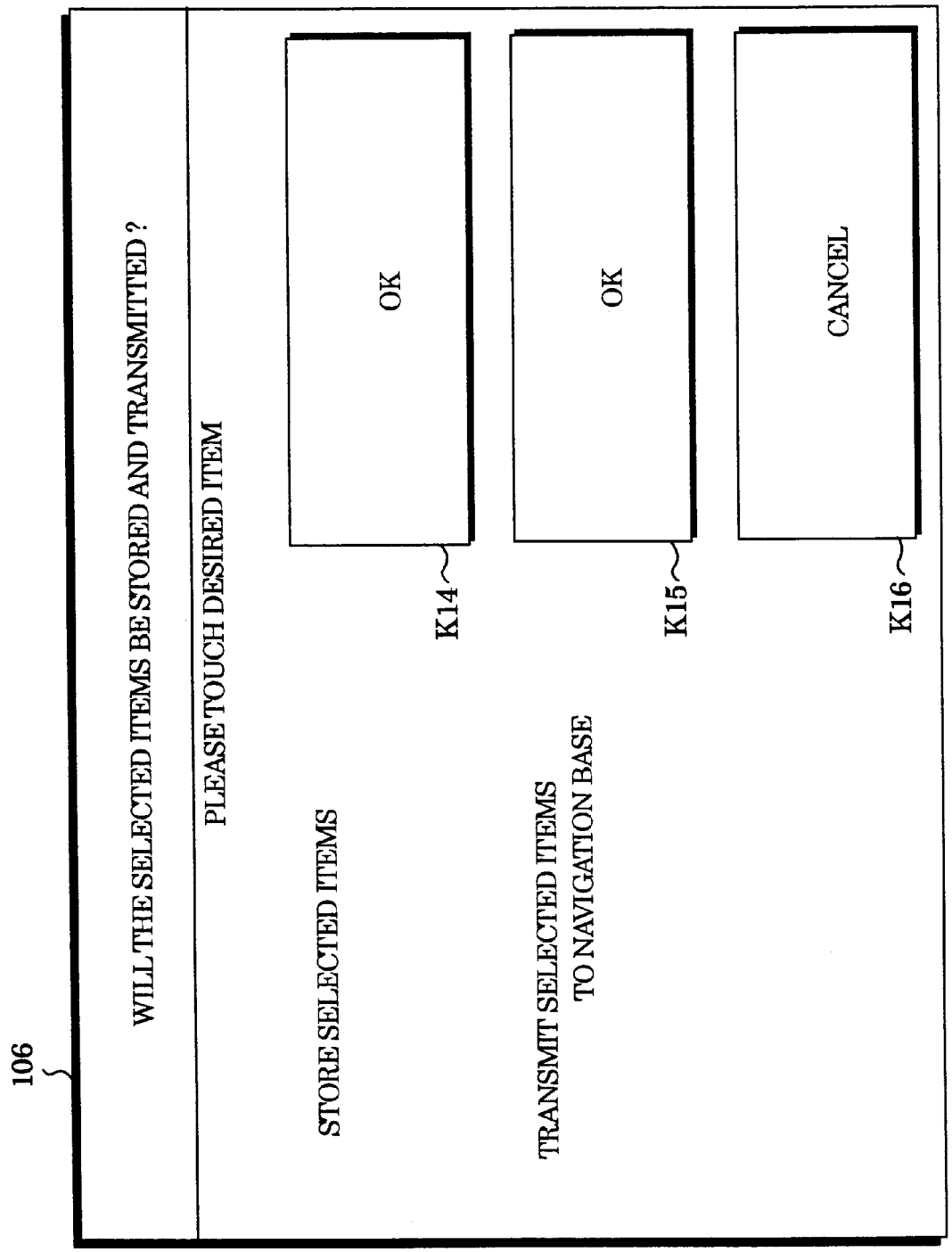
FIG. 25 is an illustration which shows one example of other selection screen for saving or transmitting data for the selected items.

Next, as shown in FIG. 25, an execution confirmation screen for confirming as to whether the above described selected data should be stored and transmitted is displayed on the display 106 by the processing section 101 (Step S226). When the icon K14 (OK?) is selected on this execution confirmation screen, the selected data (that is, data for the selected items) is stored in the data storage 103. In this regard, when the user needs to have the same guidance having the same selected items, the stored data for the selected items are transmitted to the navigation base apparatus 150, so that it will not be necessary for the user to carry out the above described selecting operations again. Further, if the data of the selected items is stored at the navigation base apparatus 150 with the user information such as user's vehicle ID, it will be able to obtain the same route/guidance data in the next time by merely transmitting the vehicle ID and the request for the route/guidance data to the navigation base apparatus 150.

Further, when the icon K15 (OK?) is selected on the execution confirmation screen shown in FIG. 25, the data for the selected items is also transmitted to the navigation base apparatus 150.

FIG. 26 is a table in which the selected items made in the examples shown in FIGS. 22 to 24 are summarized. In this figure, flag "1" means the selected item and flag "0" means unselected item. Namely, with regard to the types of guidance area, "surrounding area of departure point", "surrounding area of course-change point" and "intermediate sections" are selected, and with regard to the types of available guidance, "guidance of recommended route (indicated by only lines)" and "distance and direction information" are selected.

In connection with the selection screen shown in FIG. 25, it is to be noted that when the user needs to cancel the selected Items, the user merely touches the icon K16 (cancel).

In the navigation base apparatus 150, guidance data for the selected items produced according to the flow chart shown in FIG. 21 is extracted from the guidance data for the searched route which has been produced through the same processes as those carried out in the first embodiment (see FIG. 8(A) and FIG. 8(B)).

Figure 27:
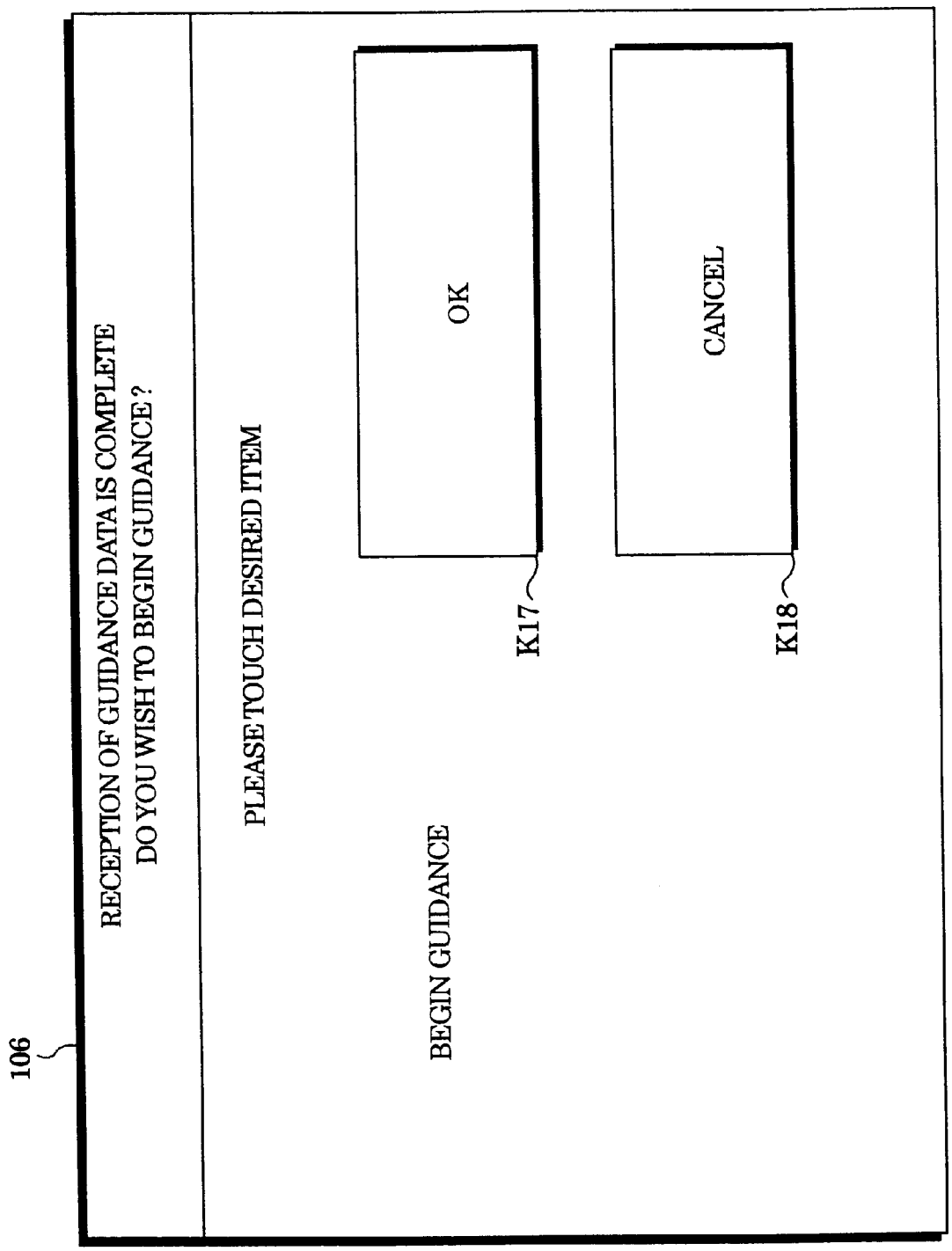
FIG. 27 is an illustration which shows one example of a selection screen for starting guidance.

The data for the searched route and the guidance data for the selected items are transmitted from the navigation base apparatus 150 to the vehicle navigation apparatus 100 (Step S227), and then they are stored in the data storage section 103. When these data are received, a guidance start confirmation screen for confirming as to whether or not the guidance should start is displayed on the display 106 as shown in FIG. 27. When the icon K17 (OK?) is selected on the guidance start confirmation screen, the guidance is started (a "YES" decision at Step S229, and Step S230). On the other hand, when the icon K18 (cancel) is selected, the guidance is canceled, and the processes shown in FIG. 21 are terminated.

(3) Operations at the Navigation Base Apparatus

Hereinbelow, a description will be made with regard to the operations of the second embodiment of the navigation base apparatus 150.

(3-1) Determination for Departure Point and Destination

The departure point and the destination are determined by the system control section 152 of the navigation base apparatus 150 in the same manner as the first embodiment (see Steps S1 and S2 in FIG. 3).

(3-2) Recommended Route Search

Next, a recommended route from the established departure point to the established destination is searched by the system control section 152 of the navigation base apparatus 150 using the data base 153 in the same manner as the first embodiment (see Step S3 in FIG. 3).

(3-3) Course-Change Points Search

Next, when the item "surrounding area of course-change point" is included in the selected items, the intersection judgement process is carried out by the system control section 152 in the same manner as the first embodiment (see Step S4 in FIG. 3).

(3-4) Establishing Surrounding Area and Extracting Area Guidance Data

Next, for each course-change point, a predetermined range which includes the course-change point is established as the surrounding area in the same manner as the first embodiment. Then, area guidance data for the selected items which has been produced according to the process shown in FIG. 21 is extracted from among the map data, road data and intersection data for the established surrounding areas, and is read out from the data base 153 (see Steps S5 to S8 in FIG. 3).

In this connection, the data for the types of available guidance and each guidance data corresponding thereto are stored in the database 153 in the form of tables as shown in FIG. 20. Therefore, the system control section 152 retrieves these tables and extracts the guidance data for the selected items for each surrounding area from the data base 153.

In the example shown in FIG. 26, "surrounding area of departure point" and "surrounding area of course-change point" are selected as the types of guidance area, and "guidance of recommended route (indicated by only lines)" is selected as the type of available guidance. As a result of these selections, guidance data corresponding to "guidance of recommended route (indicated by only lines)" for each of these selected surrounding areas, that is the commonly used setting data and the image data for the searched route and the other route for each of these selected surrounding areas (see FIG. 20) is extracted from the data base 153. Further, with regard to the types of guidance area, "intermediate sections" is also selected, and in connection with this "distance and direction information" is also selected at the type of available guidance. Therefore, guidance data corresponding to the selected item "distance and direction information", that is the commonly used setting data for the intermediate section is extracted from the data base 153. In this example, since "surrounding area of destination" is not selected, no guidance data is extracted for the surrounding area of destination".

(3-5) Transmitting Route/Guidance Data (Navigation Data)

Thus obtained route/guidance data (navigation data) which includes the road data, the intersection data and the area guidance data is transmitted to the vehicle navigation apparatus 100 of the vehicle in the same manner as the first embodiment (see Step S9 in FIG. 3).

In this second embodiment of the present invention, navigation data corresponding to the selected items which have been selected by the user at the vehicle is extracted from each data shown in FIG. 7, and then transmitted to the vehicle navigation apparatus 100.

(4) Operations of the Vehicle Navigation Apparatus

Next, a description will be given for the operations of the vehicle navigation apparatus 100 during the route guidance.

(4-1) Surrounding Area of Departure Point

As the vehicle begins its travel, a map is displayed on the display 106, and a guidance voice is outputted via the voice output section 107 in the same manner as the first embodiment (see Steps S106 and S107 in FIG. 8(B)).

(4-2) Intermediate Sections

When the vehicle proceeds along the searched route and then it is judged by the processing section 101 that the vehicle has passed out of the surrounding area of the departure point, map matching is suspended. Then, guidance information for the intermediate section such as a simple guidance screen image like that shown in FIG. 10(A) is displayed on the display 106 (see Step S109 and "No" decision at Step S110 in FIG. 8(B)).

(4-3) Surrounding Area of Course-Change Points

Now, when the vehicle further proceeds along the searched route, and it is judged that the vehicle has entered the surrounding area of the course-change point, map matching is resumed in the same manner as the first embodiment (see Step S111 in FIG. 8(B)). Further, a map corresponding to the surrounding area is displayed on the display 106 in the same manner as the first embodiment.

(4-4) Surrounding Area of Destination

When the vehicle further proceeds along the searched route and it is judged by the processing section 101 that the vehicle has entered the surrounding area of the destination, map matching is resumed in the same manner as the first embodiment (see Step S116 in FIG. 8(B)). Further, a map corresponding to the surrounding area of the destination is displayed on the display 106 in the same manner as the first embodiment.

In this regard, it is to be noted that in the example shown in FIG. 26, "surrounding area of destination" was not selected. Therefore, in this surrounding area of the destination, guidance is carried using only the commonly used setting data.

Selected Items and Examples of Display Images Based on the Selected Item

Hereinbelow, the relationship between the selected items and the examples of the display images based on the selected items will be described with reference to FIG. 28 to FIG. 32.

In FIG. 28 to FIG. 32, each table (A) shows the selected items selected by the user, and each of the drawings (B) to (E) in FIG. 28 and each drawing (B) in FIG. 29 to FIG. 32 shows a display image produced based on the guidance data for the selected items which has been transmitted from the navigation base apparatus 150.

In the example shown in FIG. 28(A), "surrounding area of departure point", "surrounding area of destination" and "surrounding area of course-change point" are selected as the desired types of guidance area. Further, "guidance of recommended route (indicated by only lines)" is selected as the desired type of available guidance. In this case, "the commonly used setting data" and "the image data for the searched route and the other route" are transmitted from the navigation base apparatus 150 as the guidance data as shown in FIG. 20. Using the transmitted guidance data, one of the maps as shown in FIGS. 28(B) to 28(E) is displayed on the display 106 for each of "surrounding area of departure point", "surrounding area of destination" and "surrounding area of course-change point". Namely, FIG. 28(B) shows a map of the surrounding area around the departure point, FIGS. 28(C) and 28(D) respectively show a map of the surrounding area around each course-change point, and FIG. 28(D) shows a map of the surrounding area around the destination.

In the example shown in FIG. 29(A), only "intermediate sections" is selected as the desired type of guidance area, and "distance and direction information" is selected as the desired type of available guidance. In this case, only "the commonly used setting data" is transmitted from the navigation base apparatus 150 as the guidance data as shown in FIG. 20. Using the transmitted guidance data, a display image as shown in FIG. 29(B) is displayed on the display 106 during traveling in each intermediate section. Further, the vehicle position mark MA, the road mark MB, the next course-change point information marks MC and MD which respectively indicate the distance to the next course-change point and the direction to be turned at the course-change point are also displayed on the display image.

In the example shown in FIG. 29(B), the mark MC indicates that there is a first course-change point at which the vehicle should turn right is located 14.3 [Km] apart from the current vehicle position (which corresponds to the intersection C3 shown in FIG. 4), and the mark MD indicates that there is a second course-change point at which the vehicle should turn right is located 17.8 [Km] apart from the first intersection (which corresponds to the intersection C6 shown in FIG. 4). In addition to the above information, information concerning the remaining distance to the destination and a required time thereto is also indicated at a lower right portion of the marks MC and MD. These distance information and the time information are produced at the processing section 101 by computing the data for the road length contained in the road data, the current position data and the travelling distance data. In this regard, it is to be noted that the data for the vehicle position MA, the road MB and the like may be stored in the data storage section 103 of the vehicle navigation apparatus 100 beforehand.

The example shown in FIG. 30(A) is the same as the example shown in FIG. 29(A) excepting that "detailed information for the intermediate section" is selected as the desired type of available guidance. In this case, the guidance data to be transmitted from the navigation base apparatus 150 includes "the data for the intersection names", "the directional information data", "the data for lanes of at the intersection" and "the commonly used setting data" as shown in FIG. 20. Therefore, in this example, being different from the example shown in FIG. 29(B), the name of the respective intersection is additionally indicated in each of the marks MC and MD as well as the directional information HA which indicates the names of the towns that can go there from the next intersection and the lane information concerning the lanes at the intersection are also displayed.

In the example shown in FIG. 31(A), only "surrounding area of course-change point" is selected as the desired type of guidance area, and "guidance of recommended route (with detailed information)" is selected as the desired type of available guidance. In this case, the guidance data transmitted from the navigation base apparatus 150 includes "image data for the searched route and other route", "voice guidance data", "road classification data", "data concerning the width of each road" and "commonly used setting data" as shown in FIG. 20. Therefore, according to this example, a simple map which mainly includes indications of the roads and intersection as shown in FIG. 31(B) is displayed as a display image. In this case, each road is drawn taking its width into account. Further, each road is indicated together with the road classification mark ME for indicating the road number of the road such as ROUTE XX and the classification of the road such as highway or secondary road. Furthermore, voice guidance is also carried out.

The example shown in FIG. 32(A) is the same as the example shown in FIG. 31(A) excepting that "detailed information for its surrounding area" is selected as the desired type of available guidance. In this case, the guidance data to be transmitted from the navigation base apparatus 150 includes "image data for the searched route and other route", "voice guidance data", "road classification data", "data concerning the width of each road", "data concerning the lanes at the intersection", "data for the landmarks" and "commonly used setting data" as shown in FIG. 20. Therefore, according to this example, a detailed map which contains the indications of the roads and intersection as well as the surrounding landmarks as shown in FIG. 31(B) is displayed as a display image. In this case, each road is drawn taking its width into account. Further, each road is indicated together with the road classification mark ME for indicating the road number of the road such as ROUTE XX and the classification of the road such as highway or secondary road. Furthermore, the directional information HA which indicates the names of the towns that can go there from the intersection and the lane information concerning the lanes at the intersection are also displayed. Moreover, the landmarks MF which indicate striking buildings which can be used for the guidance sign and the road signal mark MG are also displayed.

The operations carried out in the second embodiment of the navigation system can be summarized as follows:

(i) Guidance data which is needed by the user can be selected at the vehicle navigation apparatus.

(ii) A recommended route is searched at the navigation base. Then, guidance data for the selected items which have been selected at the vehicle navigation apparatus is extracted from the guidance data for the searched route. Then, only the guidance data corresponding to the selected items is transmitted to the vehicle navigation apparatus.

(iii) At the vehicle, route guidance is carried out using the navigation data such as the route data and the guidance data transmitted from the vehicle navigation apparatus.

As a result, amount of data to be transmitted from the navigation base apparatus to the vehicle navigation apparatus is reduced, thereby making it possible to simplify the vehicle navigation apparatus through the reduced memory capacity, for example. In this regard, even with such a reduced amount of the transmitted data, the navigation system described above makes it possible to carry out a precise route guidance because the data necessary at the vehicle is available.

In the second embodiment described above, it is possible to make various modifications such as follows.

(i) The contents of the road data, intersection data and area guidance data in the embodiment described above are not limited thereto, and the contents thereof may be appropriately changed in accordance with need. Further, the format of such data may also be changed appropriately.

(ii) In this embodiment, it is also possible to divide the route/guidance data into a plurality of parts and then transmit each of the parts to the vehicle navigation apparatus 100 according to the position of the vehicle on the route. Although in the case where the departure point and destination are extremely far apart, a considerably huge amount of route/guidance data must be transmitted to the vehicle navigation apparatus, it is possible to reduce the amount of data that needs to be stored in the vehicle navigation apparatus 100 by transmitting such divided data.

(iii) The route/guidance data transmitted from the navigation base apparatus 150 may be supplemented with data obtained from VICS or the like. Namely, even when VICS information has been considered at the time when the route/guidance data is produced by the navigation base apparatus 150, there is a possibility that road conditions have changed at the point in time when the vehicle navigation apparatus 100 receives such route/guidance data. For this reason, it is preferable if the vehicle navigation apparatus can receive VICS information during travelling, and then use such information for route guidance.

(iv) The navigation data such as route/guidance data which is transmitted from the navigation base apparatus may be reserved at the vehicle. According to this arrangement, when the vehicle goes back from the destination to the departure point, the user can use the reserved route/guidance data. Therefore, it is possible to carry out guidance for going back to the departure point without receiving the navigation data from the navigation base apparatus.

In the above described second embodiment, the user can select the types of guidance area and the types of available guidance. However, the present invention is not limited thereto, and it is also possible to pre-set several guidance modes in advance so that a desired type of guidance are and a desired type of available guidance can be selected automatically by selecting any one of the guidance modes.

For example, it is possible to pre-set the following guidance modes.

(i) Detailed Guidance Mode

According to this mode, guidance is carried out using the guidance information shown in FIG. 29 and the guidance information shown in FIG. 32.

(ii) Normal Guidance Mode

According to this mode, guidance is carried out using the guidance information comprised of combination of the guidance information shown in FIG. 29 and the guidance information shown in FIG. 30.

(iii) Simple Guidance Mode

According to this mode, guidance is carried out using the guidance information shown in FIG. 28.

In this modification, the selectable items are not limited to those described above, and it is possible to change them according to needs.

In the second embodiment as described above, the recommended route search is carried out before the selection for the guidance items. However, it is possible to carry out the selection for the guidance items before the recommended route search.

Even though the embodiment described above was adapted for use with vehicles, the present invention is not limited to such use, and it is possible to adapt the present invention to a variety of moving bodies such as a portable moving terminal.

As described above, according to the communications navigation system of the second embodiment of the present invention, the following effects are realized.

(1) Since only navigation data requested from the user at the vehicle is selected from the navigation data for the searched route and then such data is transmitted to the vehicle navigation apparatus, it is possible to reduce the amount of data to be transmitted from the navigation base apparatus to the vehicle navigation apparatus.

(2) Since navigation data necessary for guiding the vehicle along the searched route is transmitted from the navigation base, the vehicle navigation apparatus does not need to have route data, search data and guidance data, thereby making it is possible to simplify the vehicle navigation apparatus.

Third Embodiment

Hereinbelow, a third embodiment of the communications navigation system of the present invention will be described. In this connection, a detailed description of the structure and operation which are the same as those of the first and second embodiments is omitted, and only different points will be described.

In this connection, it is to be understood that this third embodiment of the present invention is directed to a practical method for producing return route data for returning the vehicle to the recommended route (searched route) when the vehicle has strayed from the recommended route during the route guidance, which has been described above in the second modification of the first embodiment with reference to FIG. 14 and FIG. 15. Therefore, the return route data produced according to this third embodiment can be transmitted to the vehicle navigation apparatus 100 from the navigation base apparatus 150 together with the detailed navigation data (route/guidance data) for the surrounding area of the specified position on the recommended route such as the specified intersection.

In more details, in the same manner as the first and second embodiments, the communications navigation system of the third embodiment is comprised of a navigation base apparatus 150 at a base location and a vehicle navigation apparatus 100 at a moving body (see FIG. 1 and FIG. 18).

In this communications navigation system of the third embodiment, the vehicle navigation apparatus 100 transmits data of the current position of the vehicle and the destination to the navigation base apparatus 150 via the transmitting and receiving section 108. Then, after making a search through the data base 153, the navigation base apparatus 150 establishes a recommended route to the destination, and then this recommended route is transmitted to the vehicle navigation apparatus 100. At this time, a return route for returning a vehicle that departs from the recommended route back to the recommended route is also established and transmitted to the vehicle navigation apparatus 100. In this way, by using a return route to return a vehicle that departs from the recommended route back to the recommended route, it becomes possible to continue route guidance without interruption.

The process mentioned above will now be described in detail with reference to the flow charts in FIGS. 33 to 37.

First, the operations carried out by the navigation base apparatus 150 will be described with reference to FIGS. 33 to 37.

Figure 33:
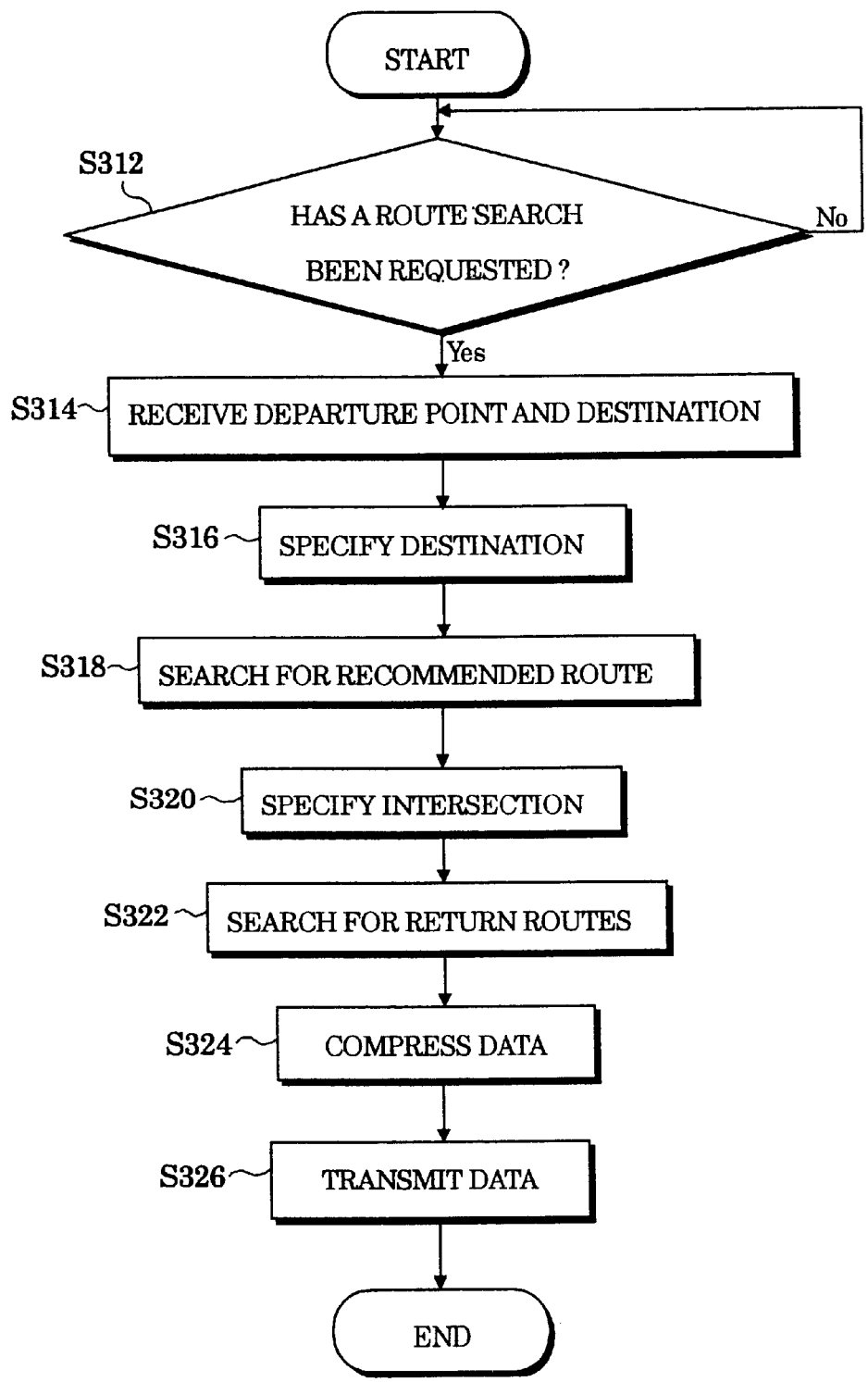
FIG. 33 is a flow chart which shows a main routine for operation at a navigation base apparatus of a third embodiment of a communications navigation system according to the present invention.

First, the system control section 152 of the navigation base apparatus 150 makes a judgement as to whether a route search request has been made (Step S312 in FIG. 33). At this point, if it is determined that a route search request has been made (i.e., a "YES" judgement at S312), the navigation base apparatus 150 receives data on the current position (defined by Longitude and Latitude) of the vehicle and the destination from the vehicle navigation apparatus 100 (Step S314).

After that, the system control section 152 specifies the destination (Step S316). Then, a search for a recommended route from the current position of the vehicle to the destination is carried out through the data base 153, which includes data on the newest maps (Step S318).

After that, the intersections on the recommended route (searched route) requiring left or right turns are specified (Step S320) in the same manner as the first and second embodiments.

Then, a return route is established in a predetermined range for each of the specified intersections of the recommended route to enable the driver to return the vehicle to the recommend route when the vehicle strays off course, for example, when the driver mistakenly turns left at an intersection on the recommended route before the specified intersection where the left turn was supposed to take place, or when the driver mistakenly drives straight through a specified intersection requiring a left turn (Step S322). In this example, the two intersections before and the next intersection after the specified intersection form starting points for establishing return routes to the recommended route, and then data for such return routes are extracted. After that, the recommended route data and return route data are compressed so as to be able to transmit the data within a short time (Step S324), and then these compressed data are transmitted to the vehicle navigation apparatus 100 (Step S326).

Next, with regard to the return route search process at Step S322 described above, a detailed description will be made with reference to the flow chart shown in FIG. 34 and FIG. 35 which respectively shows subroutines for the search process and the processed road data shown in FIG. 38. This description will be made with reference to the example shown in FIG. 38, in which the current position of the vehicle is indicated by M, and the vehicle proceeds on the recommended route passing straight through the intersections Ca and Cb, turning left at the intersection Cc, passing through the intersection Cd, turning right at the intersection Ci and then passing through the intersection Ch.

First, the system control section 152 extracts the specified intersections on the recommended route where a right or left turn is required (Step S342). In this regard, the following description will be made for the case in which the intersection Cc is extracted as a specified intersection one the recommended route where a left turn is required.

Next, road map data is added to the route data of the intersection (Step S344). In this third embodiment, the route data includes data specifying the intersection (e.g. intersections Ca, Cb, Cc, etc.) and the roads entering and exiting the intersections (e.g., roads Ra, Rb, Rc, etc.), and the road map data includes data on prominent structures (e.g., large buildings, smoke stacks, etc.) which serve as landmarks on the roads of the recommend route. Thus, for the left turn required at the specified intersection Cc, the route data is supplemented with road map data for the left side (of proceeding direction) of the specified intersection Cc (that is, road data for the areas A1 and A2).

Next, any one of intersections lying within a predetermined area from the intersection Cc (e.g., either of the two intersections Ca and Cb located before the intersection Cc or one intersection after the intersection Cc) is extracted (Step S346). Namely, any one of intersections within the predetermined area from the specified intersection Cc is extracted in order to establish a return route (using the process described below) for cases in which the driver makes a wrong course change, such as when the driver turns left at an intersection before the specified intersection Cc requiring a left turn or when the driver mistakenly drives straight through the specified intersection Cc requiring a left turn and turns left at the next intersection after the specified intersection Cc. In this example, the description will be continued on the assumption that data for the intersection Ca is extracted.

Next, a return route is extracted (as described below) for the case in which a left turn is mistakenly made at the intersection Ca (Step S348). Then, a judgement is made as to whether or not all the intersections within the predetermined area have been extracted (Step S350). In the case where there remains intersections within the predetermined area that have not been extracted (i.e., a "NO" judgement at Step S350), the routine returns to Step S346, and a return route is extracted for such intersections (Step S348). On the other hand, in the case where it is determined that all the intersections within the predetermined area have been extracted (i.e., a "YES" judgement at Step S350), the routine proceeds to Step S352, and a judgement as to whether or not there are any remaining specified intersections is carried out. At this point, if there are any remaining specified intersections (i.e., a "YES" judgement at Step S352), the next specified intersection is extracted (Step S358), for example, after the intersection Cc has been processed, the specified intersection Ci located after the intersection Cc is extracted. Then, the program returns to Step S344, and the route data of the specified intersection Ci is supplemented with road map data for the side of the turning direction at the intersection Ci (that is, for the areas A3 and A4 shown in FIG. 38) for guiding the driver through the right turn at the specified intersection Ci. On the other hand, if all the specified intersections have been processed (i.e., a "NO" judgement at Step S352), the program pulls up the return route search routine. With this process, a return route is established for each case in which the intersections Ca, Cb and Cg respectively serve as the starting point, resulting in a total of three return routes being established.

In this regard, it is to be noted that as described above, the present embodiment does not extract a return route for every intersection on the recommended route, and, instead thereof, extract a return route only for those places where it is easy for the driver to mistake the timing of a left or right turn, namely, for intersections within areas having a high probability of causing a driver to stray from the recommended route, it becomes possible to easily carry out the process of extracting a return route.

Next, a more detailed description of the above-described process of extracting a return route (Step S348) will be given with reference to the process subroutine shown in FIG. 35. This description will be given for the example in which a return route for returning the vehicle to the recommended route is extracted when the driver mistakenly turns left at the intersection Ca in FIG. 38.

First, after the vehicle turns left at the intersection Ca, the system control section 152 judges whether or not the next intersection Ce is a course-change point that allows the vehicle to turn in a direction toward the recommended route (e.g., a right turn at the intersection Ce places the vehicle on a path toward the recommended route) (Step S362). In the case where it is not possible to turn toward the recommended route due to a non entry road r or the like (i.e., a "NO" judgement at Step S362), the system control section 152 then judges whether or not the next intersection after the intersection Ce is a course-change point that allows the path of the vehicle to turn in a direction toward the recommended route (Step S362). However, in this example, since the vehicle is able to turn right at the intersection Ce (i.e., a "YES" judgement at Step S362), the intersection Ce will be established as a first course-change point (Step S364). In this way, by using left and right turns to return the vehicle to the recommended route, the driver can avoid U-turns, and this makes it possible to return the vehicle to the recommended route in a short amount time. Then, a judgement is carried out as to whether or not the vehicle can be returned to the recommended route with one turn (Step S366).

At this point, if it is not possible for such single turn to return the vehicle to the recommend route (i.e., a "NO"

judgement at Step S366), a judgement is then carried out as to whether or not the next intersection (in this example, the intersection Cf) is a course-change point that allows the vehicle to turn in a direction toward the recommended route (in this example, a right turn at the intersection Cf) (Step S368). In this example, since it is possible for the vehicle to make a right turn at the intersection Cf (i.e., a "YES" judgement at Step S368), the intersection Cf will be established as ae second course-change point (Step S370). Then, a judgement is carried out as to whether or not a right turn at the intersection Cf will return the vehicle to the recommended route (Step S372). In this example, because a right turn at the intersection Cf will return the vehicle to the recommended route (i.e., a "YES" judgement at Step S372), the routine proceeds to Step S378.

On the other hand, in the case where a turn at the second course-change point Cf does not return the vehicle to the recommended route (i.e., a "NO" judgement at Step S372), a judgement is carried out as to whether or not the next intersection that the vehicle comes to (in this example, the intersection Cd) is a course-change point that allows the vehicle to turn in a direction toward the recommended route (Step S374). At this point, if a "YES" judgement is made at Step S374, such intersection is established as a third course-change point (Step S375). Then, a judgment is carried out as to whether or not a turn at the third course-change point will return the vehicle to the recommended route (Step S376). At this point, if a "YES" judgement is made at Step 376, that is the vehicle can be returned to the recommended route, the routine proceeds to Step S378. On the other hand, in the case where turns at the first, second and third course-change points do not return the vehicle to the recommended route (i.e., a "NO" judgement at Step S376), the system control section 152 decides that it is not possible to establish a return route to the recommended route (Step S380).

Now, in the case where the vehicle can be returned to the recommend route (i.e., a "YES" judgement at Steps S366, S372 and S376), the routine proceeds to Step S378, and a judgement is carried out as to whether or not the return route returns to the intersection Ca where the wrong course was taken or returns to an intersection that has passed through before entering into the Intersection Ca. This judgement is made due to the following reason. Namely, in the case where there is a return route that makes it possible to return the vehicle to the recommended route but such a route passes through the original intersection Ca where the wrong course was taken, use of such a route creates a long detour and this leads to wasted time. For this reason, when the return route returns the vehicle to the recommend route via the original intersection Ca where the wrong course was taken (i.e., a "YES" judgement at Step S378), the system control section 152 decides that it is not possible to establish a return route to the recommended route (Step S380). On the other hand, in the case where the return route does not return to the original intersection Ca where the wrong course was taken (i.e., a "NO" judgement at Step S378), such as in the case of the present example in which the return path returns to the recommended route via the intersection Cb instead of the intersection Ca, such a return route is established as a proposed route (Step S386). Then, the distance to the destination is calculated for the case in which the proposed route is used (Step S388).

After that, a judgement is made as to whether or not all return routes for returning the vehicle to the recommended route have been examined (step S390). However, until all the return routes have been examined (i.e., until a "NO" judgement is made at Step S390), the routine proceeds to Step S384, and another return route is examined. In this regard, when examining another route, different turning directions are examined for the course-change points established in Steps S366 to S375. Thus, for the example shown in FIG. 38, instead of turning right at the second course-change point (intersection Cf) as was described in the return route examined above, an examination is carried out to determine if it is possible to return the vehicle to the recommended route without turning right at the second course-change point (intersection Cf). In this example, because it is possible to return the vehicle to the recommended route via the intersection Cd by driving straight through the second course-change point (intersection Cf), a "NO" judgement will be made at Step S378, and then this new route (which makes a right turn at the first course-change point (intersection Ce) and proceeds straight through the second course-change point (the intersection Cf)) is established as a proposed route (Step S386). Then, the distance of the route is calculated (Step S388).

Then, after all the routes have been examined by repeating the process described above (i.e., a "YES" judgement at Step S390), the shortest route from the proposed routes is established as the return route. For the example shown in FIG. 38, because the second route which turns right at the first course-change point (intersection Ce) and proceeds straight through the second course-change point (intersection Cf) is shorter than the first route which turns right at both the first course-change point (intersection Ce) and the second course-change point (intersection Cf), the second route is established as the return route. After that, the travel distance of the established return route is compared with the travel distance of the recommended route, and a Judgement is made as to whether or not the travel distance of the return route is longer than such predetermined value (Step S394), and if, for example, the return route is twice greater than the distance of the recommended route (i.e., a "YES" judgement at Step S394), the return route is established as a route requiring attention (Step S396), and then the subroutine for extracting the returned route is pulled up.

Further, the subroutine process described above (see the flow chart of FIG. 34) is configured such that a return route for returning the vehicle to the recommended route is established for two intersections before the specified intersection and one intersection after the specified intersection for each specified intersection on the recommended route (i.e., each intersection requiring a left or right turn). Namely, with regard to the specified intersection Cc (which requires a left turn) in the example shown in FIG. 38, a return route is established for the intersections Ca and Cb (which come before the specified intersection Cc) and the intersection Cg (which comes after the specified intersection Cc).

Figure 39:
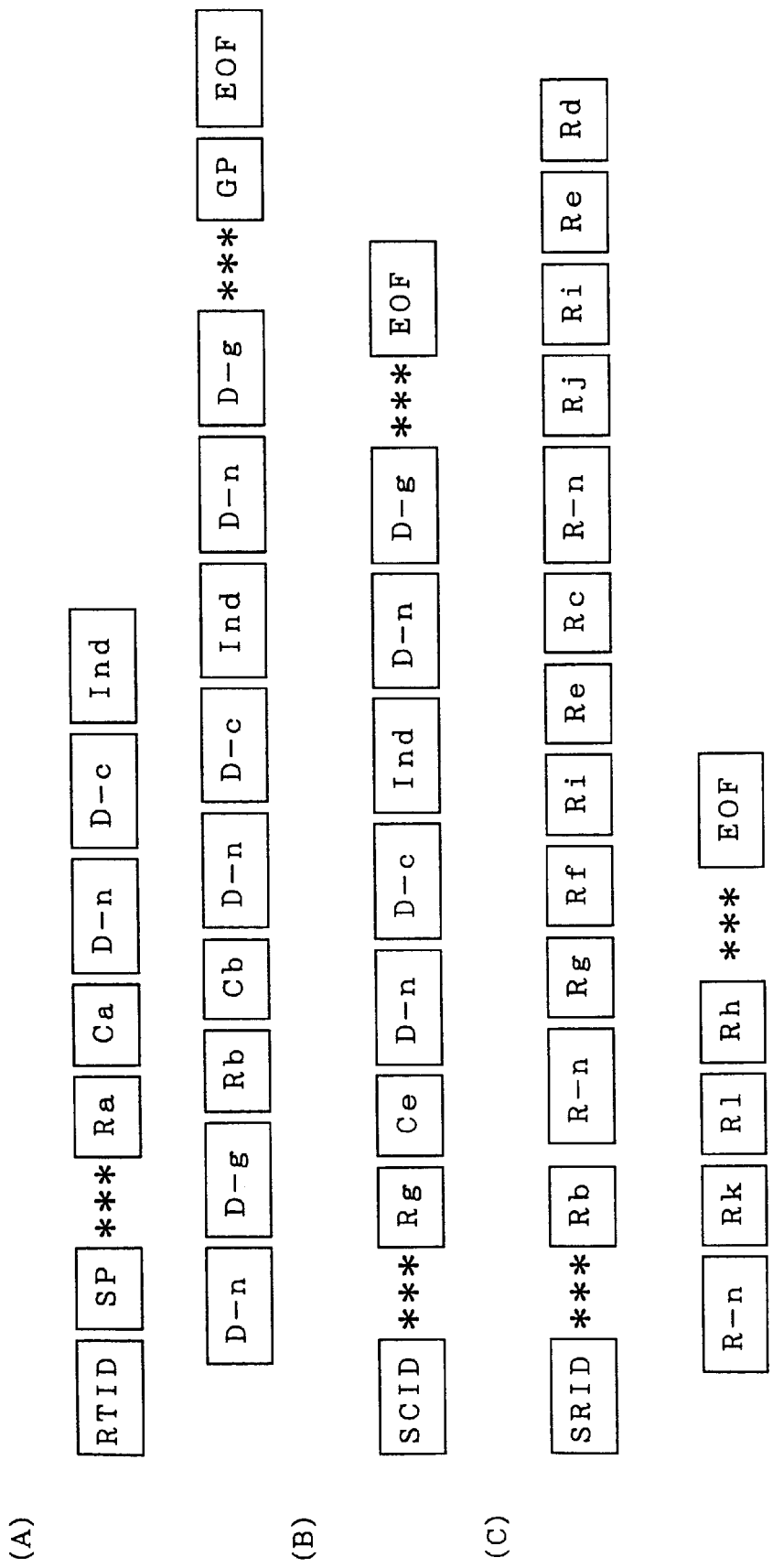
FIGS. 39(A) (B) and (C) are diagrams which respectively show the relationship between the data structure for the recommended route and the data structure for the return routes.

Next, with reference to FIG. 39, a description will be given for the structure of the recommend route data and return route data.

Namely, the field RTID in FIG. 39(A) indicates that the following data is route data. Similarly, the field SCID in FIG. 39(B) indicates that the following data is an alternative route for the case when the vehicle strays from the recommended route, and the field SRID in FIG. 39(C) indicates that the following data is route data related to the alternative route of SRID.

Figure 38:
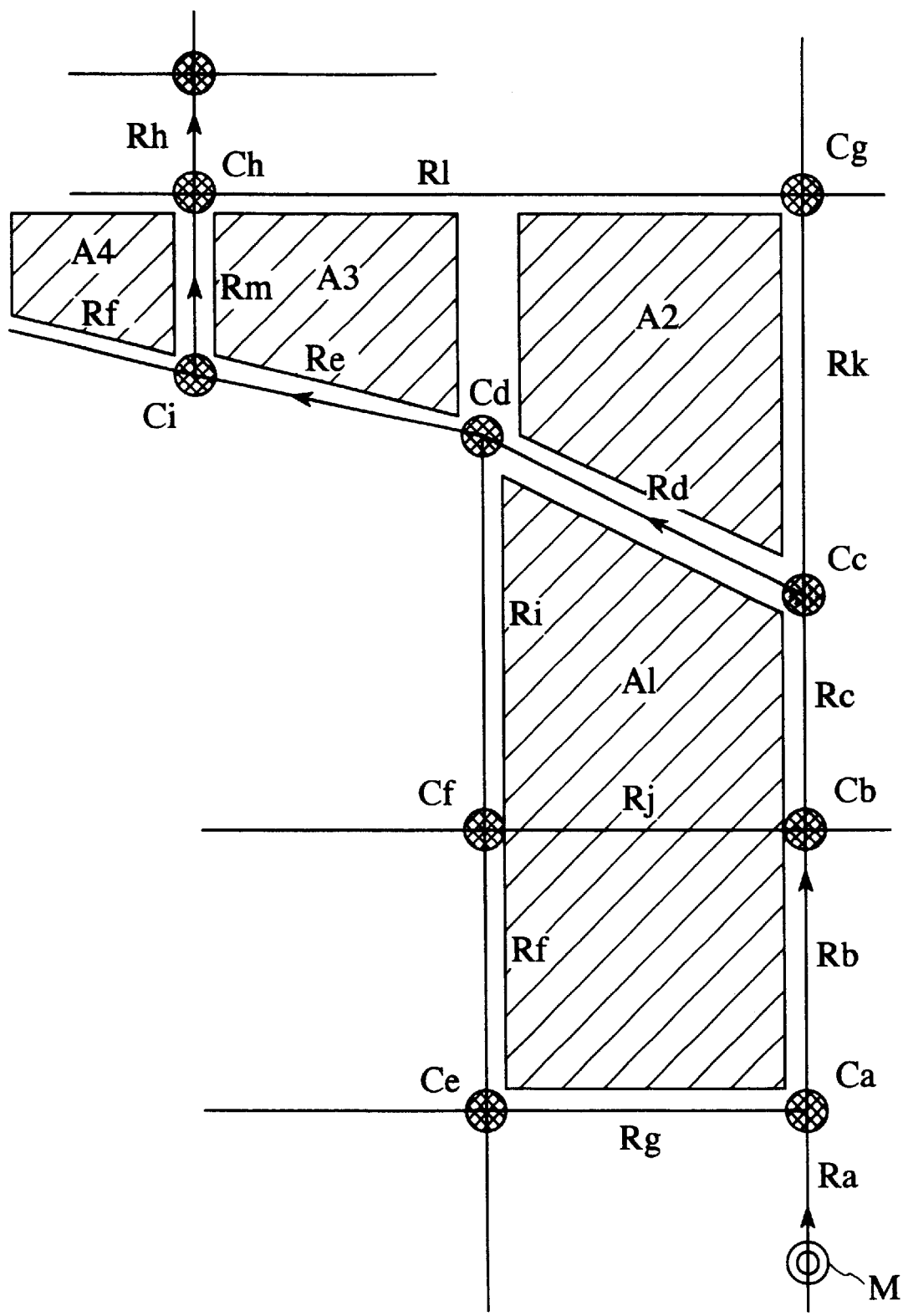
FIG. 38 is an illustration for explaining route guidance on roads carried by the vehicle navigation apparatus of the third embodiment.

Further, in FIGS. 39(A) to 39(C), the designation SP indicates the field in which data related to the departure point is established, the designation GP indicates the field in which data related to the destination is established, the designation EOF indicates the field showing the end of a file record, the designations Ra~Rm indicate the fields that hold the road numbers shown in FIG. 38, the designations Ca, Cb, Ce indicate the fields that hold the intersection numbers shown in FIG. 38, the designation D-n indicates the field that holds the size of the following fields, the designation D-c indicates the field in which the route coordinates data is established, the designation D-g indicates the field in which data for intersection guidance is established, and the designation Ind indicates the field which holds the processing contents at the intersections.

A more detailed description will now be given for the data structure of the recommended route data and return route data transmitted to the vehicle navigation apparatus 100 from the navigation base apparatus 150.

In this regard, FIG. 39(A) shows the data structure of the recommended route, FIG. 39(B) shows the data structure of the return route data, and FIG. 39(C) shows the data structure of the stored road numbers of the return route.

In FIG. 39(A), the field RTID is a field indicating that the following data is recommended route data. Further, the field SP stores data for specifying the current position of the vehicle on the recommended route. For example, the field SP stores data indicating the current position (defined by Longitude and Latitude) of the vehicle, and data indicating the road number of the road of the recommended route where the current position of the vehicle is located. In this regard, in the case where the current position is not located on the recommended route, the field SP stores data indicating the distance and direction to the recommended route.

Further, each of the fields Ra, Rb, . . . , Rm is a field for storing route numbers. Namely, in each of these fields, there is provided with a group of fields which includes a field for storing data indicating intersection numbers (e.g., Ca, Cb, . . . ), a field for storing the size of the next field (i.e., the D-n field), a field for storing data indicating the coordinates of the route (i.e., the D-c field), a field for storing data indicating the process to be carried out at an intersection (i.e., the Ind field), a field for storing the size of the next field (i.e., the D-n field), and a field for storing data indicating the process to be carried out at the intersection (i.e., the D-g field).

The intersection data indicates the intersection numbers and the process that will be carried out at such intersection having the number thereof. In the present embodiment, this data is stored in the fields Ca, Cb, . . . and the field D-g.

Further, in the present embodiment, the road map data is stored in the field D-g and includes bit map data for landmarks and display position data for such landmarks.

The field D-c stores a plurality of coordinate data for constructing the section of the recommended route corresponding to the route number, and by connecting the plurality of coordinate data in a predetermined order, it is possible to display the recommended route.

The field D-g stores various data, including intersection name data, landmark bit map data (road map data), landmark display position data, intersection shape data for displaying an enlarged view of the intersection, and audio data for carrying out audio guidance and the like. In this regard, in the case where none of this data has been transmitted, the field D-g stores data indicating that there is no such data stored therein.

Examples of the above forms of data can be understood with reference to FIGS. 40(A) to 40(C). Namely, as for the intersection name data, data for producing "XY Intersection" information as shown in FIG. 40(B) is stored. Further, as for the landmark bit map data, bit map data which can produce an image of the department store as shown in FIG. 40(C) is stored. Furthermore, as for the intersection shape data used for displaying an enlarged view of the intersection, data which can produce an image as shown in FIG. 40(A) is stored. Moreover, as for the audio data for audio guidance, data such as "ZZ km to XY Intersection" is stored.

Further, the 1nd field stores data indicating which data in the field D-g will be used to be processed at the vehicle navigation apparatus 100, or indication that such process will not be carried. Examples include data indicating that a process will be carried out for displaying only the intersection name, data indicating that only audio guidance based on audio data will be carried out, data indicating that only audio guidance based on audio data will be carried out, data indicating that all processes will be carried out, or data indicating that all processes will not be carried out.

The field SCID indicates that the following data is return route data. The field SRID indicates that the following data is road data of the return route. This field includes the fields Rb, R-n, Rg, Rf, Ri and Re which show the route numbers of the recommend route as being represented by Rg, Rf, Ri and Re for the case in which the vehicle turns left at the intersection Ca and does not pass through the route Rb. The field R-n stores the number of route numbers. In this example, four route numbers are stored. Thus, by transmitting the data represented by the field SRID from the navigation base apparatus 150 to the vehicle navigation apparatus 100, there is no need for the vehicle navigation apparatus 100 to revise this data into a Table with such structure.

In this case, in the case where the distance (i.e., length) of the return route exceeds a predetermined value, data indicating such fact may be added to the SCID field.

Figure 36:
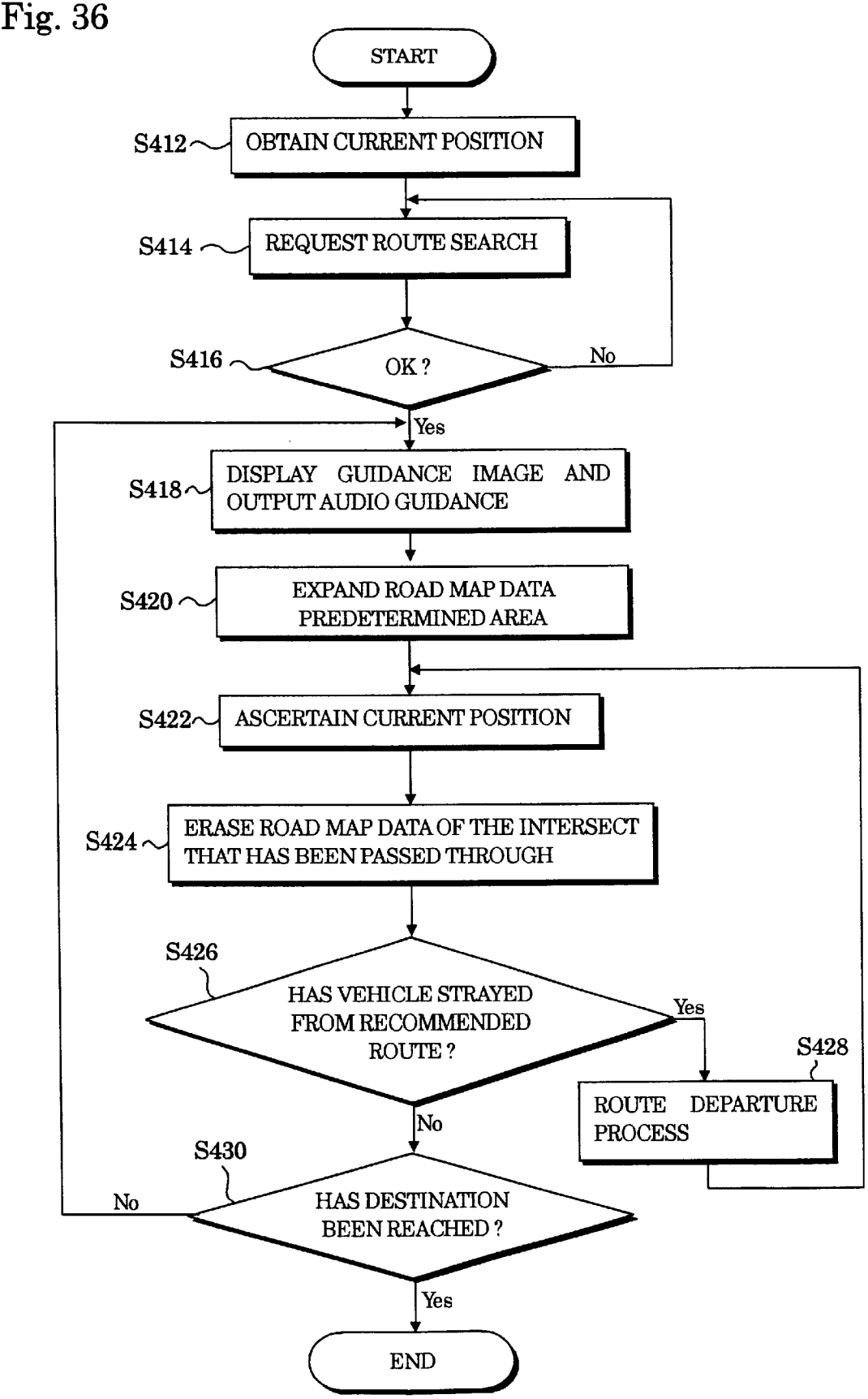
FIG. 36 is a flow chart which shows a main routine of a process carried out in the vehicle navigation apparatus according to the third embodiment.

Next, a description of the processes carried out by the vehicle navigation apparatus 100 in the vehicle will be given with reference to the flow charts of FIGS. 36 and 37.

Namely, when the driver (or some other person in the vehicle) inputs a destination via the input 105 and requests a route search, the processing section 101 (see FIG. 1) of the vehicle navigation apparatus 100 starts a process for obtaining a recommended route. First, the processing section 101 obtains the current position (coordinates) of the vehicle measured by the position measuring section 104 (Step S412). Next, the current position and the destination are transmitted to the navigation base apparatus 150 via the transmitting and receiving section 108, and then the vehicle navigation apparatus 100 receives the recommended route and return route created by the process described above with reference to FIGS. 33 to 35. Then, a judgement is made as to whether or not the obtained recommended route should be processed (Step S416). For example, in the case where a request is made for a route to a Western-style restaurant, a judgement is made as to whether or not the obtained recommended route is a route to the desired restaurant, and in the case where the judgement is "NO" (at Step S416), the routine returns to Step S414, and a request is made for another route to a different Western-style restaurant.

On the other hand, in the case where the obtained recommended route is approved (i.e., a "YES" judgement at Step S416), a recommended route guidance like that shown in FIG. 40(A) or 40(B) is displayed on the display (liquid crystal display) 106, and voice guidance is carried out by outputting audio guidance from the voice output section 107 (Step S418). In this case, based on the data transmitted from the navigation base apparatus 150, this process makes it possible to give the driver advance notice of intersections requiring left or right turns, as well as indicate the direction (i.e., left or right) of the turn at each of such intersections.

For example, at a location of about 500 m before the specified intersection Cc requiring a left turn in FIG. 38, the voice output section 107 would output the instructions "Turn left at the intersection in 500 m" and the display 106 would display a corresponding image.

Next, road map data within a predetermined area from the current position of the vehicle is expanded and then such data is stored in the data storage 103 (Step S418). For example, in the case where the vehicle is at a position M lying before the intersection Ca shown in FIG. 38, road map data (i.e., Areas A1 and A2) for the specified intersection Cc lying ahead of the vehicle is expanded.

In this connection, because the large amount road map data compressed and transmitted from the navigation base apparatus 150 limits the range in which such data can be expanded, only those sections having a high probability of being needed at the present moment are expanded, and this makes it possible to store such data in a small-capacity data storage 103.

Further, in the vehicle navigation apparatus 100, the intersection numbers (Ca, Cb, . . . ) and the process (D-g) related to such intersection numbers are stored in the data storage 103. Accordingly, it is possible to index the intersection numbers and read out processing data for the intersections.

Next, the current position of the vehicle is ascertained (confirmed) (Step S422). Then, the map data related to the specified intersection which has just been passed through is erased (Step S424). For example, after the vehicle has turned left at the specified intersection Cc shown in FIG. 38, the road map data related to the intersection Cc is erased, and then road map data (i.e., Areas A3 and A4) related to the next specified intersection Ci is made so as to be storable in the data storage 103. Then, based on the ascertained current position, a judgement is made as to whether or not the vehicle has strayed from the recommended route (Step S426). In the case where the vehicle has not strayed from the recommended route (i.e., a "NO" judgement at Step S426), a judgement is made as to whether or not the destination has been reached (Step S430), and until the destination has been reached (i.e., as a long as a "NO" judgement is made at Step S430), the routine returns to Step S418 and route guidance is continued based on the recommended route.

Figure 37:
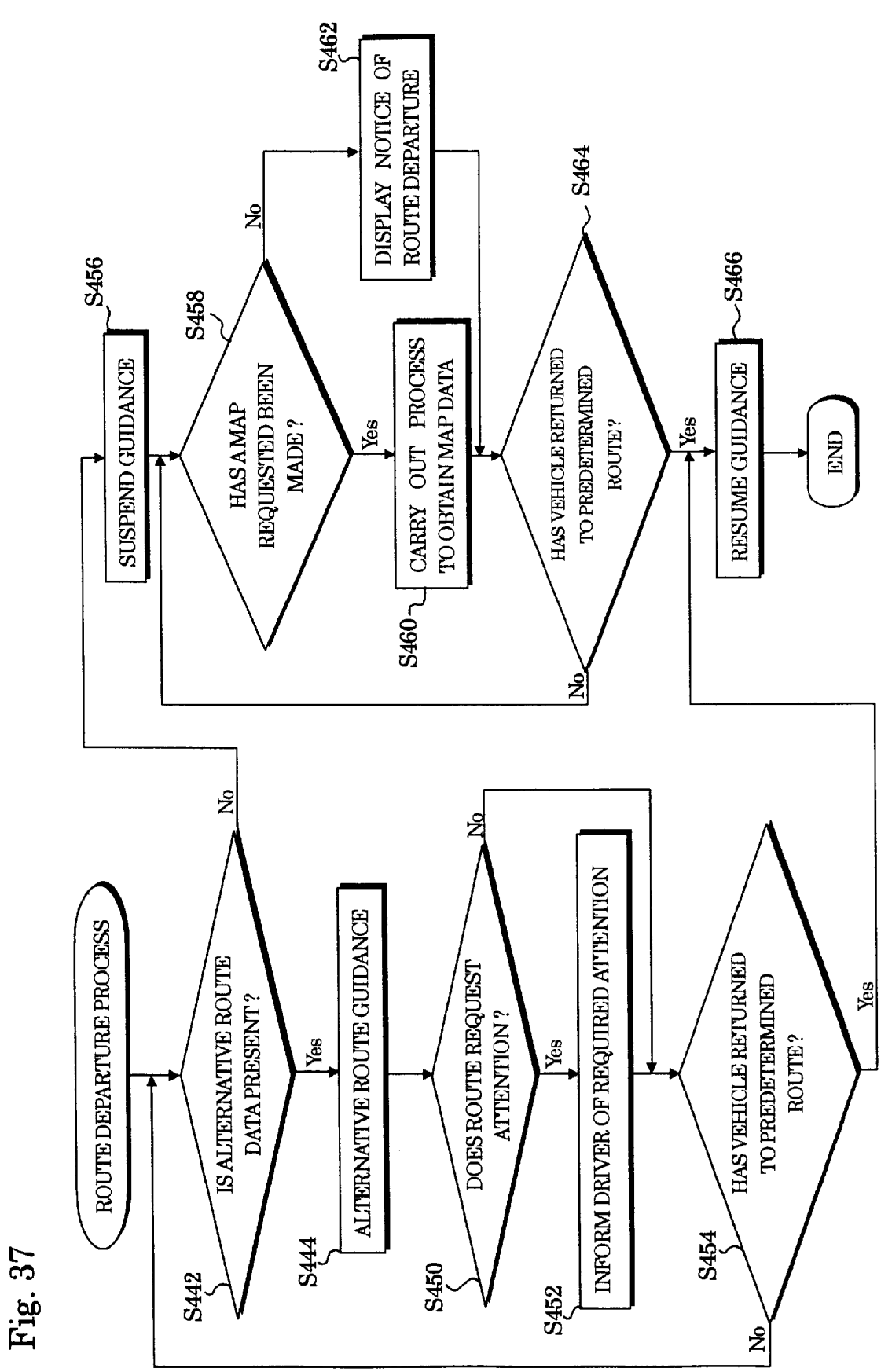
FIG. 37 is a flow chart which shows a process carried out in the vehicle navigation apparatus of the third embodiment when the vehicle strays from the recommended route.

However, if the vehicle has strayed from the recommended route (i.e., in the case where a "YES" judgement is made at Step S426), a route departure process subroutine like that shown in the flow chart of FIG. 37 is carried out (Step S428).

First, the processing section 101 makes a judgement as to whether or not data for creating a return route (alternative route) for returning the vehicle to the recommended route from the current position is present (Step S442). At this point, if data for are turn route is present (i.e., a "YES" judgement at Step S442), an alternative route guidance is carried out based on such return route (Step S444). For example, a display like that shown in FIG. 40(C) is carried out based on the road map data for the area A1, in which a department store, fire station and bank are displayed as landmarks, the recommended route is indicated with R1, the path of the vehicle departing from the recommended route is indicated with R2, the return route to be taken is indicated with R3, and a route incapable of returning the vehicle to the recommend route is indicated with R4 leading to the mark "X". Then, audio guidance and a display image are used to guide the driver to turn left at the intersection near the bank (i.e., intersection Cc shown in FIG. 38) and pass straight through the intersection near the fire station (i.e., the intersection Cf shown in FIG. 38).

Next, a judgement is made as to whether or not the return route should be established as a route requiring attention due to a large distance being established at Step S396 (Step S450). In the case where the return route is established as a route requiring attention (i.e., a "YES" judgement at Step S450), audio guidance and image display are used to inform the driver that the return route is a long route (Step S452).

Then, a judgement is made as to whether or not the vehicle has returned to the recommended route (Step S454), and until the vehicle returns to the recommended route (i.e., so long as a "NO" judgement is made at Step S454), the routine returns to Step S442, and the alternative route guidance to return the vehicle to the recommended route is continued. On the other hand, if the vehicle has returned to the recommended route (i.e., a "YES" judgement at Step S454), the routine proceeds to Step S466, and then route guidance for the recommended route is resumed in accordance with the flow chart shown in FIG. 36.

On the other hand, in the case where it is judged at Step S442 that there is no alternative route, for example, during route guidance along a return route outside the recommended route, if the driver also strays from such return route (i.e., a "NO" judgement at Step S442), the routine proceeds to Step S456 and route guidance is suspended.

Then, a judgement is made as to whether or not a request for map data for returning the vehicle to the recommended route has been made to the navigation base apparatus (Step S458). At this point, if no request for a map has been made (i.e., a "NO" judgement at Step S458), an image indicating that the vehicle has strayed from the route is displayed (Step S462). Then, a judgement is made as to whether or not the driver has returned the vehicle to a predetermined route (the return route or the recommended route) by his or her own power (i.e., without guidance from the vehicle navigation apparatus 100; Step S464). In the case where the driver has returned the vehicle by his or her own power (i.e., in the case where a "YES" judgement is made at Step S464), route guidance is resumed (Step S466). On the other hand, when a map has been requested (i.e., in the case where a "YES" judgement has been made at Step S458), the vehicle navigation apparatus 100 transmits its own identification (ID) number and the current position of the vehicle to the navigation base apparatus 150. Then, the vehicle navigation apparatus 100 receives a new recommended route or return route corresponding to the destination stored in the navigation base apparatus 150. Then, when the vehicle returns to the predetermined route (i.e., in the case where a "YES" judgement is made at Step S464), route guidance is resumed (Step S466).

In the first embodiment described above, because the recommended route to the destination is transmitted from the navigation base apparatus 150 to the vehicle navigation apparatus 100, it is possible to carry out route guidance based on the newest road map data even when the vehicle navigation apparatus is not provided with the newest storage medium such as a CD-ROM or DVD. Further, because the vehicle navigation apparatus has no need for such recording medium, it becomes possible to provide a compact lightweight and low-cost vehicle navigation apparatus.

Next, a description will be made with reference to a modification of this third embodiment with reference to FIGS. 41 to 44.

Figure 41:
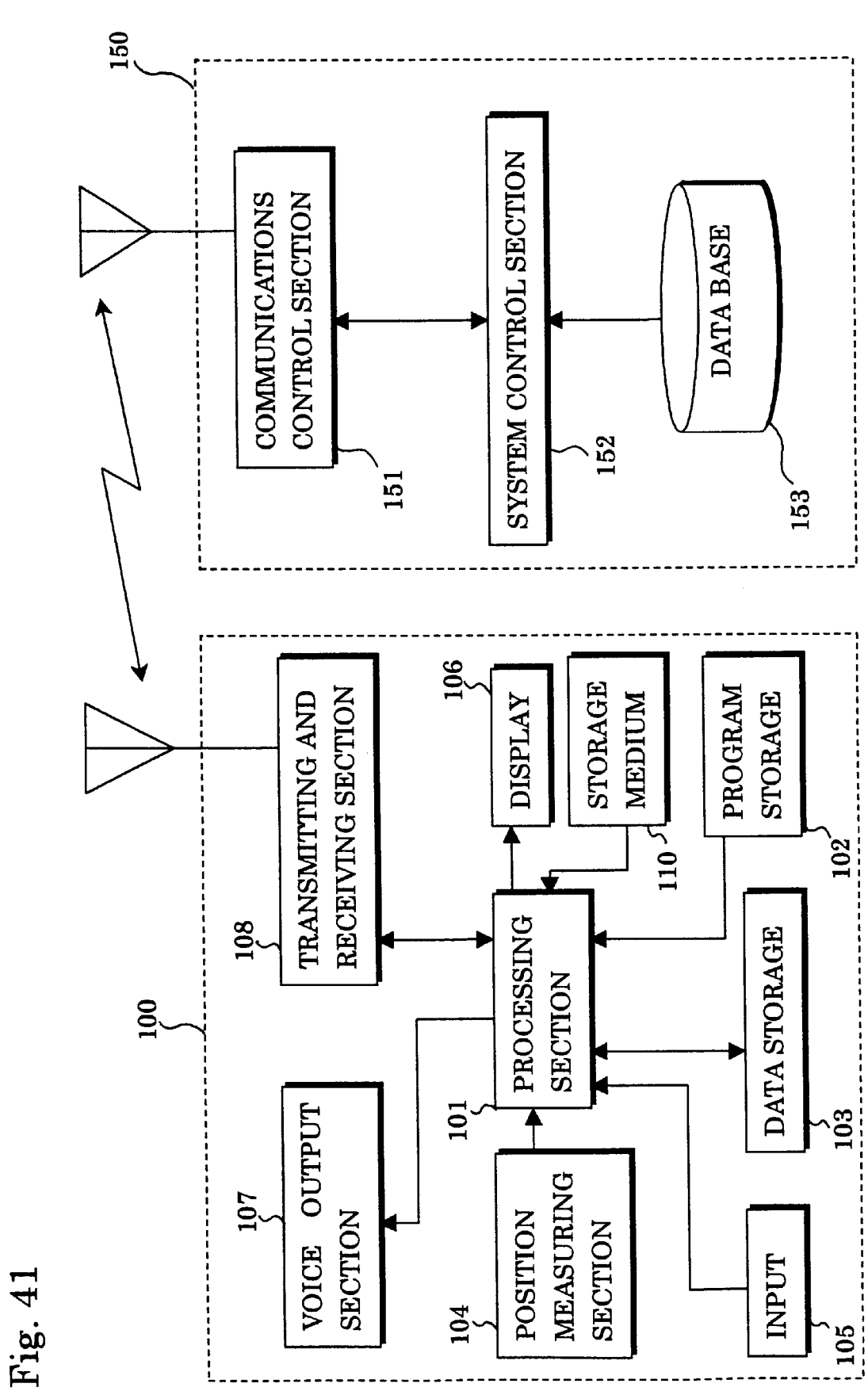
FIG. 41 is a block diagram which shows a modification of the third embodiment of the communications navigation system according to the present invention.

In contrast with the third embodiment described above in which the vehicle navigation apparatus 100 is not provided with a storage medium for storing road map data, the vehicle navigation apparatus 100 according to the second embodiment is equipped with a storage medium 110 (such as a DVD or the like) for storing road map data, as shown in FIG. 41.

Figure 34:
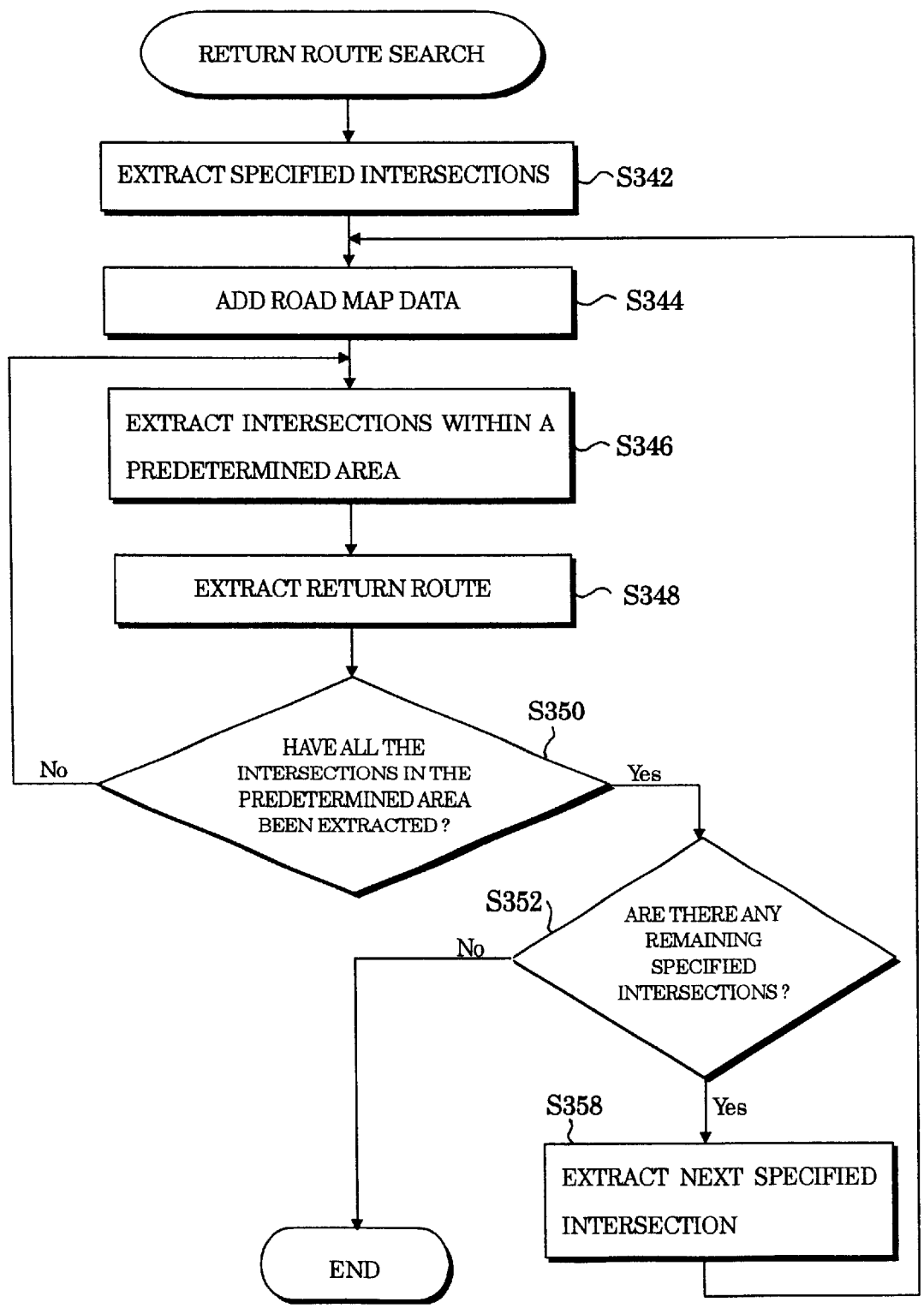
FIG. 34 is a flow chart which shows a process for searching a return route at the navigation base apparatus according to the third embodiment.
Figure 35:
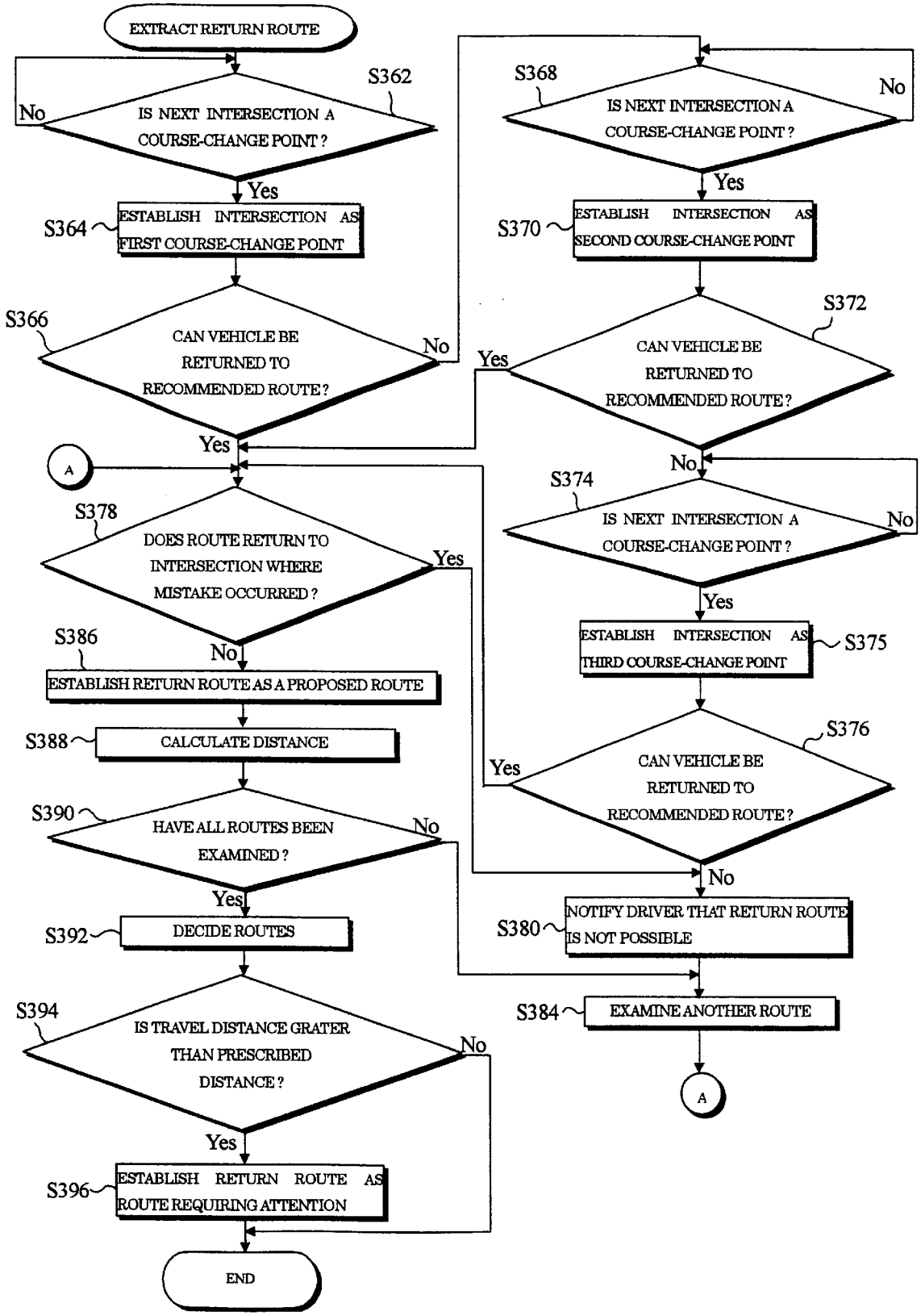
FIG. 35 is a flow chart which shows a process for extracting data for a return route at the navigation base apparatus according to the third embodiment.

In this modification of the third embodiment, the processes carried out in the navigation base apparatus are roughly similar to those described above for the third embodiment with reference to FIGS. 33 to 35. However, while specified intersections on the recommended route requiring left or right turns were supplemented with road map data in the third embodiment described above, no road map data is transmitted from the navigation base apparatus 150 in this modification due to the fact that road map data is provided in the vehicle navigation apparatus 100. As a result, there is a reduction in the amount of data that needs to be transmitted from the navigation base apparatus 150 to the vehicle navigation apparatus 100.

Figure 42:
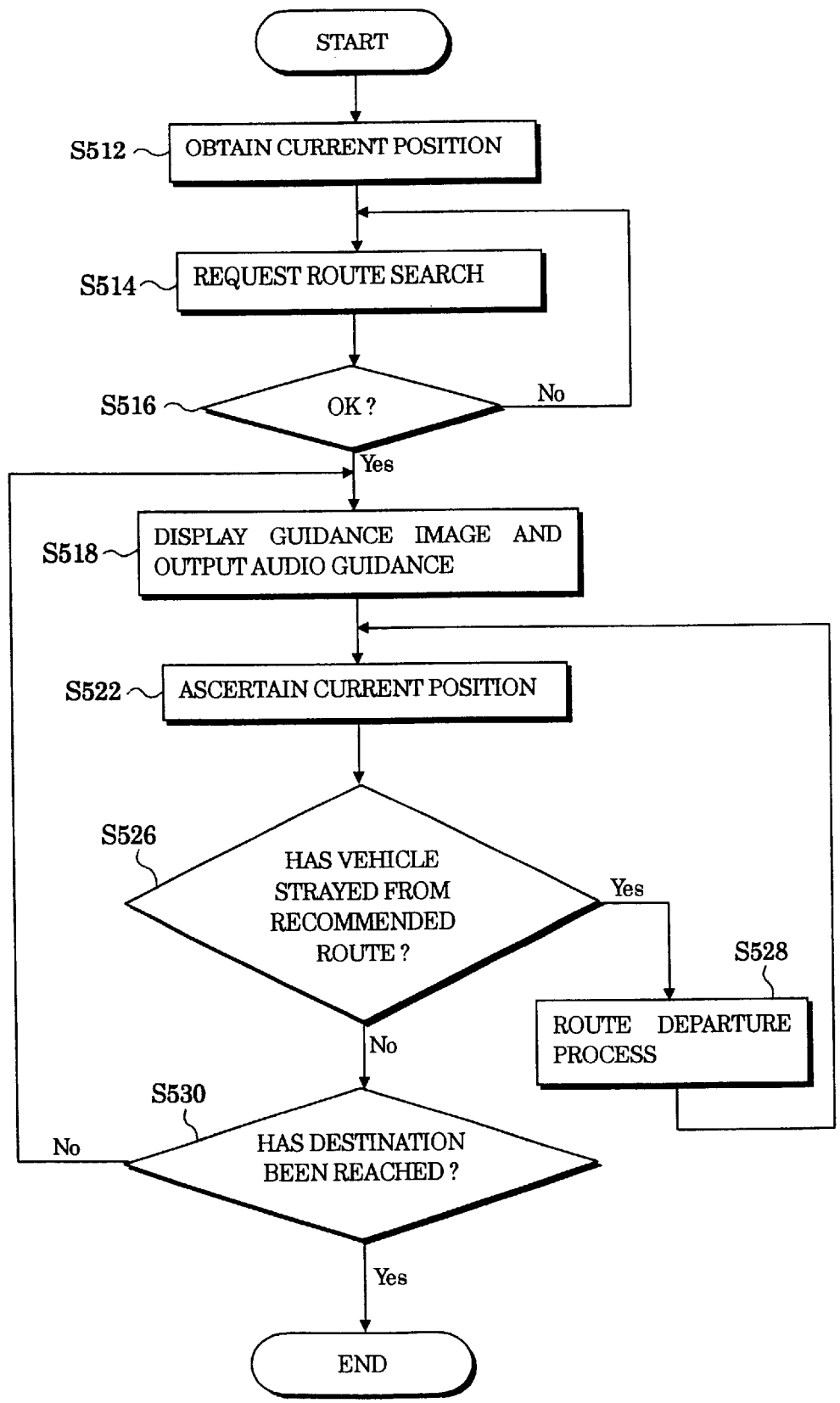
FIG. 42 is a flow chart which shows a main routine for a process carried out in the vehicle navigation apparatus of the modification of the third embodiment.

In this connection, FIG. 42 shows the process carried out in the vehicle navigation apparatus 100 according to this modification of the third embodiment. Except for the fact that road map data is not expanded or erased, the process carried out in the vehicle navigation apparatus 100 is similar to that carried out in the embodiment described above with reference to FIG. 36.

Figure 43:
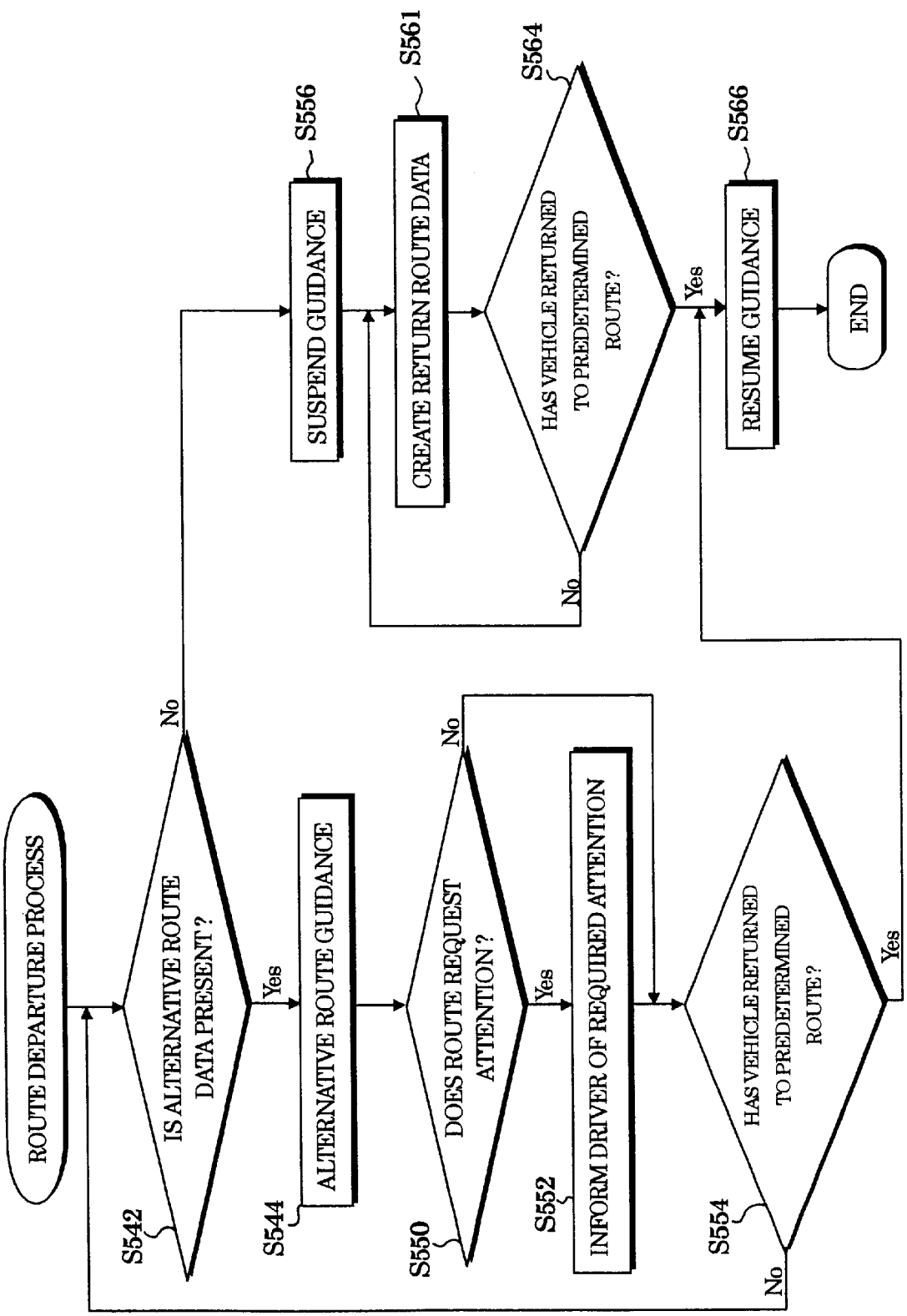
FIG. 43 is a flow chart which shows a process carried out in the vehicle navigation apparatus of the third embodiment when the vehicle strays from the recommended route.

Further, FIG. 43 shows the route departure process subroutine (Step S528 in FIG. 42) carried out by the vehicle navigation apparatus 100 according to the modification of the third embodiment. In the vehicle navigation apparatus 100 according to this modification, if the vehicle strays from the alternative route (i.e., in the case where a "NO" judgement is made at Step S542), a return route to the recommended route is established based on the internally stored road map data (Step S561), and route guidance is resumed.

Figure 44:
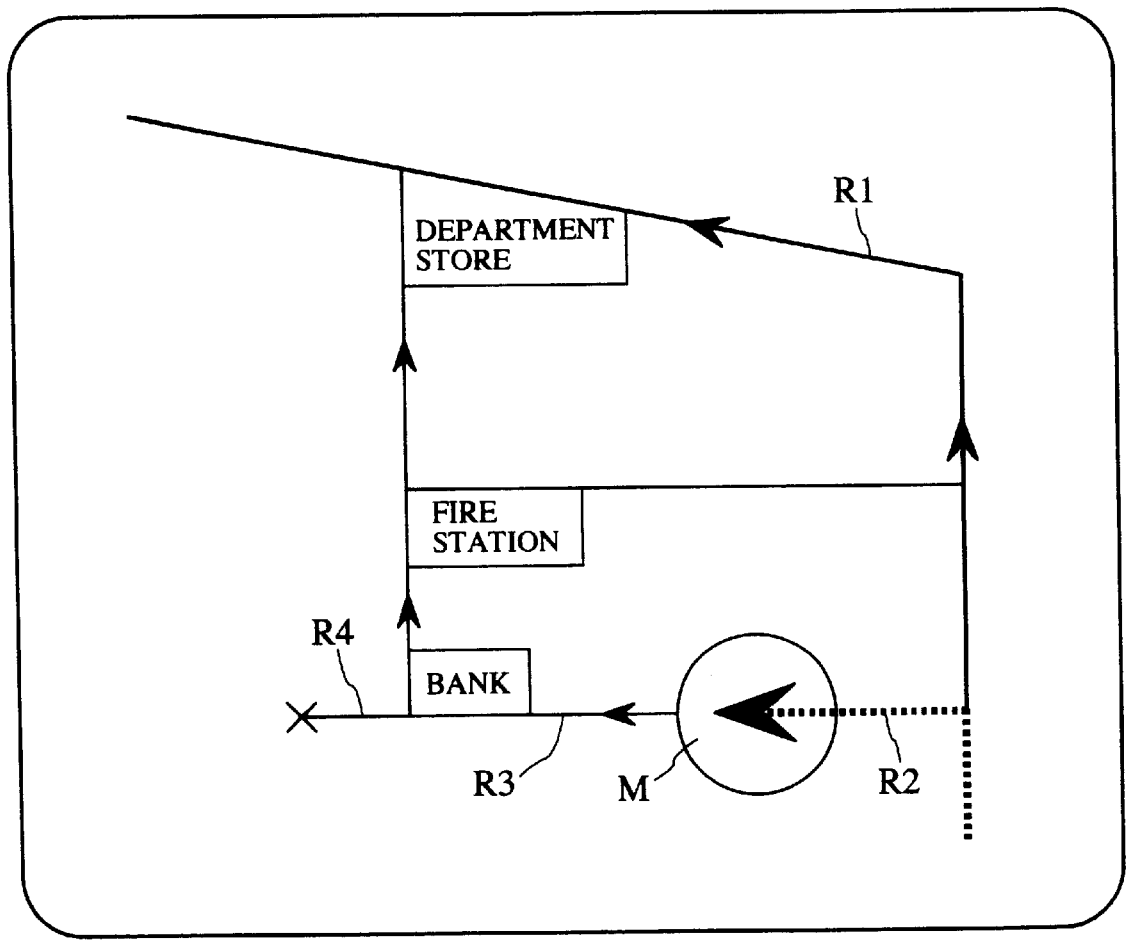
FIG. 44 is an illustration which shows one example of a displayed image in the modification of the vehicle navigation apparatus of the third embodiment.

In this connection, it is to be noted that although in the example shown in FIG. 40(C) the traveling trace R2 of the vehicle was represented by a dashed line from the position where the vehicle had strayed from the recommended route (that is, the intersection C3 shown in FIG. 38), in this modification the entire traveling trace R2 of the vehicle is represented by a dashed line as shown in FIG. 44.

As described above, according to this third modification, a recommended route to the destination and return routes are transmitted from the navigation base apparatus to the vehicle navigation apparatus, the present invention makes it possible to continue route guidance even in the case where the vehicle strays from the recommended route. Accordingly, it is possible to prevent driver distress even in the case where the vehicle strays from the recommend route.

Finally, it is to be noted that the present invention is not limited to the embodiments and modifications as described above, and various changes and additions are made without departing from the scope of the present invention which is defined by the following claims.

What is claimed is:

1. A communications navigation system in which data is transmitted and received by means of wireless communication between a navigation base apparatus provided at a navigation base and a navigation apparatus provided in a moving body such as a vehicle wherein the navigation apparatus comprises:

means for transmitting at least data concerning the current position of the moving body and the destination thereof to the navigation base apparatus; and wherein the navigation base apparatus comprises:
navigation data storing means for storing navigation data including detailed map information;

means for determining a recommended route based on the received data of the current position of the moving body and the destination thereof, and for extracting data of the recommended route from the navigation data stored in the navigation data storing means, and then transmitting the extracted data to the navigation apparatus; and intersection judgement means for determining an angle between roads on said recommended route into and out of each intersection and fork on said recommended route and for identifying each intersection and fork for which said angle is less than a predetermined value as a course-change point;

wherein the navigation base apparatus is adapted to be able to extract detailed map information limited to only that for an area surrounding the course-change point on the recommended route, from the navigation data stored in the navigation data storing means, and then transmit the extracted detailed map information to the navigation apparatus; and wherein the navigation apparatus is configured so as to display an indication of travelling direction of the moving body at the course-change point based on the detailed map information received from the navigation base apparatus.

2. The communications navigation system as claimed in claim 1 wherein the surrounding area of the course-change point is established automatically by the navigation apparatus.

3. The communications navigation system as claimed in claim 1, wherein the surrounding area of the course-change point is selectable at the navigation apparatus.

4. The communications navigation system as claimed in claim 1, wherein the detailed navigation data for the surrounding area of the course-change point includes data for returning the moving body to the recommended route when the vehicle has strayed from the recommended route.

5. The communications navigation system as claimed in claim 1, wherein the detailed map information includes at least one of map data, road data, intersection data, area guidance data and voice guidance data.

6. The communications navigation system as claimed as claimed in claim 1, wherein the navigation base apparatus sets plural course-change points and is adapted to transmit the detailed map information to the navigation apparatus when the moving body is in a vicinity of a course-change point on the recommended route and to transmit less detailed map information when the moving body is in an intermediate section between two of the plural specified points.

7. A navigation base apparatus for use in a communications navigation system in which data is transmitted and received by means of wireless communication between the navigation base apparatus provided at a navigation base and a navigation apparatus provided in a moving body such as a vehicle wherein the navigation apparatus is adapted to transmit at least data concerning the current position of the moving body and the destination thereof to the navigation base apparatus, said navigation base apparatus comprising:

navigation data storing means for storing navigation data including detailed map information;

means for determining a recommended route based on the received data of the current position of the moving body and the destination thereof, and for extracting data of the recommended route from the navigation data stored in the navigation data storing means, and then transmitting the extracted data to the navigation apparatus; and intersection judgement means for determining an angle between roads on said recommended route into and out of each intersection and fork on said recommended route and for identifying each intersection and fork for which said angle is less than a predetermined value as a course-change point;

wherein the navigation base apparatus is adapted to be able to extract detailed map information limited to only that for an area surrounding the course-change point on the recommended route, from the navigation data stored in the navigation data storing means, and then transmit the extracted detailed map information to the navigation apparatus.

8. A navigation apparatus for use in a communications navigation system in which data is transmitted and received by means of wireless communication between a navigation base apparatus provided at a navigation base and the navigation apparatus provided in a moving body such as a vehicle wherein the navigation base apparatus has navigation data storing means for storing navigation data including detailed map information, means for determining a recommended route based on data for the current position of the moving body and the destination thereof, received from the navigation apparatus, and for extracting data of the recommended route from the navigation data stored in the navigation data storing means, and then transmitting the extracted data to the navigation apparatus; and wherein said navigation apparatus comprises:

intersection judgement means for determining an angle between roads on said recommended route into and out of each intersection and fork on said recommended route and for identifying each intersection and fork for which said angle is less than a predetermined value as a course-change point;

means for transmitting at least data concerning the current position of the moving body and the destination thereof to said navigation base apparatus; and means for displaying indication of travelling direction of the moving body at the course-change point based on the detailed map information received from the navigation base apparatus; and wherein the navigation apparatus is adapted to receive from the navigation base apparatus detailed map information limited to only that for an area surrounding the course-change point on the recommended route which is extracted from the navigation data stored in the navigation data storing means based on the received data concerning the current position of the vehicle and the destination thereof.

* * * * *